United States Patent
McNichols et al.

(10) Patent No.: US 6,547,903 B1
(45) Date of Patent: Apr. 15, 2003

(54) ROTARY ULTRASONIC BONDER OR PROCESSOR CAPABLE OF HIGH SPEED INTERMITTENT PROCESSING

(75) Inventors: Patrick Sean McNichols, Hortonville, WI (US); Thomas David Ehlert, Neenah, WI (US); Timothy James Blenke, Neenah, WI (US); Tauhid Husain, New Milford, CT (US); Barton Andrew Laughlin, Hortonville, WI (US); Paul Gordon Klemp, Hortonville, WI (US); John Ford Condron, Neenah, WI (US); Harold Norbert Heller, Menasha, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 10/034,178

(22) Filed: Dec. 18, 2001

(51) Int. Cl.[7] .............................................. B29C 65/08
(52) U.S. Cl. .................. 156/64; 156/73.1; 156/358; 156/555; 156/580.2; 156/582
(58) Field of Search ........................ 156/64, 73.1, 290, 156/308.2, 308.4, 358, 553, 555, 580, 580.1, 580.2, 582

(56) References Cited

U.S. PATENT DOCUMENTS

| | | | |
|---|---|---|---|
| 3,955,740 A | 5/1976 | Shoh | |
| 4,081,301 A | 3/1978 | Buell | |
| 4,083,737 A | 4/1978 | Foote, Jr. et al. | |
| 4,205,679 A | 6/1980 | Repke et al. | |
| 4,226,238 A | 10/1980 | Bianco | |
| 4,305,988 A | 12/1981 | Köcher | |
| 4,333,978 A | 6/1982 | Kocher | |
| 4,430,148 A | 2/1984 | Schaefer | |
| 4,543,154 A | 9/1985 | Reiter | |
| 4,610,681 A | 9/1986 | Strohbeen et al. | |
| 4,647,336 A | 3/1987 | Coenen et al. | |
| 4,692,163 A | 9/1987 | Widlund et al. | |

(List continued on next page.)

FOREIGN PATENT DOCUMENTS

| | | |
|---|---|---|
| AU | 716300 | 10/1997 |
| DE | 295 03 122 U1 | 6/1995 |
| DE | 298 14 704 U1 | 2/1999 |
| DE | 198 13 121 C1 | 10/1999 |
| EP | 0 004 782 A2 | 10/1979 |
| EP | 0 119 827 B1 | 9/1984 |
| EP | 0 685 586 A2 | 12/1995 |
| EP | 0 689 930 A2 | 1/1996 |
| EP | 0 735 947 B1 | 10/1996 |
| EP | 0 920 977 A1 | 6/1999 |
| JP | 11-277500 A | 10/1999 |
| WO | WO 91/04724 A1 | 4/1991 |
| WO | WO 94/01070 A1 | 1/1994 |
| WO | WO 97/31603 A1 | 9/1997 |
| WO | WO 98/24389 A1 | 6/1998 |
| WO | WO 98/27906 A1 | 7/1998 |
| WO | WO 98/37842 A1 | 9/1998 |
| WO | WO 98/55292 A1 | 12/1998 |
| WO | WO 98/55298 A1 | 12/1998 |
| WO | WO 99/38666 A1 | 8/1999 |
| WO | WO 99/65436 A1 | 12/1999 |
| WO | WO 00/38609 A1 | 7/2000 |
| WO | WO 01/00053 A1 | 1/2001 |

Primary Examiner—James Sells
(74) Attorney, Agent, or Firm—Paul Y. Yee

(57) ABSTRACT

An ultrasonic processing method and apparatus (20) can include a rotatable, ultrasonic horn member (28) that is operatively joined to an isolation member (42) which has high rigidity. A rotatable anvil member (86) can be cooperatively positioned to provide a selected horn-anvil gap (106), and an automated drive (130) can be connected to an actuator (110), or other transfer device, to automatically adjust the horn-anvil gap (106). An electronic processor (128) can be configured to monitor an intermittent gap force detected from an output provided by a force sensor (126), and can provide a drive signal to the automated drive (130) to thereby adjust the horn-anvil gap (106) to operatively maintain a target, gap force value.

14 Claims, 33 Drawing Sheets

U.S. PATENT DOCUMENTS

| | | |
|---|---|---|
| 4,695,278 A | 9/1987 | Lawson |
| 4,713,132 A | 12/1987 | Abel et al. |
| 4,738,677 A | 4/1988 | Foreman |
| 4,758,293 A | 7/1988 | Samida |
| 4,795,454 A | 1/1989 | Dragoo |
| 4,801,345 A | 1/1989 | Dussaud et al. |
| 4,816,025 A | 3/1989 | Foreman |
| 4,816,026 A | 3/1989 | Richardson |
| 4,863,542 A | 9/1989 | Oshefsky et al. |
| 4,938,755 A | 7/1990 | Foreman |
| 4,977,011 A | 12/1990 | Smith |
| 5,021,051 A | 6/1991 | Hiuke |
| 5,032,120 A | 7/1991 | Freeland et al. |
| 5,064,489 A | 11/1991 | Ujimoto et al. |
| 5,087,320 A | 2/1992 | Neuwirth |
| 5,096,532 A | 3/1992 | Neuwirth et al. |
| 5,110,403 A | 5/1992 | Ehlert |
| 5,209,801 A | 5/1993 | Smith |
| 5,336,346 A | 8/1994 | Meltzer et al. |
| 5,393,360 A | 2/1995 | Bridges et al. |
| 5,407,438 A | 4/1995 | Hedlund et al. |
| 5,407,507 A | 4/1995 | Ball |
| 5,451,219 A | 9/1995 | Suzuki et al. |
| 5,468,320 A | 11/1995 | Zafiroglu |
| 5,496,428 A | 3/1996 | Sageser et al. |
| 5,552,013 A | 9/1996 | Ehlert et al. |
| 5,560,793 A | 10/1996 | Ruscher et al. |
| 5,562,790 A | 10/1996 | Ehlert et al. |
| 5,565,050 A | 10/1996 | Sageser et al. |
| 5,567,254 A | 10/1996 | Sageser |
| 5,590,866 A | 1/1997 | Cunningham |
| 5,591,298 A | 1/1997 | Goodman et al. |
| 5,605,026 A | 2/1997 | Schott et al. |
| 5,609,702 A | 3/1997 | Andersen |
| 5,618,366 A | 4/1997 | Suekane |
| 5,620,545 A | 4/1997 | Braun et al. |
| 5,626,574 A | 5/1997 | Sasaki et al. |
| 5,628,738 A | 5/1997 | Suekane |
| 5,643,377 A | 7/1997 | Juergens |
| 5,643,396 A | 7/1997 | Rajala et al. |
| 5,660,657 A | 8/1997 | Rajala et al. |
| 5,660,679 A | 8/1997 | Rajala et al. |
| 5,662,637 A | 9/1997 | Kitaoka et al. |
| 5,667,608 A | 9/1997 | Rajala et al. |
| 5,667,609 A | 9/1997 | Liu |
| 5,672,166 A | 9/1997 | Vandemoortele |
| 5,693,177 A | 12/1997 | Meltzer et al. |
| 5,707,470 A | 1/1998 | Rajala et al. |
| 5,707,483 A | 1/1998 | Nayar et al. |
| 5,711,832 A | 1/1998 | Glaug et al. |
| 5,711,847 A | 1/1998 | Rajala et al. |
| 5,733,411 A | 3/1998 | Bett |
| 5,755,902 A | 5/1998 | Reynolds |
| 5,797,895 A | 8/1998 | Widlund et al. |
| 5,817,199 A | 10/1998 | Brennecke et al. |
| 5,827,387 A | 10/1998 | Reynolds et al. |
| 5,851,204 A | 12/1998 | Mizutani |
| 5,855,573 A | 1/1999 | Johansson |
| 5,876,392 A | 3/1999 | Hisada |
| 5,931,825 A | 8/1999 | Kuen et al. |
| 5,976,316 A | 11/1999 | Mlinar et al. |
| 5,979,316 A | 11/1999 | Baum |
| 6,010,766 A | 1/2000 | Braun et al. |
| 6,017,406 A | 1/2000 | Vogt |
| 6,022,431 A | 2/2000 | Blenke et al. |
| 6,123,792 A | 9/2000 | Samida et al. |
| 6,190,296 B1 | 2/2001 | Gnad et al. |
| 6,287,403 B1 | 9/2001 | Couillard et al. |
| 6,336,803 B1 | 1/2002 | Funger et al. |
| 6,454,890 B1 * | 9/2002 | Couillard et al. .......... 156/73.1 |
| 6,457,626 B1 | 10/2002 | Sheehan et al. |
| 2002/0062903 A1 | 5/2002 | Couillard et al. |

* cited by examiner

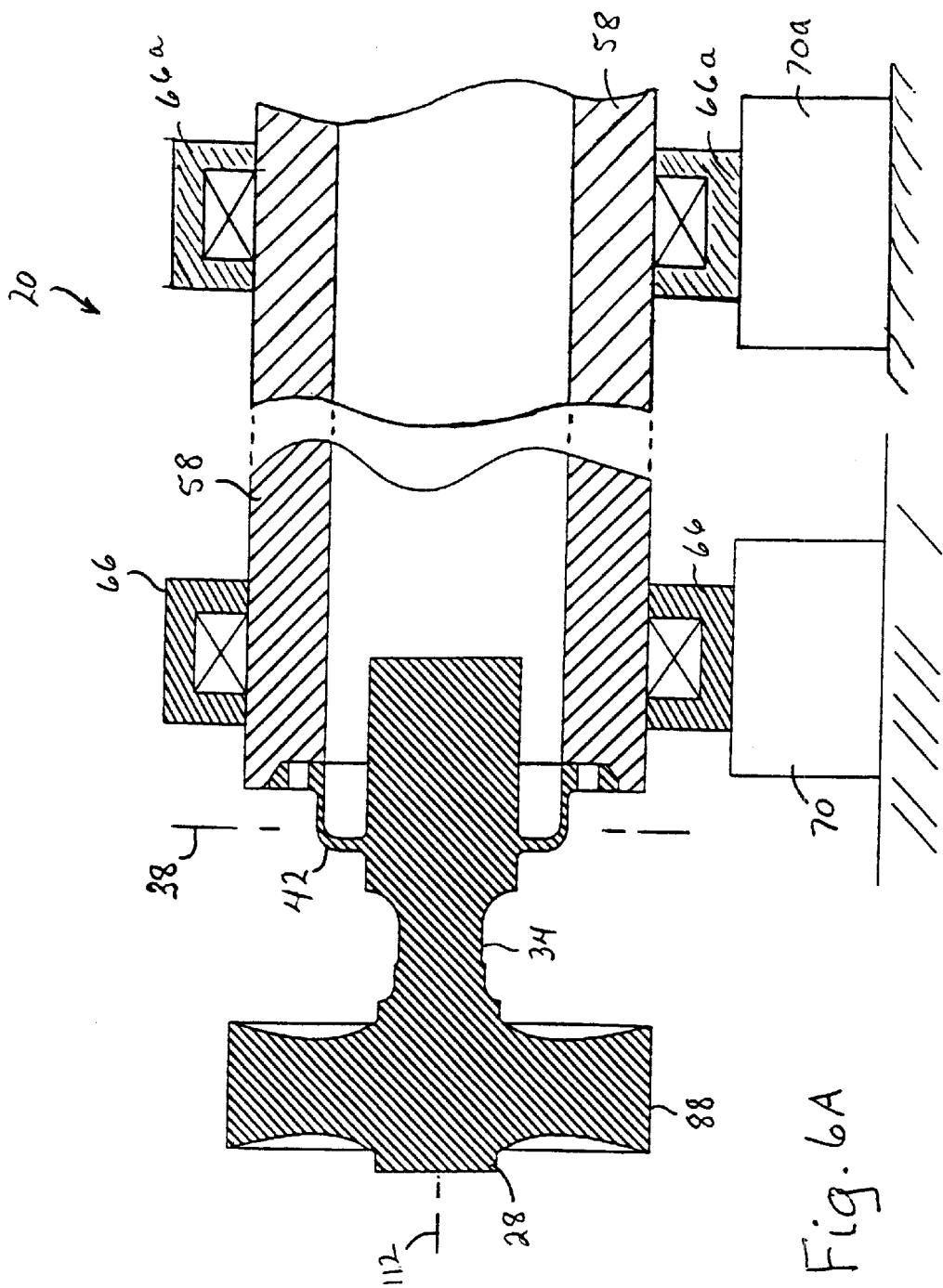

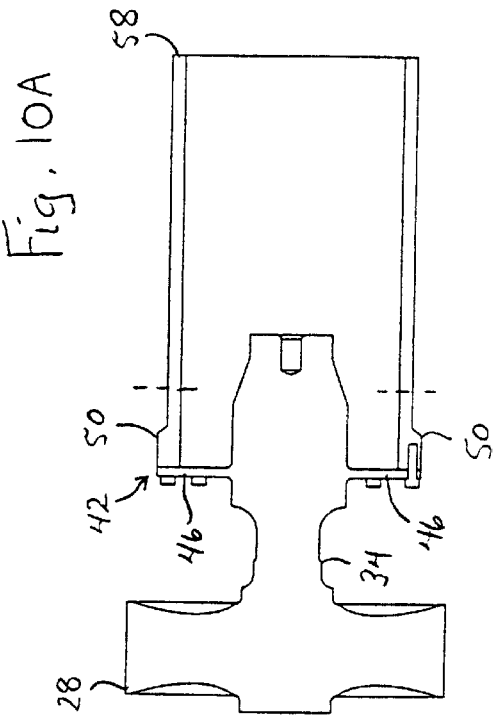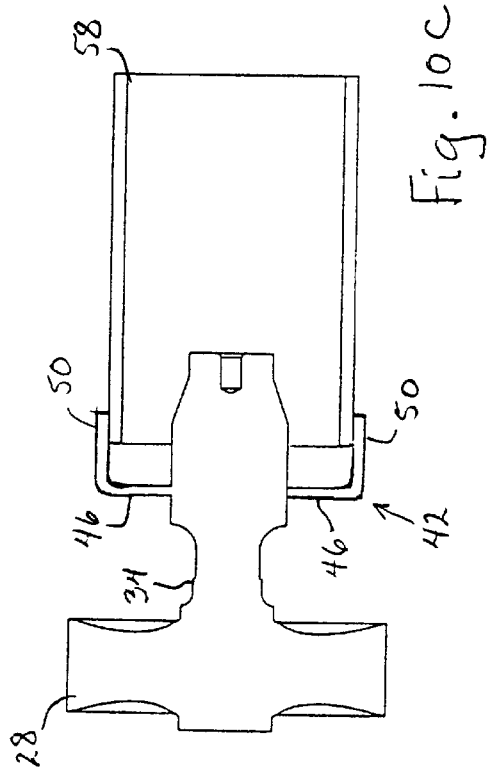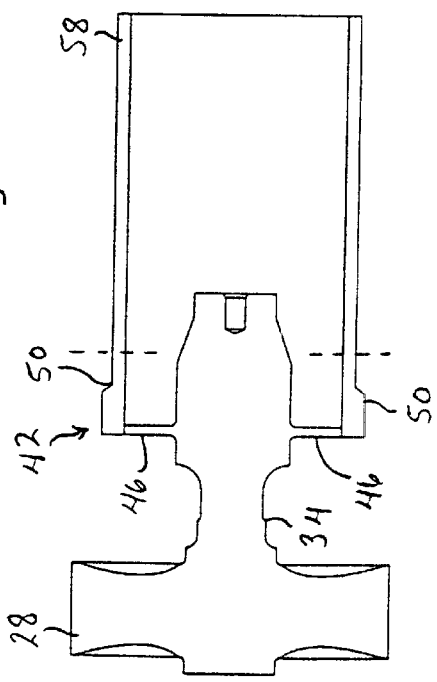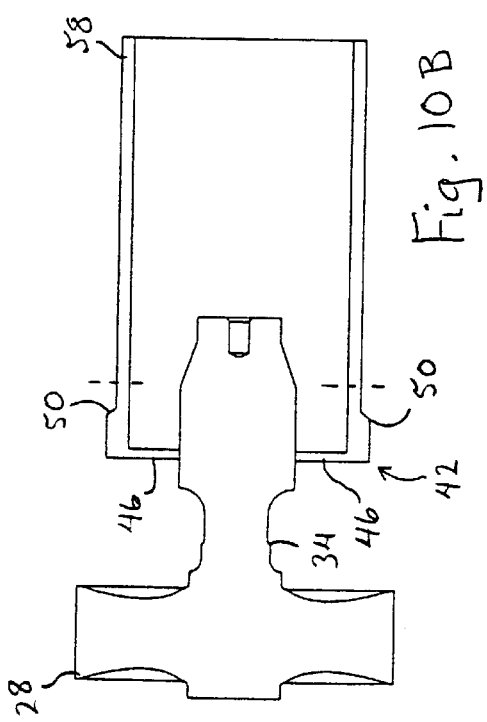

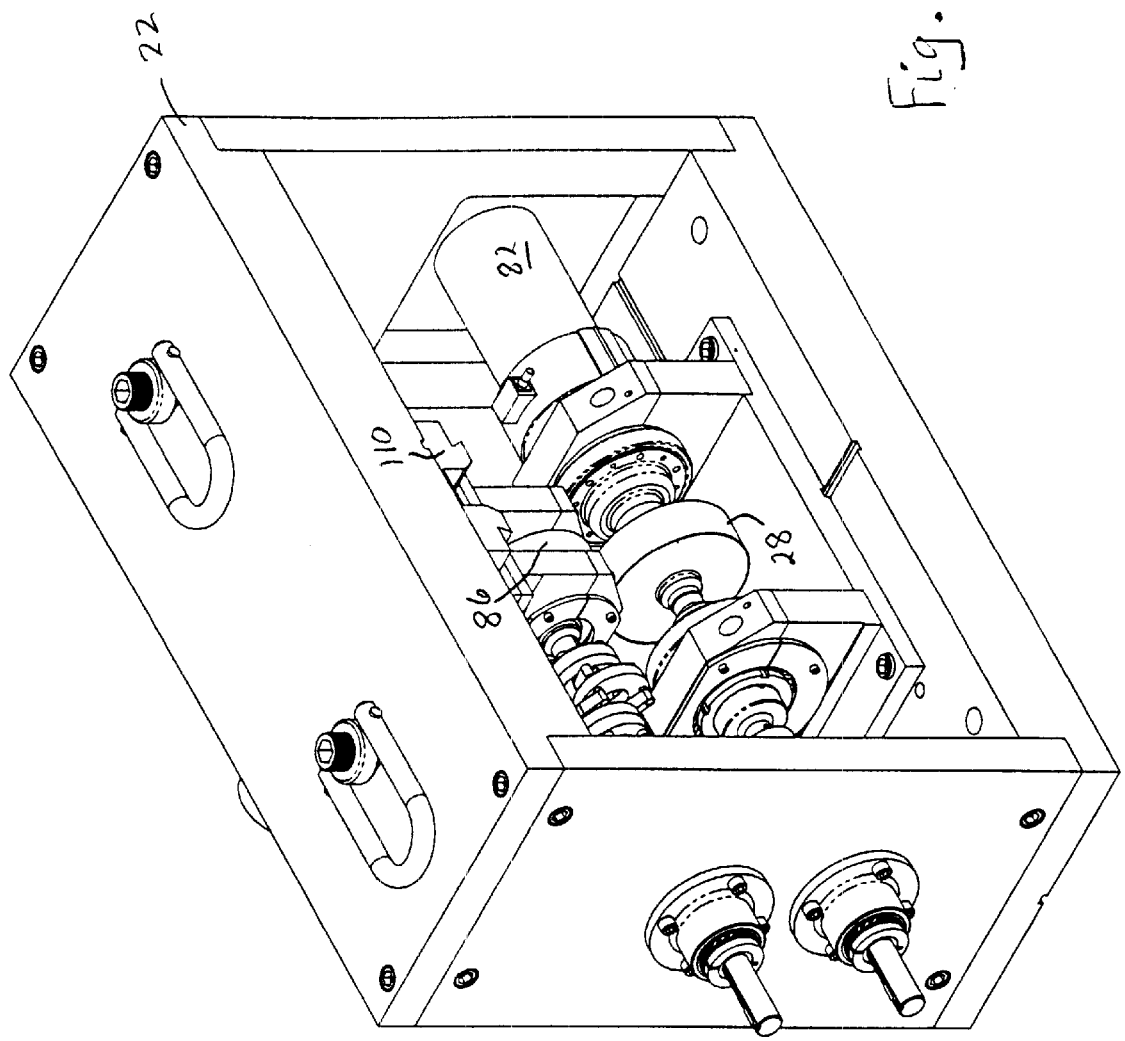

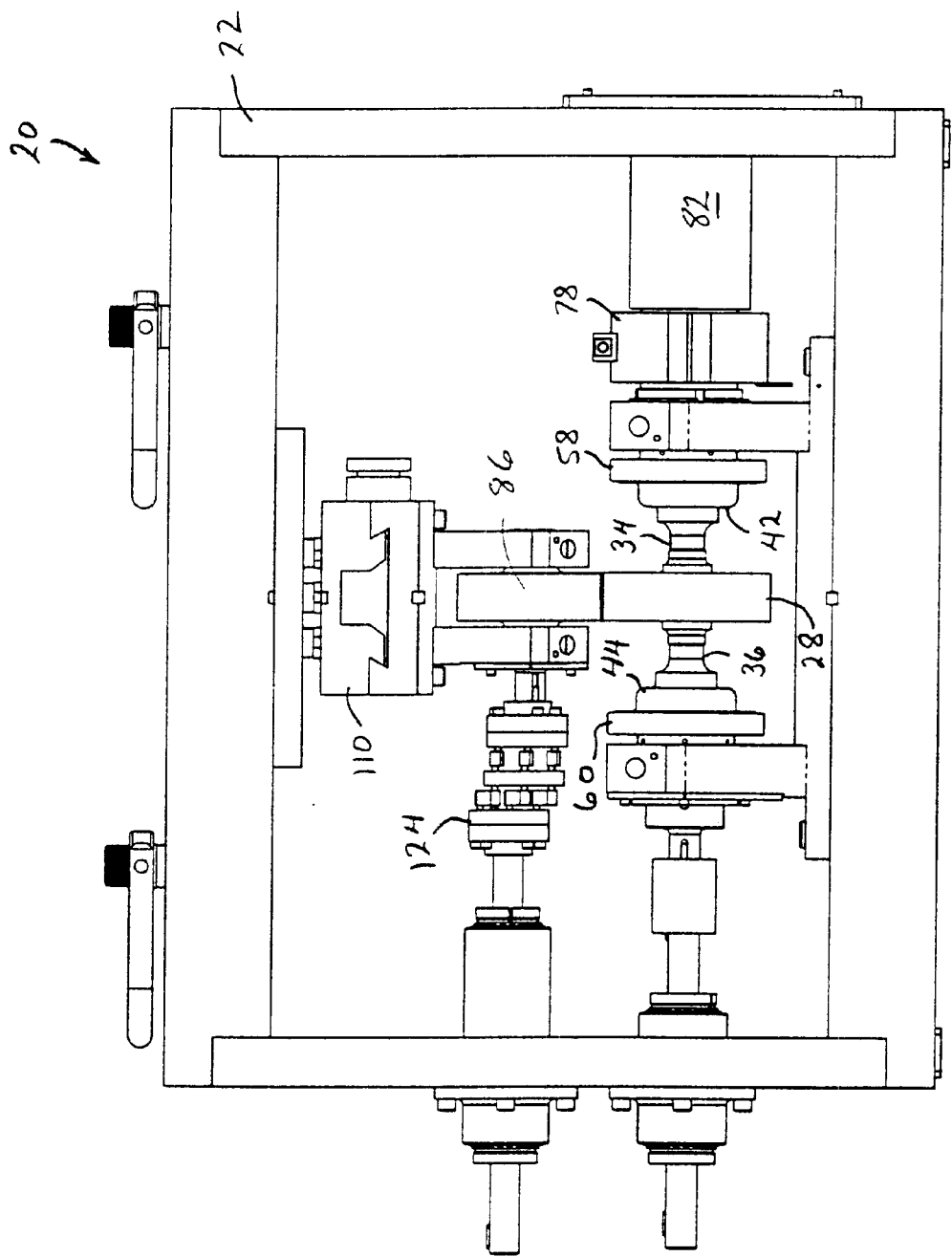

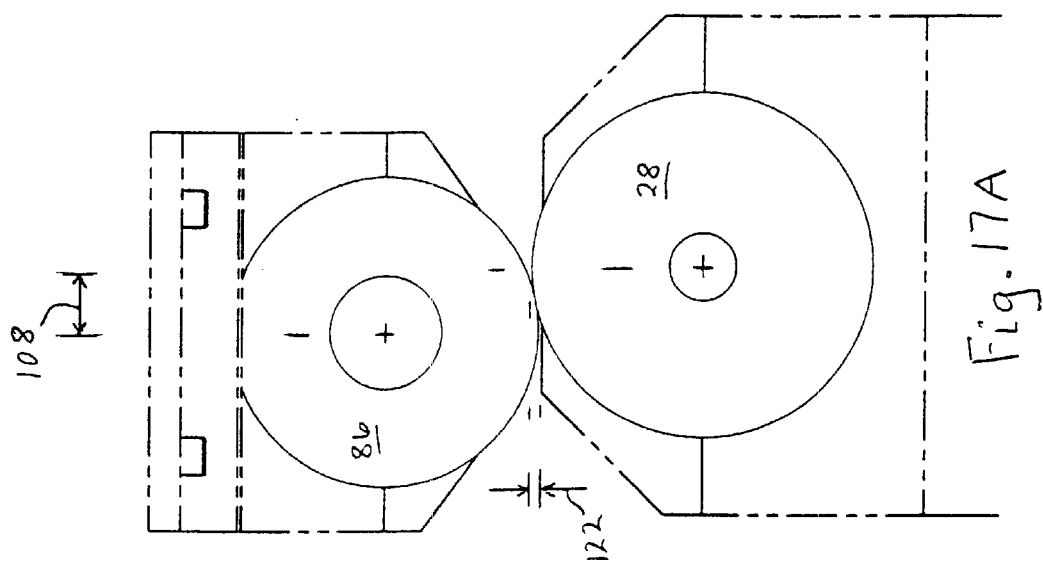
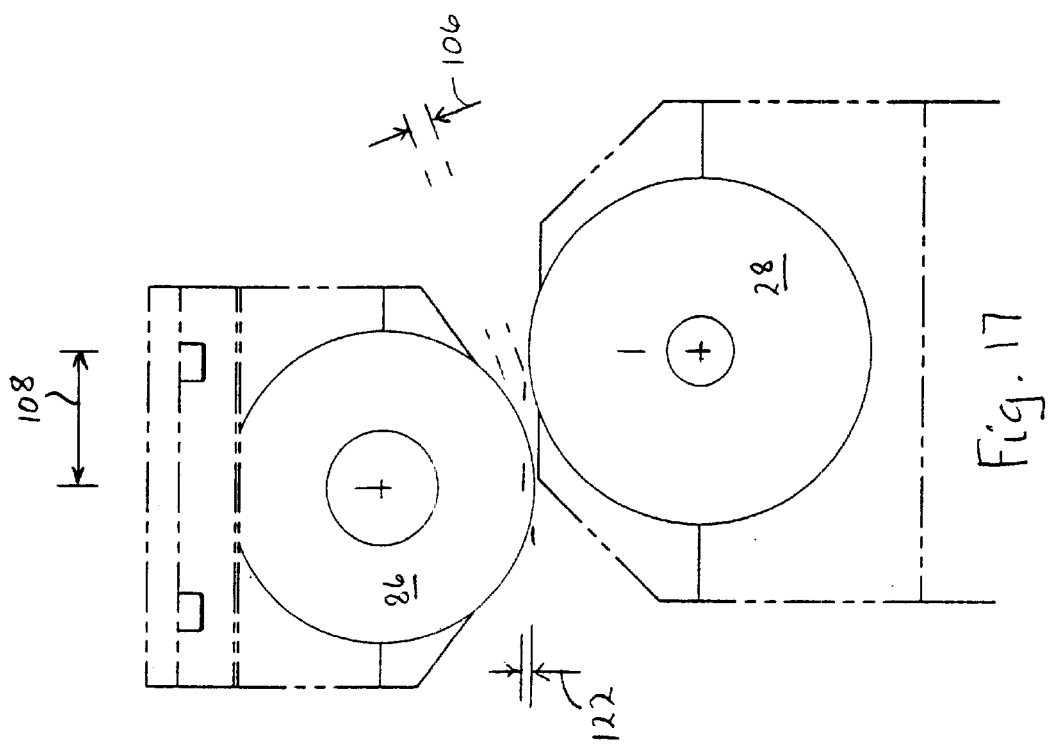

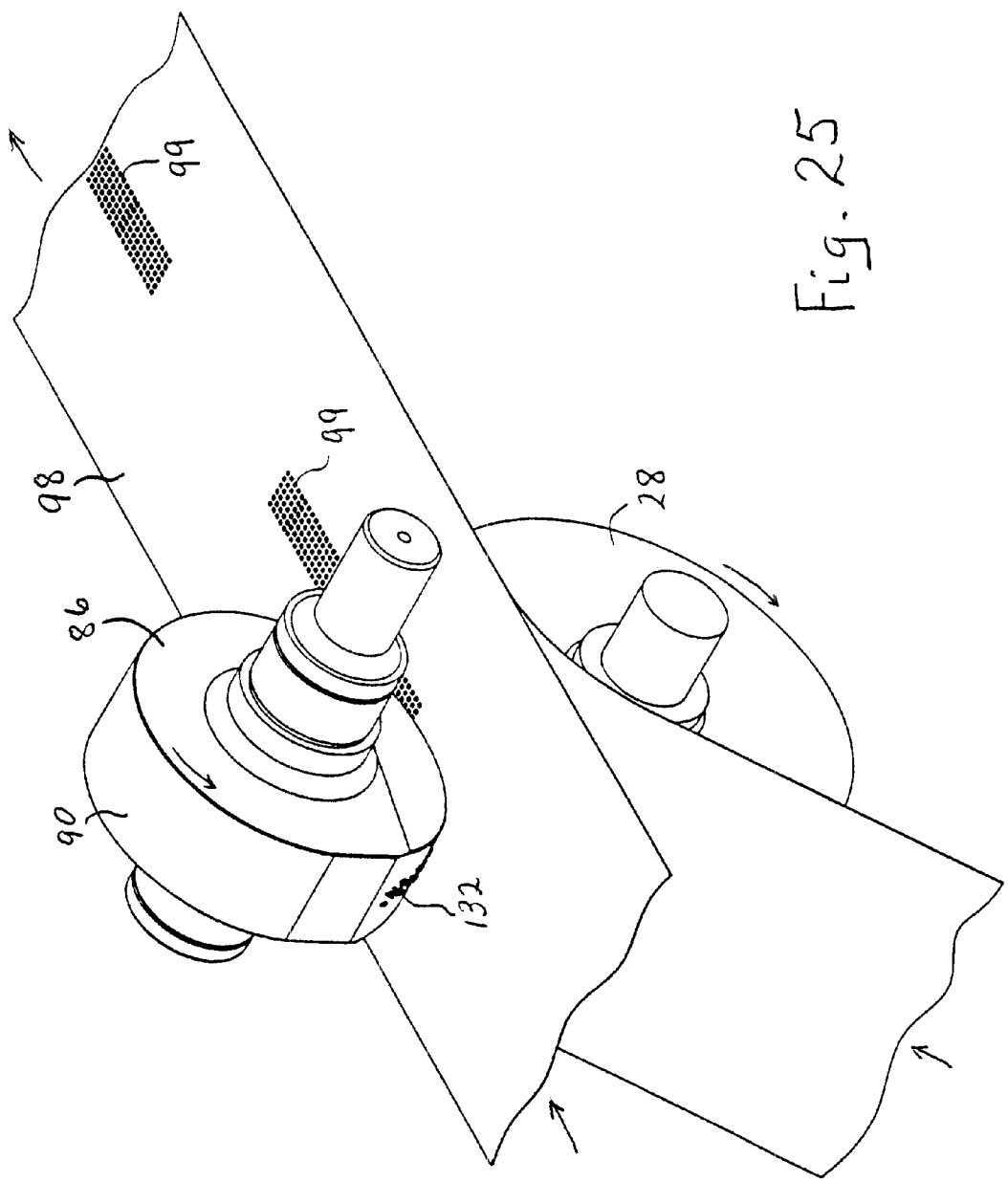

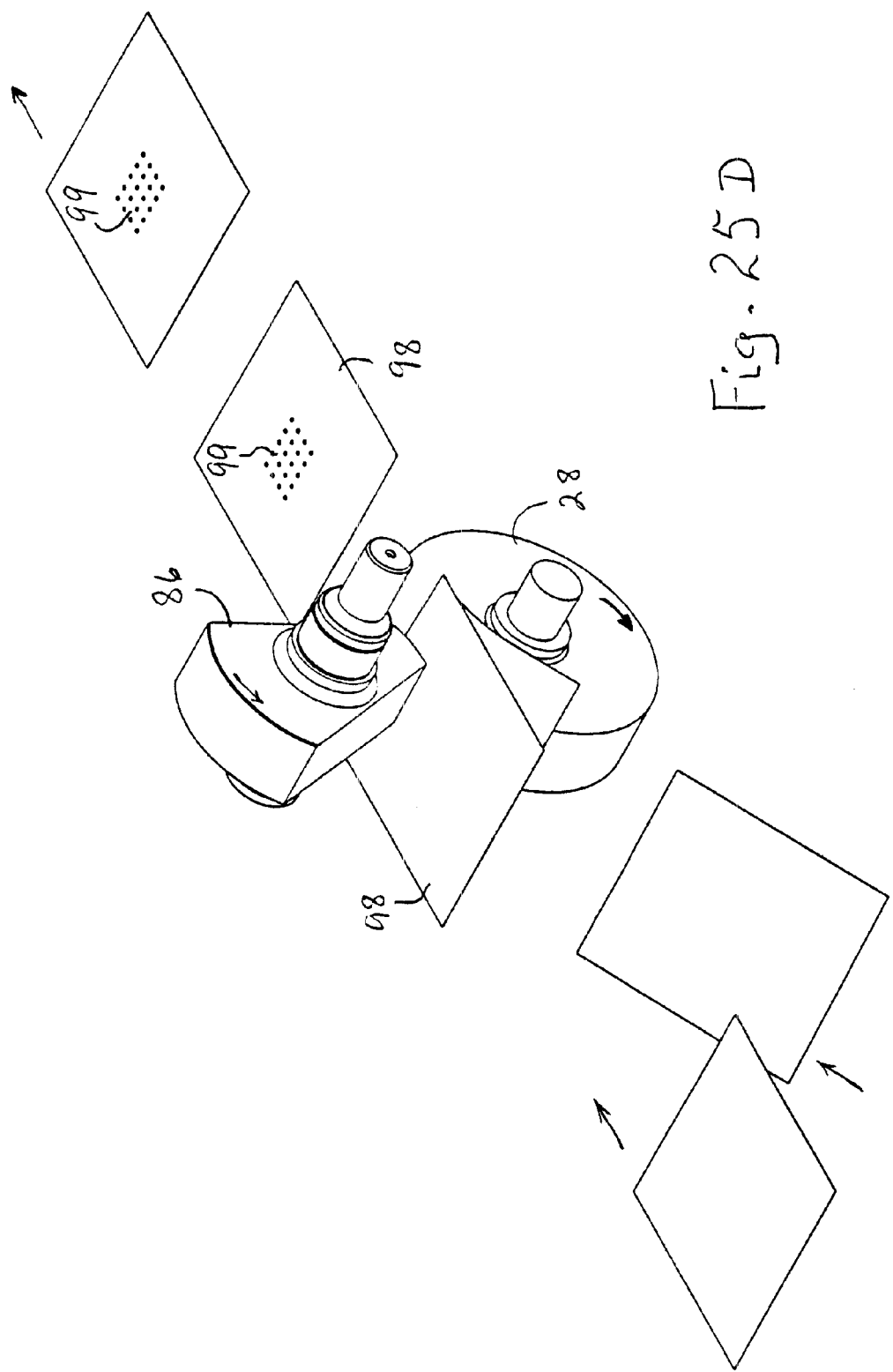

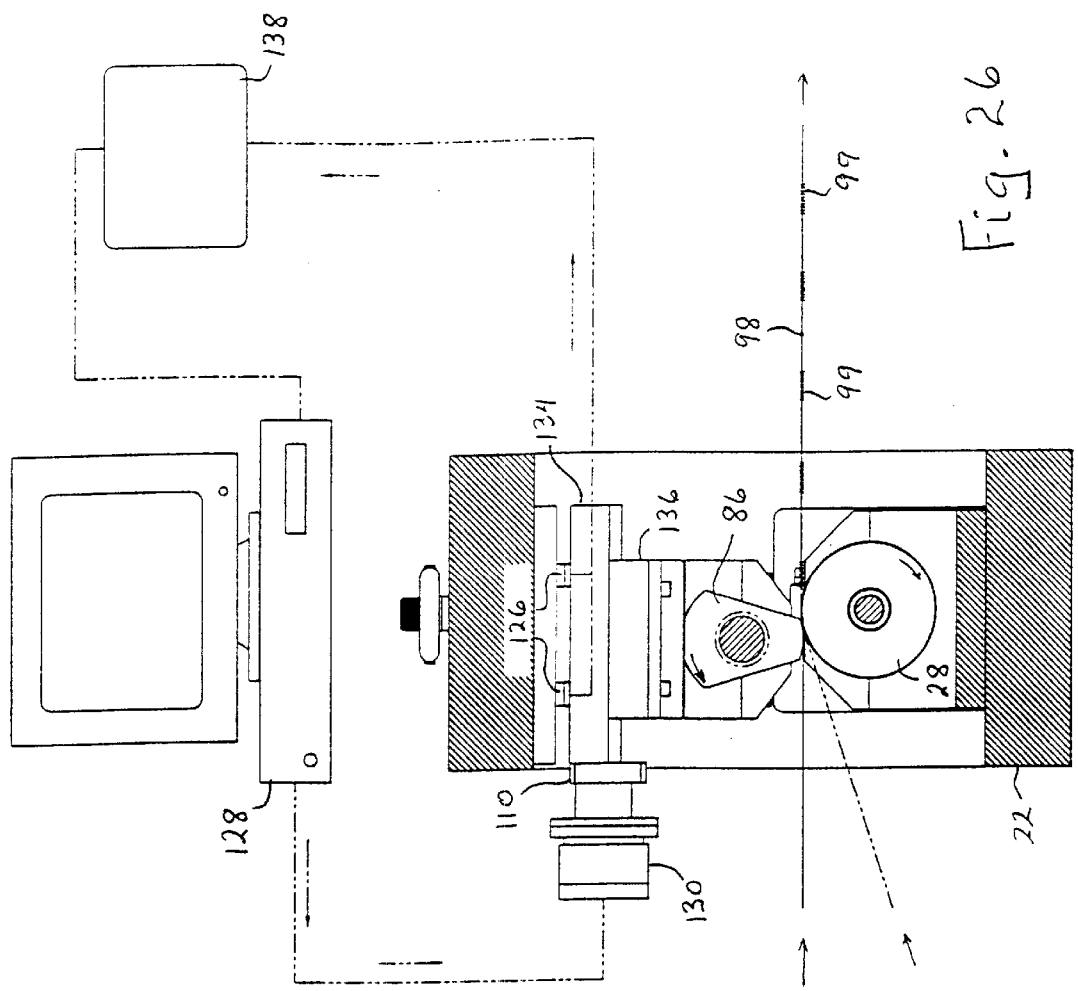

ROTARY ULTRASONIC BONDER OR PROCESSOR CAPABLE OF HIGH SPEED INTERMITTENT PROCESSING

FIELD OF THE INVENTION

This invention generally relates to a method and apparatus that can be employed for ultrasonic processing operations. In particular features, the method and apparatus can include a rotary ultrasonic horn, and the ultrasonic processing can include an ultrasonic bonding operation. More particularly, the invention relates to an ultrasonic processing method and apparatus which can provide for an operative isolation of the rotary horn while employing a connection system that has relatively high rigidity and stiffness.

BACKGROUND OF THE INVENTION

Conventional ultrasonic systems have included a rotary horn which cooperates with a rotary anvil. The conventional rotary ultrasonic horns have been supported and mounted by employing rubber or other elastomeric components to provide ultrasonic isolation. As a result, the ultrasonic horn has exhibited low static stiffness, low dynamic stiffness, and has exhibited excessively large amounts of run-out or other displacements during ordinary operation. Additionally, the conventional ultrasonic horn systems have employed complicated and unreliable torque transmission techniques.

Such conventional ultrasonic bonding systems have employed hydraulic or pneumatic devices to adjust a selected contact point at the work area in the nip region between the rotary horn and rotary anvil. Adjustable bevel blocks and adjustable screw stops have been employed to set the nip pressure and nip alignment. The adjustment systems have typically employed a "hard-stop" to establish the control at the contact point in the nip region. The adjustment systems have been inefficient to operate, and have not provided an adequate mechanism for making sufficiently accurate adjustments. Additionally, the resulting ultrasonic bonding systems have been inadequate for operations which employ a desired, fixed-gap between a rotary horn and a rotary anvil, and have been inadequate for operations which employ a desired, intermittent bonding.

To help address the various shortcomings, the conventional ultrasonic bonding systems have employed additional support wheels to help maintain the ultrasonic horn in a desired position relative to the cooperating rotary anvil. Typically, the support wheels have been configured to hold the rotary horn in a substantially continuous, direct contact with the rotary anvil during ordinary operation. The use of such support wheels, however, has excessively increased the audible noise from the system, and has caused excessive wear on the working surface of the ultrasonic horn. Additionally, the horn has exhibited uneven wear, or has required the use of an oscillation mechanism to more evenly distribute the wear. Torque transmission systems needed for driving the rotary horn have been excessively costly, have required excessive maintenance, and have been difficult to setup and adjust. The conventional ultrasonic horn systems have also created areas on the working surface of the horn that have been unsuitable for performing desired bonding operations, and have not provided sufficient levels of dynamic stability. Additionally, the conventional ultrasonic bonding systems have required excessively critical adjustments, and have exhibited excessive complexity and excessive costs. Where rubber or other elastic materials are employed to provide acoustic isolation mounts, the mounts can generate excessive reflected energy if the elastomeric material is over compressed. As a result, there has been a continued need for improved ultrasonic bonding systems.

BRIEF DESCRIPTION OF THE INVENTION

An ultrasonic processing method and apparatus can include a rotatable, ultrasonic horn member that is operatively joined to an isolation member which has high rigidity. A rotatable anvil member can be cooperatively positioned to provide a selected horn-anvil gap, and an automated drive can be connected to an actuator, or other transfer device, to automatically adjust the horn-anvil gap. An electronic processor can be configured to monitor an intermittent gap force detected from an output provided by a force sensor, and can provide a drive signal to the automated drive to thereby adjust the horn-anvil gap to operatively maintain a target, gap force value.

In a particular feature, the processing method and apparatus can include a rotatable ultrasonic horn member operatively joined to a first isolation member, and a second isolation member. In a further feature, the first isolation member can be capable of bending under a horn-life range of sonic frequencies to provide an operative component of motion along its radial direction and an operative component of motion along its axial direction. In other features, the second isolation member can exhibit high rigidity, and the second isolation member can be capable of bending under the horn-life range of sonic frequencies to provide an operative component of motion along its radial direction, and an operative component of motion along its axial direction.

In a particular aspect, each isolation member can have a radial isolation component and an axial isolation component. Each radial isolation component can be operatively joined to a corresponding axle member, and can be configured to extend at least radially from its corresponding axle member. The radial isolation component can be configured to operatively bend under the horn-life range of sonic frequencies. Each axial isolation component can be operatively joined to an operative portion of a corresponding radial isolation component, and can be configured to extend at least axially from its corresponding radial isolation component. The axial isolation component can be configured to operatively bend under the horn-life range of sonic frequencies.

The various aspects, features and configurations of the method and apparatus of the invention can provide a distinctive, rotary ultrasonic horn system which includes a corresponding wave-guide and at least one isolation member which has high rigidity and stiffness. The isolation member can operably isolate the radial motion that can arise at the longitudinal node of a wave-guide, and can provide sufficient bandwidth to compensate for nodal shifts that can occur during ordinary operation. The isolation member can also provide improved stiffness to reduce deflections under load. The increased stiffness can help maintain concentricity, and help to reduce run-out displacements. Additionally, the isolation member can more efficiently transmit torque and can provide improved effectiveness and efficiency. The isolation member can also be configured to reduce stress concentrations and to increase fatigue resistance, and can provide for a mounting system that can reduce relative motions between component parts. The method and apparatus of the invention can reduce the need for elastomeric isolation components, and can eliminate the need for conventional elastomeric O-rings and associated isolation-ring hardware. The method and apparatus can also reduce the need for torque transmission keys, and can avoid the use of auxiliary support wheels for maintaining the desired locations of the rotary horn and rotary anvil.

Additionally, the adjustment system can be configured to more effectively modify the nip region or other ultrasonic processing zone between the rotary horn and rotary anvil. Particular arrangements can provide an adjustment can allow a more efficient and more accurate adjustment of a nip gap region between the horn and anvil. The adjustment system can be further configured to provide an active regulation of the nip region, and the regulation can be provided during the operation of the method and apparatus. The adjustment system of the method and apparatus can be provided in a continual manner, and the regulation of the nip gap region can be conducted without the use of a hard-stop component. Additionally, the ability to selectively modify the nip gap can help compensate for changes in the method and apparatus that can occur during the processing operation. Such changes can be cause by mechanical wear, temperature variations, variations in the work material being bonded, and the like. The ultrasonic processing configurations provided by the method and apparatus of the present invention can also advantageously accommodate operations which employ a desired, fixed-gap between a rotary horn and a rotary anvil. The ultrasonic processing configurations can further provide a controlled regulation of a selected processing force, and an automatic adjustment of a processing gap region. In addition, the ultrasonic processing configurations provided by the present invention can also provide improved performance when conducting a desired, intermittent processing operation, such as intermittent bonding.

BRIEF DESCRIPTION OF THE DRAWINGS

The invention will be more fully understood and further advantages will become apparent when reference is made to the following detailed description of the invention and to the drawings in which:

FIG. 6A shows a schematic view of a cross-section through an arrangement wherein the horn member and isolation member are rotatably mounted with a plurality of support bearings;

FIG. 10 shows a schematic view of a cross-section through a configuration of a horn member and isolation member wherein the isolation member has an axial isolation component which is separately provided from the radial isolation component, and the axial isolation component is integrally formed with a cooperating coupler;

FIG. 10A shows a schematic view of a cross-section through another configuration of a horn member and isolation member wherein the isolation member has an axial isolation component which is separately provided from the radial isolation component, and the axial isolation component is integrally formed with a cooperating coupler;

FIG. 10B shows a schematic view of a cross-section through a configuration of a horn member and isolation member wherein the isolation member has an axial isolation component which is integrally provided with the radial isolation component, and the isolation member is integrally formed with a cooperating coupler;

FIG. 10C shows a schematic view of a cross-section through a configuration of a horn member and isolation member wherein a cooperating coupler is press-fitted into the axial isolation component of the isolation member;

FIG. 14 shows a representative, perspective view of a horn member and cooperating anvil member in a configuration that can be employed with a method and apparatus of the invention;

FIG. 15 shows a representative end view of the apparatus and method illustrated in FIG. 14;

FIG. 17 shows an enlarged, schematic, side view of a representative gap region between a horn member and a cooperating anvil member;

FIG. 17A shows an enlarged, schematic, side view of an adjusted, reduced gap region between a horn member and a cooperating anvil member;

FIG. 25 representatively shows a system configured with a selected anvil member for providing a selected array of bonds arranged in an intermittent pattern distributed along a web of target work material;

FIG. 25D representatively shows a system configured with an alternative anvil member to provide a selected array of bonds arranged in an intermittent pattern distributed along a web of discontinuous target work material;

FIG. 26 shows a representative schematic view of an electronically controlled system for automatically regulating a processing force and process gap in a processing system arranged to provide a selected array of bonds arranged in a discontinuous, intermittent pattern that is distributed along a web of target work material;

DETAILED DESCRIPTION OF THE INVENTION

Figure 1:
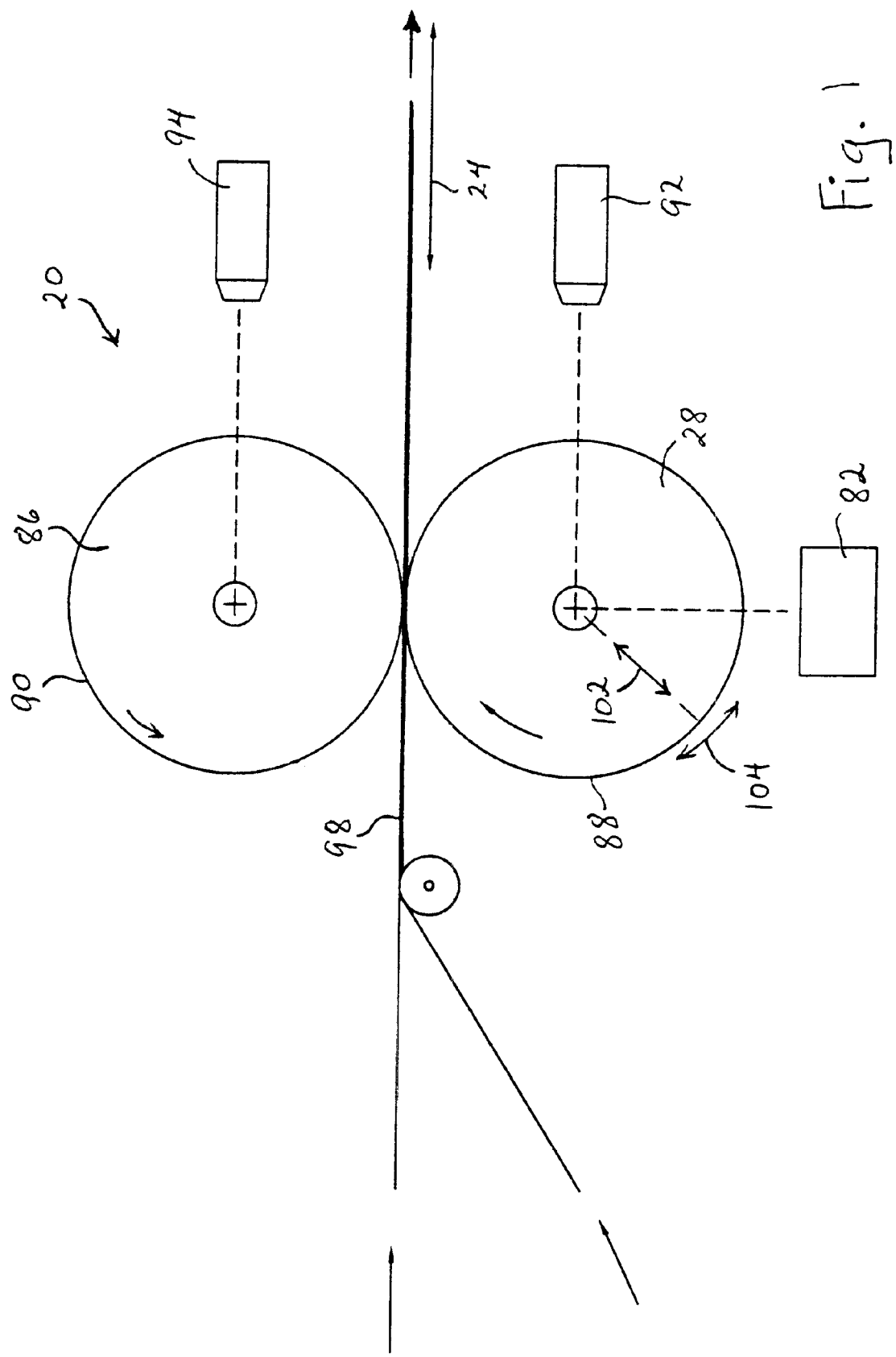
FIG. 1 shows a schematic, side view of a representative method and apparatus that may incorporate the present invention.

The method and apparatus that incorporates the present invention can be employed with any operative ultrasonic processing operation. Representative examples of such processing operations can include ultrasonic cutting, perforating, bonding, welding, embossing, crimping, heat activation or the like, as well as combinations thereof.

In the present disclosure, the terms "bonding" and "welding" may be used interchangeably, and refer to the substantially permanent joining of at least one layer of a material with another layer of a like or different material. The nature of the materials to be bonded is not known to be critical. However, the present invention is particularly useful in the bonding of two or more layers of materials, such as woven fabrics, nonwoven fabrics, and films.

The term "fabric" is used broadly in the present disclosure to mean a sheet or web of a woven or nonwoven fibrous material. The fabric or film layer may be continuous, as in a roll, or may be discontinuous.

The materials ultrasonically processed by the method and apparatus may include thermoplastic polymers or other thermoplastic materials. Alternatively, the processed materials may not include a thermoplastic material.

The representative configurations of the method and apparatus will, for example, be disclosed and described with reference to an ultrasonic bonding operation. It should be apparent that an adequate bonding or welding can be achieved by a variety of mechanisms. For example, the bond can result from the partial or complete melting in the bonding zone of all of the materials to be bonded. In this case, there is partial or complete fusion in the bonding area of such materials. Alternatively, the bond can result from the partial or complete melting of one of the materials to be bonded, with the partially or completely melted material flowing into or onto adjacent materials which in turn results in a mechanical interlocking of one material with another.

The present disclosure will be expressed in terms of its various components, elements, constructions, configurations and arrangements that may also be individually or collectively be referenced by the terms, "aspect(s)" of the invention, feature(s) of the invention, or other similar terms. It is contemplated that the various forms of the disclosed invention may incorporate one or more of its various features and aspects, and that such features and aspects may be employed in any desired, operative combination thereof.

It should also be noted that, when employed in the present disclosure, the terms "comprises", "comprising" and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

The technology of the invention can be configured to produce various types of desired articles. Such articles may, for example, be gowns, covers, wraps, drapes, garments, packaging or the like. The articles may also be absorbent articles, and the absorbent articles may include infant diapers, children's training pants, feminine care articles, adult incontinence garments, and the like. The articles may be disposable, and intended for limited use. Typically, the disposable articles are not intended for washing and reuse.

Figure 2:
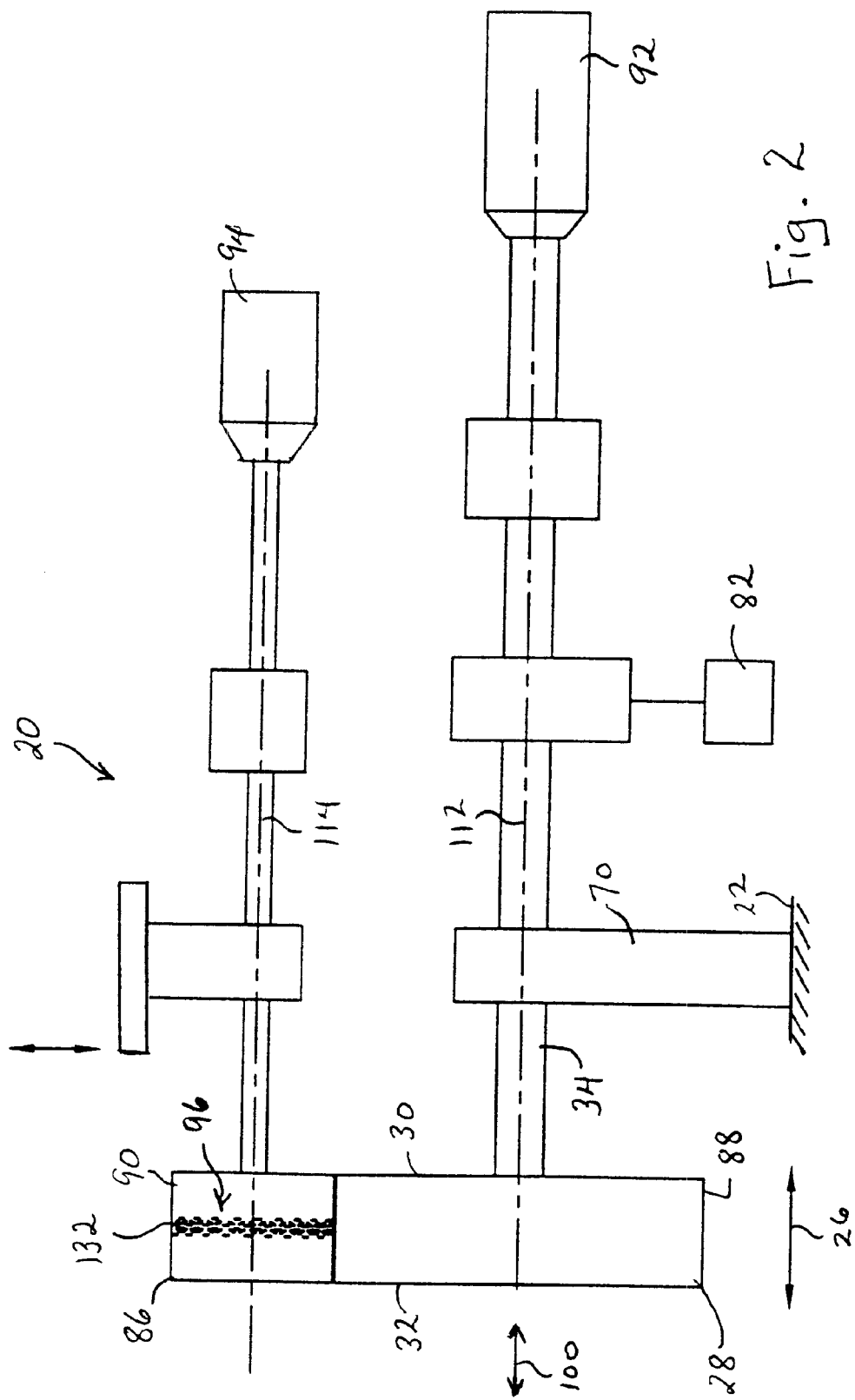
FIG. 2 shows a schematic, end view of a representative method and apparatus that may incorporate the present invention.

With reference to FIGS. 1 and 2, the process and apparatus of the invention can have a lengthwise, machine-direction 24 which extends longitudinally, a lateral cross-direction 26 which extends transversely, and a z-direction. For the purposes of the present disclosure, the machine-direction 24 is the direction along which a particular component or material is transported length-wise along and through a particular, local position of the apparatus and method. The cross-direction 26 lies generally within the plane of the material being transported through the process, and is aligned perpendicular to the local machine-direction 24. The z-direction is aligned substantially perpendicular to both the machine-direction 24 and the cross-direction 26, and extends generally along a depth-wise, thickness dimension.

Figure 5:
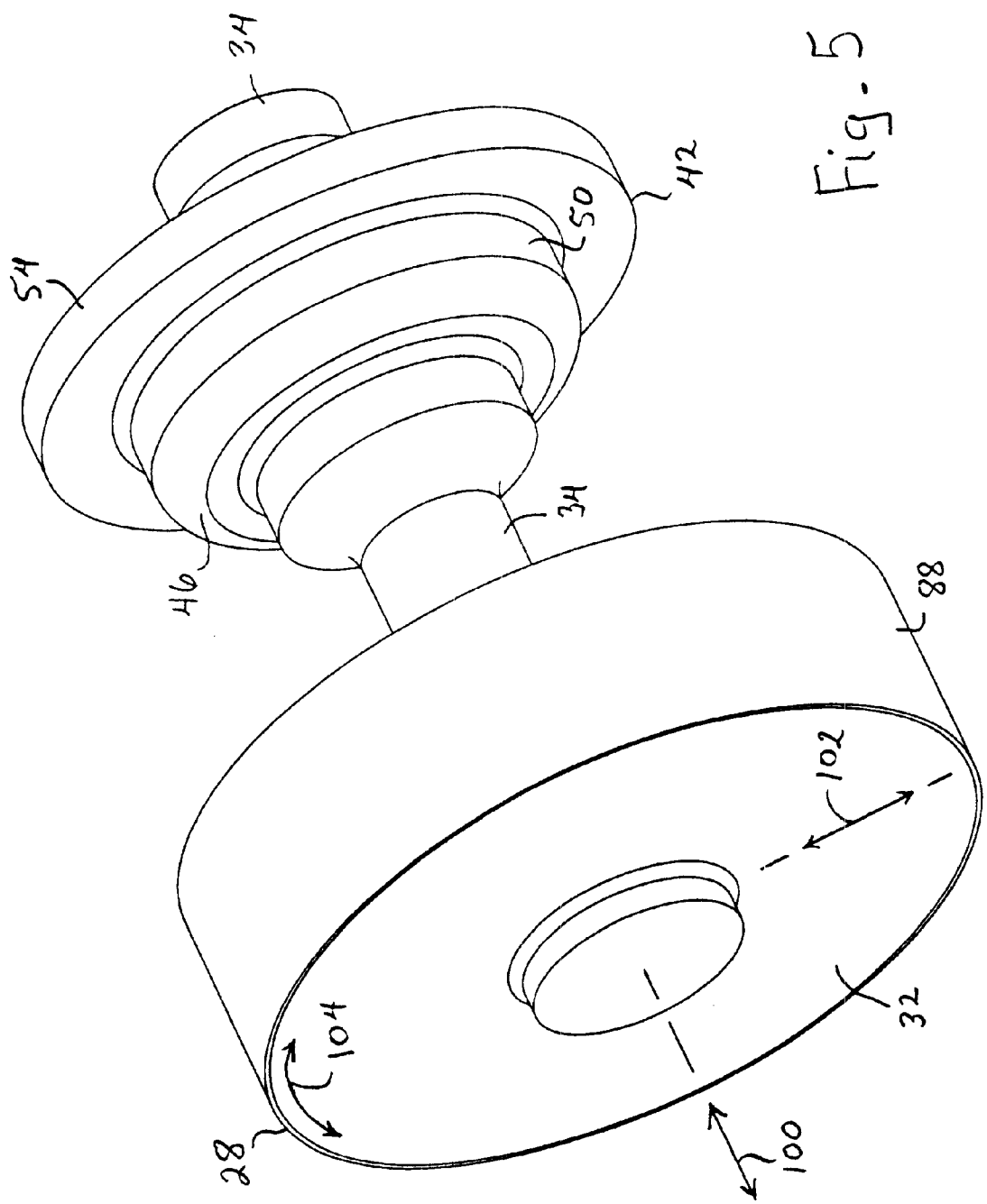
FIG. 5 shows a representative, perspective view of another horn member and isolation member that can be employed with the method and apparatus of the invention.

With reference to FIGS. 1, 2 and 5, the various components employed with the method and apparatus can have an axial direction 100, a radial direction 102, and a circumferential direction 104. The axial direction 100 extends along an appointed rotational axis of a selected component or member. The radial direction 102 extends radially from the rotational axis, and is substantially perpendicular to the rotational axis of the selected component or member. The circumferential direction 104 is directed along an orbital path around the rotational axis of the selected component or member, and is aligned substantially perpendicular to the radial direction 102 and substantially perpendicular to the axial direction 100.

As illustrated in FIGS. 1 and 2, a representative method and apparatus 20 for ultrasonically processing a target material 98 can include a rotary, ultrasonic horn member 28, and a cooperating, rotary ultrasonic anvil member 86. In a particular configuration, the method and apparatus can be arranged to provide a bonding operation. The rotatable anvil member 86 can be cooperatively positioned proximate the horn member 28, and an ultrasonic power source or exciter 82 can be operatively connected to the horn member. Typically, the horn member and anvil member can be configured to counter-rotate with respect to each other, and provide a nip region therebetween where the ultrasonic bonding operation can be conducted. A suitable horn drive 92 can be configured to rotate the horn member, and a suitable anvil drive 94 can be configured to rotate the anvil member. The horn drive and anvil drive may be provided by individual, separately provided driving mechanisms, or may be provided by the same driving mechanism. In a particular arrangement, the horn member may be rotated by the selected driving mechanism, and the anvil member may be driven by a contact pressure that is generated in the nip region between the horn member 28, target work material 98 and anvil member 86. Suitable driving systems can include take-offs from a powered line shaft, motors, engines, electric motors or the like, as well as combinations thereof.

The rotatable anvil member 86 has a rotational axis 114, and can be rotated by its corresponding rotational drive 94 to provide a minimum, anvil speed at its outer peripheral surface 90. In a particular aspect, the anvil peripheral speed can be at least a minimum of about 5 m/min. The anvil peripheral speed can alternatively be at least about 7 m/min, and optionally, can be at least about 9 m/min to provide improved performance. In another aspect, the anvil peripheral speed can be up to a maximum of about 700 m/min, or more. The anvil peripheral speed can alternatively be up to about 600 m/min, and optionally, can be up to about 550 m/min to provide improved effectiveness. The anvil speed may be substantially constant, or may be non-constant or variable, as desired.

As representatively shown, the anvil member 86 can have a substantially circular, disk-shape, and an outer peripheral surface 90 of the anvil member may be substantially continuous. Alternatively, the anvil member may have a non-circular shape. Additionally, the outer peripheral surface of the anvil member may be discontinuous. Optionally, the anvil member may have a shape composed of one or more spoke or lobe members, and the spoke or lobe members may have the same size and/or shape, or may have different sizes and/or shapes.

The horn member 28 has a rotational axis 112, and can be rotated by its corresponding rotational drive 92 to provide a horn speed at its outer peripheral surface 88 which substantially equals the anvil peripheral speed. Optionally, the peripheral speed of the horn member 28 can be mismatched and unequal to the peripheral speed of the anvil member 86.

As representatively shown, the horn member 28 can have a substantially circular, generally disk-shape, and an outer peripheral surface 88 of the horn member may be substantially continuous. Optionally, the horn member may have a non-circular shape. Additionally, the outer peripheral surface of the horn member may have a discontinuous configuration.

An ultrasonic exciter 82 can be operatively connected to direct a sufficient amount of ultrasonic power into the horn member 28 through suitable, ultrasonic wave-guides, booster members, and connection/transmission components. Suitable ultrasonic exciters, ultrasonic connectors, ultrasonic boosters and ultrasonic wave-guides are well known in the art and are available from commercial vendors.

With reference to FIGS. 3 through 9, a desired method and apparatus 20 for bonding or other processing can include a rotatable ultrasonic horn member 28 and a rotatable axle member 34. The horn member can have a first axial side 30 and a second axial side 32. The axle member can be operatively joined to the horn member 28, and an isolation member 42 can be operatively connected to the horn member 28. In a particular aspect, the isolation member 42 is capable of dynamically flexing and bending under a horn-life range of sonic frequencies to provide an operative component of motion along a radial direction 102 of the isolation member, and can provide an operative component of motion along an axial direction 100 of the isolation member.

With reference to FIGS. 11 through 15, the processing method and apparatus 20 can include a rotatable ultrasonic horn member 28. The first axial side 30 of the horn member 28 can be operatively joined to the first rotatable axle member 34, and the first axle member 34 can be operatively joined to the first isolation member 42. In a desired feature, the first isolation member can exhibit high rigidity. In another feature, the first isolation member 42 is capable of bending under a horn-life range of sonic frequencies to provide an operative component of motion along its radial direction 102 and an operative component of motion along its axial direction 100. The second axial side 32 of the horn member 28 can be operatively joined to a second rotatable axle member 36, and the second axle member 36 can be operatively joined to a second isolation member 44. In a desired feature, the second isolation member can exhibit high rigidity. In another feature, the second isolation member 44 is capable of bending under the horn-life range of sonic frequencies to provide an operative component of motion along a radial direction of the second isolation member 44, and an operative component of motion along an axial direction of the second isolation member 44.

With further reference to FIGS. 17 through 26A, an ultrasonic processing method and apparatus 20, can include a rotatable, ultrasonic horn member 28 having a first axial side 30 and a second axial side 32. A first, rotatable axle member 34 can be operatively joined to the first axial side 30 of the horn member 28. A first isolation member 42 can be operatively joined to the first axle member 34, and the first isolation member 42 can be capable of bending under a horn-life range of sonic frequencies to provide an operative component of motion along a radial direction 102 of the first isolation member 42 and an operative component of motion along an axial direction 100 of the first isolation member 42. A first coupler 58 can connect between the first isolation member 42 and a first, fixedly mounted rotational bearing 66, and the first coupler 58 can be operatively secured to the first isolation member 42. A rotatable anvil member 86 can be cooperatively positioned to provide a selected horn-anvil gap 106 between the anvil member 86 and the horn member 28. An ultrasonic exciter 82 can be connected to provide an operative amount of ultrasonic energy to the horn member 28. An actuator 110 or other transfer device can be configured selectively adjust the horn-anvil gap 106, and an automated drive 130 can be operatively connected to the actuator 110 to automatically modify the horn-anvil gap 106. A force sensor 126 can be configured to detect an intermittent gap force at the horn-anvil gap 106. Additionally, an electronic processor 128 can be configured to employ an output from the force sensor 126 to monitor the intermittent gap force, and provide a drive signal to the automated drive 130 to thereby adjust the horn-anvil gap 106 to operatively maintain a target, intermittent gap force value.

In other aspects, the axle member 34 can provide a node plane 38, and the isolation member 42 can be located operatively proximate the node plane of the axle member. As illustrated in the representatively shown configuration, the axle member 34 can be configured to provide by an operative wave-guide which can direct ultrasonic energy from a suitable ultrasonic power source to the horn member.

In a like manner, the second axle member 36 can provide a second node plane 40, and the second isolation member 44 may be located operatively proximate the second node plane 40 of the second axle member 36. In particular configurations, the second axle member 36 can be configured to provide an operative wave-guide which can direct ultrasonic energy from a suitable ultrasonic power source to the horn member (e.g. FIG. 13A).

In particular configurations the axle member 34 may provide a node plane and/or an anti-node plane. The isolation member 42 may be positioned substantially at or closely adjacent its corresponding node plane; may be positioned substantially at or closely adjacent its corresponding anti-node plane; or may be positioned at a location that is spaced away from its corresponding node plane or anti-node plane; as desired.

In a like manner, the second axle member 36 may provide a node plane and/or an anti-node plane. The second isolation member 44 may be positioned substantially at or closely adjacent its corresponding, second node plane; may be positioned substantially at or closely adjacent its corresponding anti-node plane; or may be positioned at a location that is spaced away from its corresponding node plane or anti-node plane; as desired.

In further aspects, the isolation member 42 can have high rigidity and stiffness, and can be substantially non-elastomeric. The dynamic bending of the isolation member can be substantially non-elastomeric, and can be provided by a mechanism that is substantially free of a component constructed with an elastomer, such as natural or synthetic rubber. In still other aspects, the isolation member can provide a generally cantilevered flexing and bending. Additionally, the isolation member can provide for an operative component of bending or flexure displacement which is directed transverse the radial direction of the isolation member, and can provide for an operative component of bending or flexure displacement which is directed transverse to the axial direction of the isolation member.

In a like manner, the second isolation member 44 can have high rigidity and stiffness, and can be substantially non-elastomeric. The dynamic bending of the second isolation member can be provided by a mechanism that is substantially free of an elastomeric component. In still other aspects, the second isolation member can provide a generally cantilevered flexing and bending. Additionally, the second isolation member can provide for an operative component of bending or flexure displacement which is directed transverse the radial direction of the second isolation member, and can provide for an operative component of bending or flexure displacement which is directed transverse to the axial direction of the second isolation member.

In still another aspect, the isolation member 42 can have a radial isolation component 46 and an axial isolation component 50. The radial isolation component 46 can be operatively joined to the axle member 34, and can be configured to extend at least, substantially radially from the axle member 34. In a particular aspect, the radial isolation component can extend from the axle member with a generally cantilevered configuration. The radial isolation component 46 can be configured to operatively flex and bend under the horn-life range of sonic frequencies. Additionally, the radial isolation component can dynamically bend to provide transverse displacements that are directed along a thickness dimension of the radial isolation component. Accordingly, a dynamic bending of the radial isolation component can swing generally along the axial direction of the isolation member.

The axial isolation component 50 can be operatively joined to an operative portion of the radial isolation component 46, and can be configured to extend at least axially from the radial isolation component 46. In a particular aspect, the axial isolation component can extend from the radial isolation component with a generally cantilevered configuration. The axial isolation component 50 can be configured to operatively flex and bend under the horn-life range of sonic frequencies. Additionally, the axial isolation component can dynamically bend to provide transverse displacements that are directed along a thickness dimension of the axial isolation component. Accordingly, a dynamic bending of the axial isolation component can swing generally along the radial direction of the isolation member.

In a like manner, the second isolation member 44 can have a corresponding radial isolation component 48, and a corresponding axial isolation component 52. The second, radial isolation component 48 can be operatively joined to its corresponding, second axle member 36, and can be configured to extend at least, substantially radially from the axle member 36. In a particular aspect, the second radial isolation component can extend from its corresponding axle member with a generally cantilevered configuration. The second radial isolation components 48 can be configured to operatively flex and bend under the horn-life range of sonic frequencies. Additionally, the second radial isolation component 48 can dynamically bend to provide transverse displacements that are directed along a thickness dimension of the radial isolation component 48. Accordingly, a dynamic bending of the second radial isolation component can swing generally along the axial direction of the second isolation member.

The second, axial isolation component 52 can be operatively joined to an operative portion of its corresponding, second radial isolation component 48, and can be configured to extend at least axially from the second radial isolation component. In a particular aspect, the second axial isolation component 52 can extend from its corresponding, second radial isolation component 48 with a generally cantilevered configuration. The second, axial isolation component 52 can be configured to operatively flex and bend under the horn-life range of sonic frequencies. Additionally, the second axial isolation component can dynamically bend to provide transverse displacements that are directed along a thickness dimension of the second axial isolation component. Accordingly, a dynamic bending of the second axial isolation component can swing generally along the radial direction of the second isolation member.

The various aspects, features and configurations of the method and apparatus, taken alone or in combination, can provide a distinctive, rotary ultrasonic horn system which includes a corresponding wave-guide, such as provided by the axle member 34, and at least one isolation member 42 that has high rigidity and stiffness. The isolation member can operably isolate the radial motion that can arise at the longitudinal node of the wave-guide, and can provide sufficient bandwidth to compensate for nodal shifts that can occur during ordinary operation. In particular, the isolation member can compensate for changes in the real-time location of the actual nodal plane that arises during the actual transfer of ultrasonic energy through the wave-guide. The isolation member can also provide improved stiffness to reduce deflections under load. The increased stiffness can help maintain concentricity, and help to reduce run-out displacements at the working surface of the horn member. Additionally, the isolation member can more efficiently transmit torque to the horn member, and can provide improved effectiveness and operating efficiency. The isolation member can also be configured to reduce stress concentrations and to increase fatigue resistance. Additionally, the isolation member can provide for a mounting system that can reduce relative motions between component parts. The method and apparatus can eliminate the need for elastomeric isolation components, such as conventional elastomeric O-rings and associated isolation ring hardware. The method and apparatus can also reduce the need for torque transmission keys, and can avoid the use of auxiliary support wheels for maintaining the desired locations of the rotary horn and rotary anvil.

Additionally, the adjustment system can be configured to more effectively modify the nip region or other ultrasonic processing zone between the rotary horn and rotary anvil. Particular arrangements can provide an adjustment can allow a more efficient and more accurate adjustment of a nip gap region between the horn and anvil. The adjustment system can be further configured to provide an active regulation of the nip region, and the regulation can be provided during the operation of the method and apparatus. The adjustment system of the method and apparatus can be provided in a continual manner, and the regulation of the nip gap region can be conducted without the use of a hard-stop component. Additionally, the ability to selectively modify the nip gap can help compensate for changes in the method and apparatus that can occur during the processing operation. Such changes can be cause by mechanical wear, temperature variations, variations in the work material being bonded, and the like. The ultrasonic processing configurations provided by the method and apparatus of the present invention can also advantageously accommodate operations which employ a desired, fixed-gap between a rotary horn and a rotary anvil. The ultrasonic processing configurations can further provide a controlled regulation of a selected processing force, and an automatic adjustment of a processing gap region. In addition, the ultrasonic processing configurations provided by the present invention can also provide improved performance when conducting a desired, intermittent processing operation, such as intermittent bonding. Horn members that can be employed in the method and apparatus are well known in the art. For example, suitable rotary ultrasonic horn members are disclosed in U.S. Pat. No. 5,096,532 entitled ULTRASONIC ROTARY HORN by Joseph G. Neuwirth et al. which issued Mar. 17, 1992; U.S. Pat. No. 5,110,403 entitled HIGH EFFICIENCY ULTRASONIC ROTARY HORN by Thomas D. Ehlert et al. which issued May 5, 1992; and in U.S. Pat. No. 5,087,320 entitled ULTRASONIC ROTARY HORN HAVING IMPROVED END CONFIGURATION by Joseph G. Neuwirth which issued Feb. 11, 1992. The entirety of each of these documents is incorporated herein by reference, in a manner that is consistent herewith.

The incorporation of one or more wave-guides, such as provided by the axle member 34, is also well known in the art. The construction and arrangement of a suitable wave-guide is conventional, and can be conducted with commonly understood engineering techniques that are employed for ultrasonic processing systems, such as ultrasonic bonding systems.

For the present disclosure, the node plane of the selected wave-guide is a longitudinal node located along the axial direction of the method and apparatus. At the node plane, approximately zero longitudinal (e.g. axial) displacements are present during ordinary operation with the selected ultrasonic excitations. Radial displacements, however, can continue to occur at the longitudinal node.

Rotatable anvil members that can be employed in the method and apparatus are well known in the art, and are available from commercial vendors. Examples of such vendors include Sonobond, a business having offices located in West Chester, Pa.; and Branson Ultrasonics, a business having offices located in Danbury, Conn.

Conventional ultrasonic exciters and power sources can be employed in the method and apparatus of the invention, and are available from commercial vendors. Examples of suitable ultrasonic power systems include a Model 20A3000 system available from Dukane Ultrasonics, a business having offices located in St. Charles, Ill.; and a Model 2000CS system available from Herrmann Ultrasonics, a business having offices located in Schaumburg, Ill. In a particular aspect, the method and apparatus can include an ultrasonic exciter 82 which is operatively connected to the horn member 28, and is capable of providing an operative amount of ultrasonic energy at a frequency within the range of about 15–60 KHz (Kilo-Hertz). It should be appreciated that other operative ultrasonic frequencies may also be employed.

With reference to FIGS. 3 through 6A, at least one region of the isolation member 42 can bend under the selected horn-life range of sonic frequencies to provide an operative component of beam-type, flexing or bending displacement which is aligned generally transverse to the radial direction of the isolation member. In a particular aspect, the isolation member can provide for one or more regions that can exhibit one or more dynamic bending and flexing displacements or movements that are directed generally along the axial direction of the isolation member. For example, the radial isolation component 46 of the isolation member can be configured to provide for one or more dynamic bending and flexing displacements that can swing back-and-forth in a path that extends generally along the axial direction of the isolation member. In a desired aspect, the isolation member can move in the manner of an oscillating diaphragm. In a more particular aspect the radial isolation component 46 can move in the manner of an oscillating diaphragm.

The isolation member can also provide for one or more regions that can exhibit one or more beam-type bending and flexing displacements or movements that are directed generally transverse to the axial direction of the isolation member. In a particular aspect, the isolation member can provide for one or more regions that can exhibit one or more dynamic bending and flexing displacements or movements that are directed generally along the radial direction of the isolation member. For example, the axial isolation component 50 can be configured to provide for one or more dynamic bending and flexing displacements that can vibrationally swing back-and-forth in a path that extends generally along the radial direction of the isolation member. It should be readily appreciated that, in additional to the described bending and flexing displacements exhibited by the isolation member 42, the isolation member may experience other dynamic motions that are typically induced during ordinary ultrasonic bonding operations.

In a like manner, the second isolation member 44 can bend under the horn-life range of sonic frequencies to provide an operative component of flexing and bending or other motion along the radial direction of the second isolation member, and can provide an operative component of flexing and bending or other motion along the axial direction of the second isolation member. The flexing and bending along the radial and/or axial direction can be provided without excessive fatigue of the second isolation member 44. Where the second isolation member 44 has particular radial and/or axial isolation components 48 and 52, each of the radial and/or axial isolation components can be configured to bend without excessive fatigue. It should be readily appreciated that the second isolation member 44 can cooperatively have a configuration and operation that is similar to those provided by the first isolation member 42. Accordingly, the various parameters and descriptions that are described with respect to the first isolation member 42 would also pertain to the second isolation member 44, as well as to any other additionally employed isolation members.

It has been discovered that the traversing, dynamic bending and flexing displacements that can be induced generally along the axial direction and/or radial direction can help compensate for any mismatch between the location of the isolation member and the location of the associated node plane. In a more particular aspect, the traversing dynamic bending and flexing displacements can help compensate for any mismatch between (a) the physical location at which the isolation member 42, 44 connects to its corresponding axle member 34, 36, respectively, and (b) the actual location of the corresponding dynamic node plane 38, 40 along the axial length of the corresponding axle member 34, 36, respectively. Such mismatches can occur during the operation of the method and apparatus due to shifts caused by changes in temperature, changes in ultrasonic-frequency, changes in the target work material or the like, as well as combinations thereof.

The dynamic flexing and bending displacements that are transverse to the radial and/or axial direction of the isolation member can desirably be provided without generating excessive fatigue of the corresponding isolation member. Where the particular isolation member has a discretely identifiable, radial isolation components 46, 48 and/or a discretely identifiable, axial isolation components 50, 52, each of such radial and/or axial isolation components can each be configured to bend without excessive fatigue by employing conventional parameters and design techniques that are well known in the art. For example, the length, thickness, elastic modulus, and other parameters can be selected and configured to provide the operative bending and fatigue resistance of the radial isolation component. Similarly, the length, thickness, elastic modulus, and other parameters can be selected and configured to provide the operative bending and fatigue resistance of the axial isolation component.

In a particular aspect, the isolation member can operate under its intended, ordinary operating conditions for a minimum of about 4000 hours without excessive fatigue failure. The isolation member can desirably provide a minimum ultrasonic operating life of about 5000 hours substantially without fatigue failure, as determined under its intended, ordinary operating conditions, and can more desirably provide a minimum ultrasonic operating life of about 6000 hours substantially without fatigue failure.

In a particular aspect, the isolation member can be configured such that during ordinary operation, the isolation member will be subjected to a stress level that is not more than about 10% of the yield strength of the isolation member. Alternatively, the isolation member can be configured such that during ordinary operation, the isolation member will be subjected to a stress level that is not more than about 1% of the yield strength of the isolation member.

The isolation member can be configured to operatively bend and swing back-and-forth under a horn-life range of sonic frequencies to provide an operative component of motion along a radial direction and an operative component of motion along an axial direction. The horn-life range of frequencies can be a range that is about ±3% of the nominal ultrasonic frequency. The nominal frequency is the target ultrasonic frequency at which the method and apparatus is intended to operate to perform the selected processing operation.

In the various configurations of the method and apparatus of the invention, the radial isolation component can extend discontinuously or substantially continuously along a circumferential direction of the isolation member. With reference to FIGS. 3 through 6A, the representatively shown radial isolation component 46 can be substantially disk-shaped, or can be substantially annular-shaped, as desired.

With reference to FIGS. 3 through 8, the axial isolation component 50 can be configured to provide a substantially axial extension from the radial isolation component 46. In the example of the representatively shown arrangement, the axial isolation component 50 can be configured to provide an extension which is directed along the axial direction from a radially outboard section of the radial isolation component 46. The axial isolation component can be configured to provide a discontinuous or a substantially continuous axial extension from the radial isolation component. Additionally, the axial isolation component can be configured to extend discontinuously, or substantially continuously along a circumferential direction 104 of the isolation member. In the example of the representatively shown configuration, the axial isolation component 50 can be substantially cylinder-shaped.

In the various configurations of the invention, the horn member, the associated axle member or members and the cooperating isolation member or members can be components that are separately provided and operatively attached together. Alternatively, the horn member, the associated axle member(s) and the cooperating isolation member(s) may be integrally formed from a single piece of material that is suitable for constructing ultrasonic bonding devices. For example, the horn member, axle members and isolation members can be machined from the same piece of bar stock.

With regard to the isolation member 42, the axial isolation component 50 and the radial isolation component 46 can be separately provided pieces that are operatively attached together, or may be integrally formed from the same piece of material that is suitable for constructing ultrasonic bonding devices. For example, the axial isolation component and the radial isolation component can be formed from the same piece of bar stock material.

In an alternative configuration, the axial isolation component 50 can be separate from the radial isolation component 46. In another feature, the axial isolation component may be integrally formed with a cooperating coupler member 58. An appointed section of the axial isolation component can then be attached and secured to the separately provided, cooperating radial isolation component 46. As representatively shown in FIG. 10, the radial isolation component may be press-fitted into the axial isolation component. As illustrated in FIG. 10A, the radial isolation component may be bolted or otherwise secured to the axial isolation component.

In an optional arrangement, the isolation member 42 can have an axial isolation component 50 which is integrally provided with the radial isolation component 46, and the isolation member can be integrally formed with its cooperating coupler, as representatively shown in FIG. 10B. The radial isolation component can be operatively attached to the axle member 34 with any suitable securement system.

Another arrangement of the isolation member 42 can have the cooperating coupler 58 press-fitted into the axial isolation component 50 of the isolation member 42, as illustrated in FIG. 10C. It should be readily appreciated that the axial isolation component 50, radial isolation component 46 and axle member 34 can additionally be interconnected together in any operative configuration.

The method and apparatus can include at least one, and optionally a plurality, of rotational couplers, such as provided by one or more couplers 58 and 60. In the various arrangements of the invention, each coupler can be configured to be operatively similar to some or all of the other couplers. Accordingly, the arrangements, structures features, operational features or other configurations that are described with respect to a particular coupler may also be incorporated by the other couplers.

As representatively shown in FIGS. 4 through 10C, the isolation member 42 can be joined to a rotatable coupler 58 which, in turn, can be supported by at least one rotational bearing 66 and associated mounting structure. Accordingly, the coupler 58 can interconnect between the isolation member 42 and the rotational bearing 66. In a desired configuration, the rotational bearing 66 and a corresponding mount 70 can fixedly hold and support the rotatable coupler 58. The bearing mount can be positioned generally adjacent the node plane of the axle member. Alternatively, the bearing mount can be spaced from the node plane of the axle member by a significant distance. As representatively shown, the bearing support mount 70 can be positioned generally adjacent the node plane 38 provided by the axle member 34.

Figure 9:
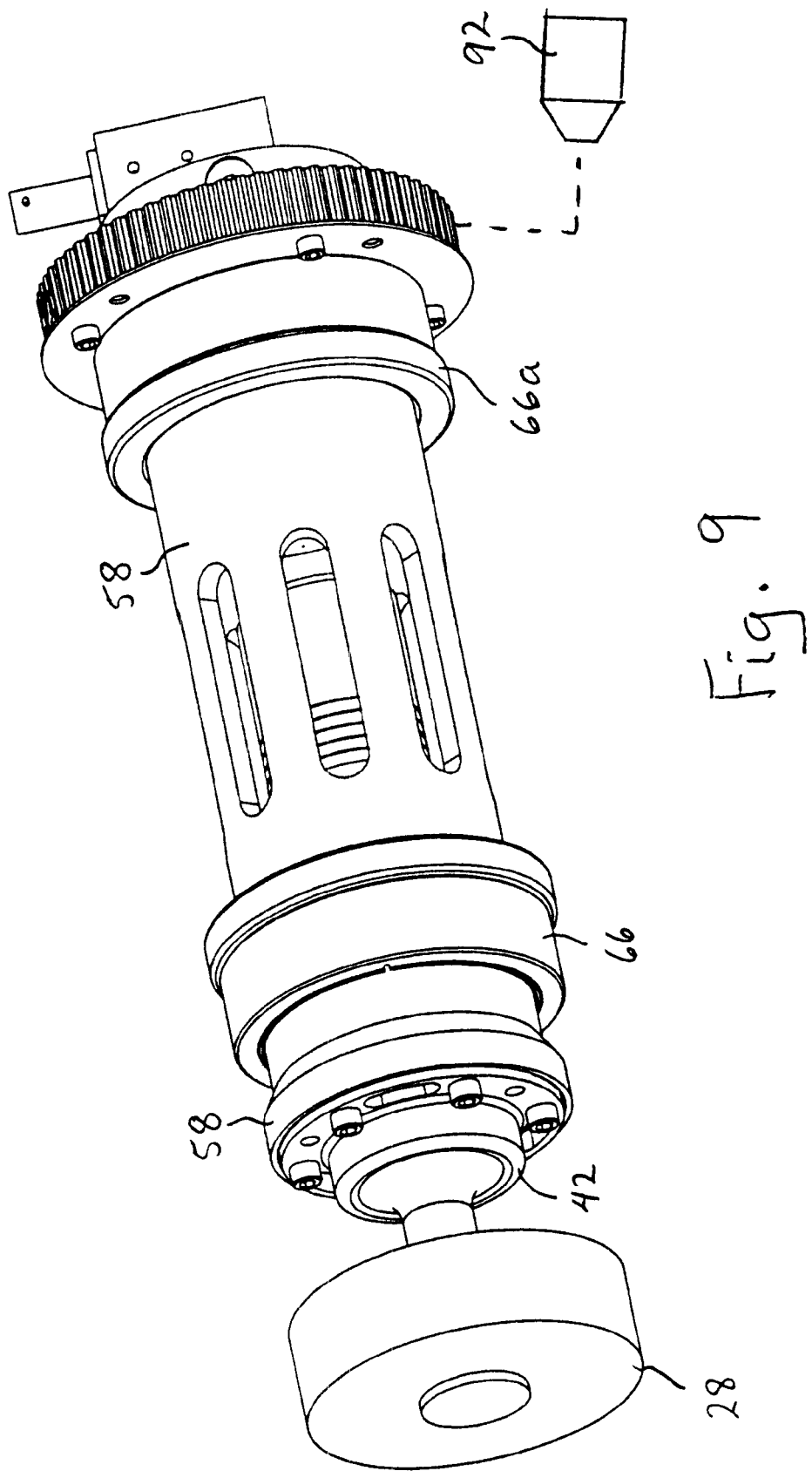
FIG. 9 a representative perspective view a horn member and isolation member which can be mounted with a pair of rigid, substantially non-resilient, support bearings.

With reference to FIGS. 6A and 9, the horn member 28 can be held in a cantilevered position with a plurality of bearing members 66 and 66a and associated support mounts 70 and 70a. The coupler 58 can be extended along its axial dimension, and a pair of bearing members can be arranged with one bearing member located proximate each axial end of the coupler. The bearing members can be attached to their corresponding support mounts in a manner that can hold the coupler in a substantially fixed position that exhibits high rigidity and stiffness. Appropriate booster members and wave-guides can be configured to extend through the coupler and operably connect to the axle member 34 and horn member 28.

In a particular aspect, the method and apparatus of the invention can be configured to provide a rotatable horn member 28 which exhibits a very low static deflection. In a desired configuration, the static deflection can be about 0.025 mm (about 0.0005 inch) or less, when subjected to a static force of 445 N (100 lb) which is directed against the outer peripheral surface 88 of the horn member 28 at a location that is centered along the axial dimension of the surface 88, and along the radial direction of the rotatable horn. In other configurations, the static deflection can be up to a maximum of about 0.76 mm (about 0.03 inch). The horn deflection can alternatively be not more than about 0.5 mm (about 0.02 inch), and can optionally be not more than about 0.3 mm (about 0.012 inch) to provide improved effectiveness. In a particular arrangement, the static deflection of the horn member can be not more than about 0.076 mm (about 0.003 inch).

Figure 12:
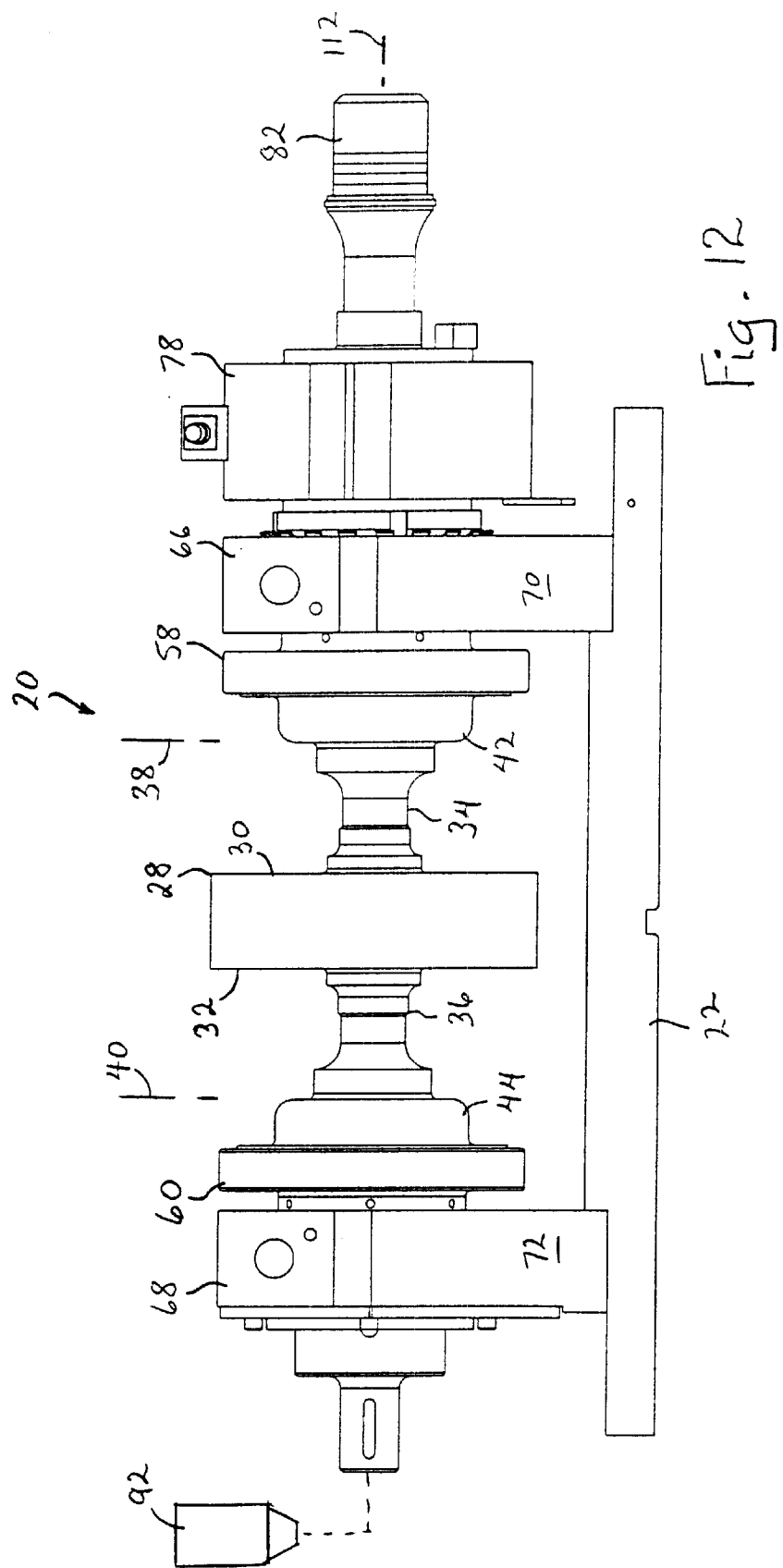
FIG. 12 shows a representative, end view of a horn member that has been mounted in a bridge configuration with a pair of isolation members that have high rigidity and stiffness.
Figure 13:
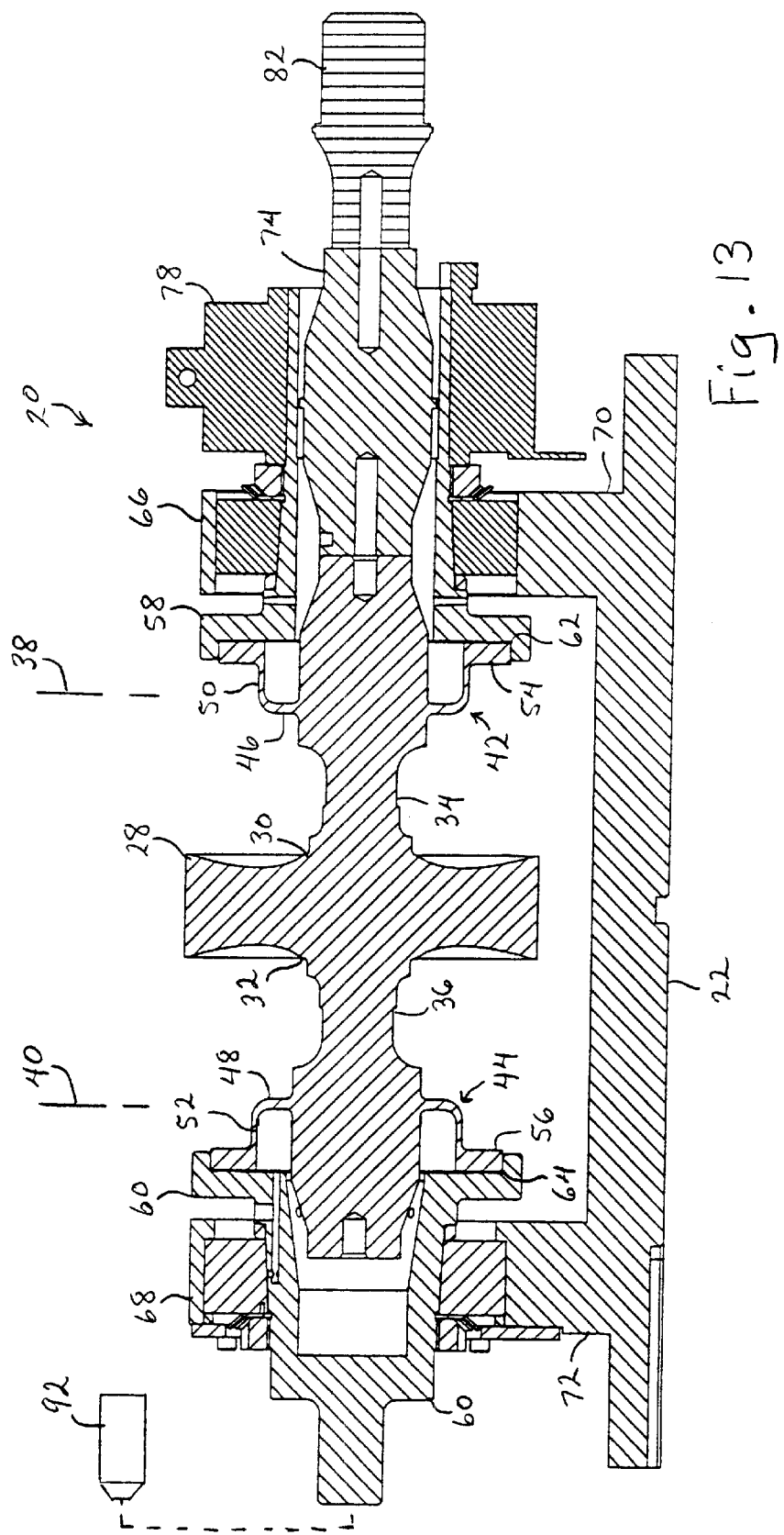
FIG. 13 shows a representative view of a cross-section through the horn member and dual isolation members that are illustrated in FIG. 12.

In another aspect, a second bearing support mount 72 can be employed to support the horn member in a spanning, bridge configuration (e.g. FIGS. 12 and 13). The second mount 72 may be positioned generally adjacent the second node plane 40 provided by the second axle member 36, and can fixedly hold and support the second rotatable coupler 60. Alternatively, the bearing mount can be spaced from the node plane of the axle member by a significant distance. As representatively shown, the second support mount 72 can be positioned generally adjacent the node plane 40 provided by the axle member 36.

The method and apparatus of the invention can additionally be configured to provide a rotatable horn member 28 which exhibits a static deflection of about 0.004 mm (about 0.00015 inch), or less, when subjected to a static force of 445 N (100 lb) which is directed onto the outer peripheral surface 88 of the horn member 28 at a location that is centered along the axial dimension of the surface 88, and along the radial direction of the rotatable horn. In particular aspects, the horn deflection can alternatively be about 0.002 mm or less, and can optionally be 0.001 mm or less. In other aspects, the horn deflection can be not more than a maximum of about 0.075 mm. The horn deflection can alternatively be not more than about 0.05 mm, and optionally, can be not more than about 0.01 mm to provide further improved performance.

The method and apparatus can further be configured to provide a rotatable horn member 28 which exhibits distinctively low level of dynamic run-out. In a desired feature, the horn run-out can be about 0.0025 mm (about 0.00001 inch) or less, at a rotational speed of 5 revolutions/minute. In a further feature, the horn member can exhibit a maximum run-out of not more than about 0.018 mm (about 0.0007 inch). The horn run-out can alternatively be not more than about 0.013 mm (about 0.0005 inch), and can optionally be not more than about 0.01 mm (about 0.0004 inch) to provide improved performance.

The configurations of the method and apparatus that have the rotary horn member 28 with high-rigidity isolation members 42, 44 disposed at axially opposed sides of the horn member are particularly capable of providing the desired low levels of horn deflection and run-out. Additionally, the high-rigidity holding of the isolation members 42, 44 in a substantially fixed position with the rotational bearings 66, 68 and their correspondingly associated support mounts 70, 72 can further help to provide and maintain the small amounts of horn deflection and run-out.

With reference to the aspects of the invention illustrated in FIGS. 3 through 6A, the isolation member 42 can have a generally annular-shaped, radial isolation component 46 which has high rigidity and stiffness, and is connected and attached to the wave-guide provided by axle member 34. The attachment is positioned at approximately the expected node plane of the wave-guide, axle member. A generally cylindrical-shaped axial isolation component 50 can have high rigidity and stiffness, and can be connected and attached to a distal outer edge region of the radial isolation component 46. The axial isolation component can extend from the radial isolation component in an inboard direction toward the horn member 28, or in an outboard direction away from the horn member. Alternatively, the axial isolation component can extend in both the inboard and outboard directions.

Figure 3:
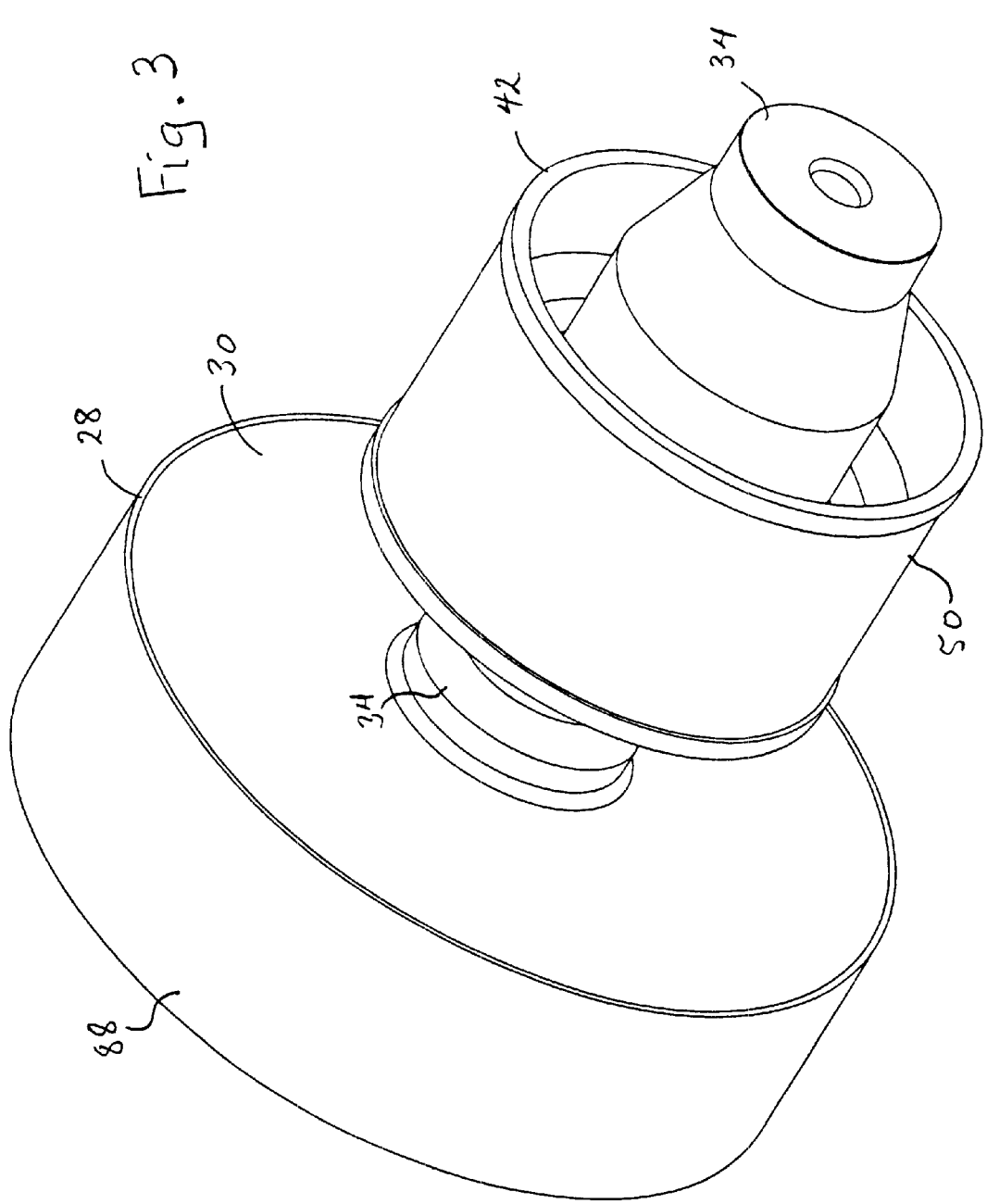
FIG. 3 shows a representative, perspective view of a representative horn member and isolation member that can be employed with the method and apparatus of the invention.
Figure 4:
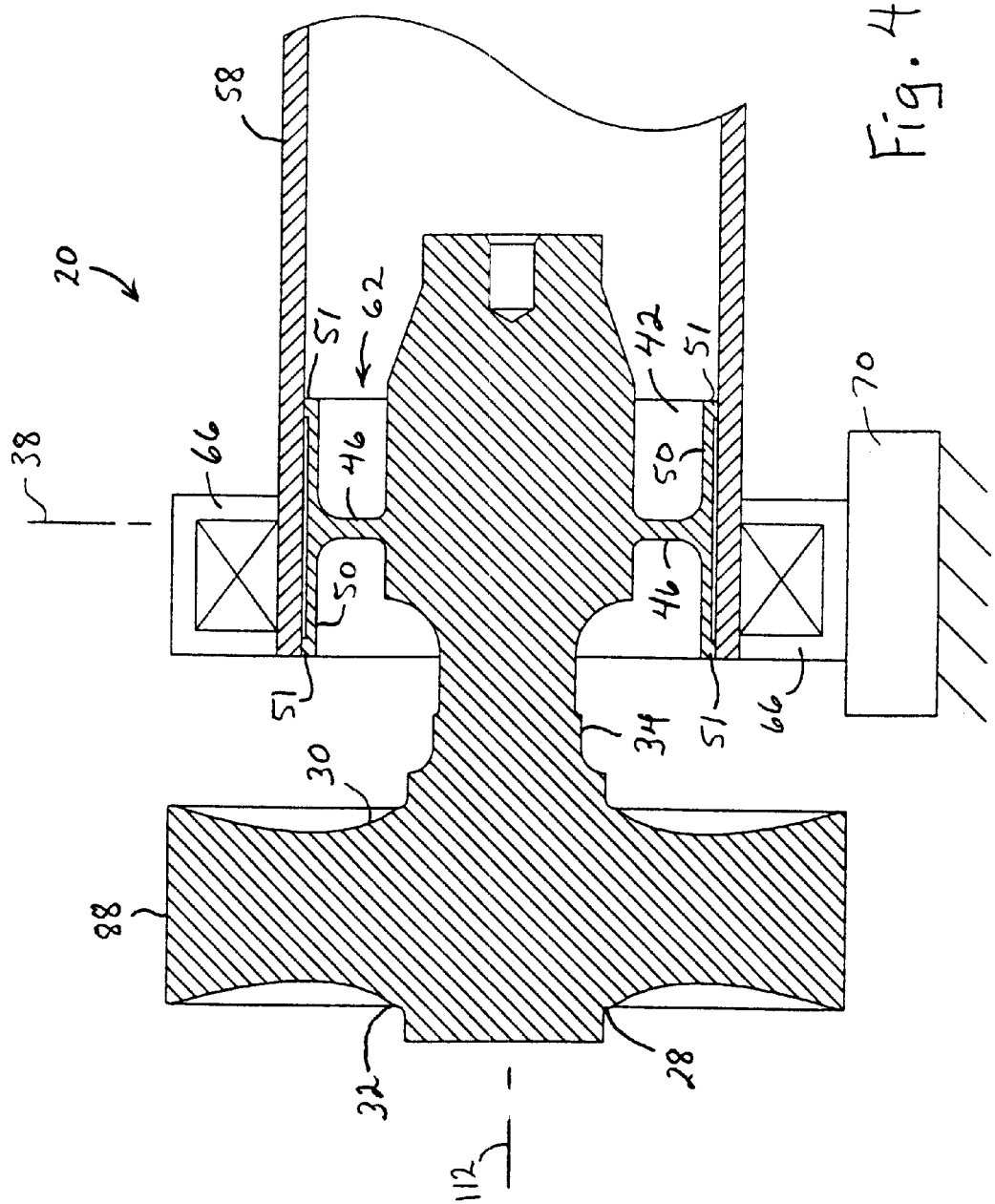
FIG. 4 shows a schematic view of a cross-section through a rotatably mounted configuration of the horn member and isolation member illustrated in FIG. 3.

As illustrated in the arrangements shown in FIGS. 3 and 4, the axial isolation component 50 may extend in both the inboard and outboard directions by substantially equal distances. Optionally, the axial isolation component may extend in both the inboard and outboard directions by different, unequal distances. The axial isolation component 50 can include one or more radially projecting, substantially annular spacers 51 which hold the axial isolation component at a spaced distance from its corresponding coupler 58. As representatively shown, each of a pair of spacers 51 can be located each opposed, axial end of the axial isolation component. The spaced distance is configured to allow an operative amount of dynamic, bending flexure of the axial isolation component.

Figure 6:
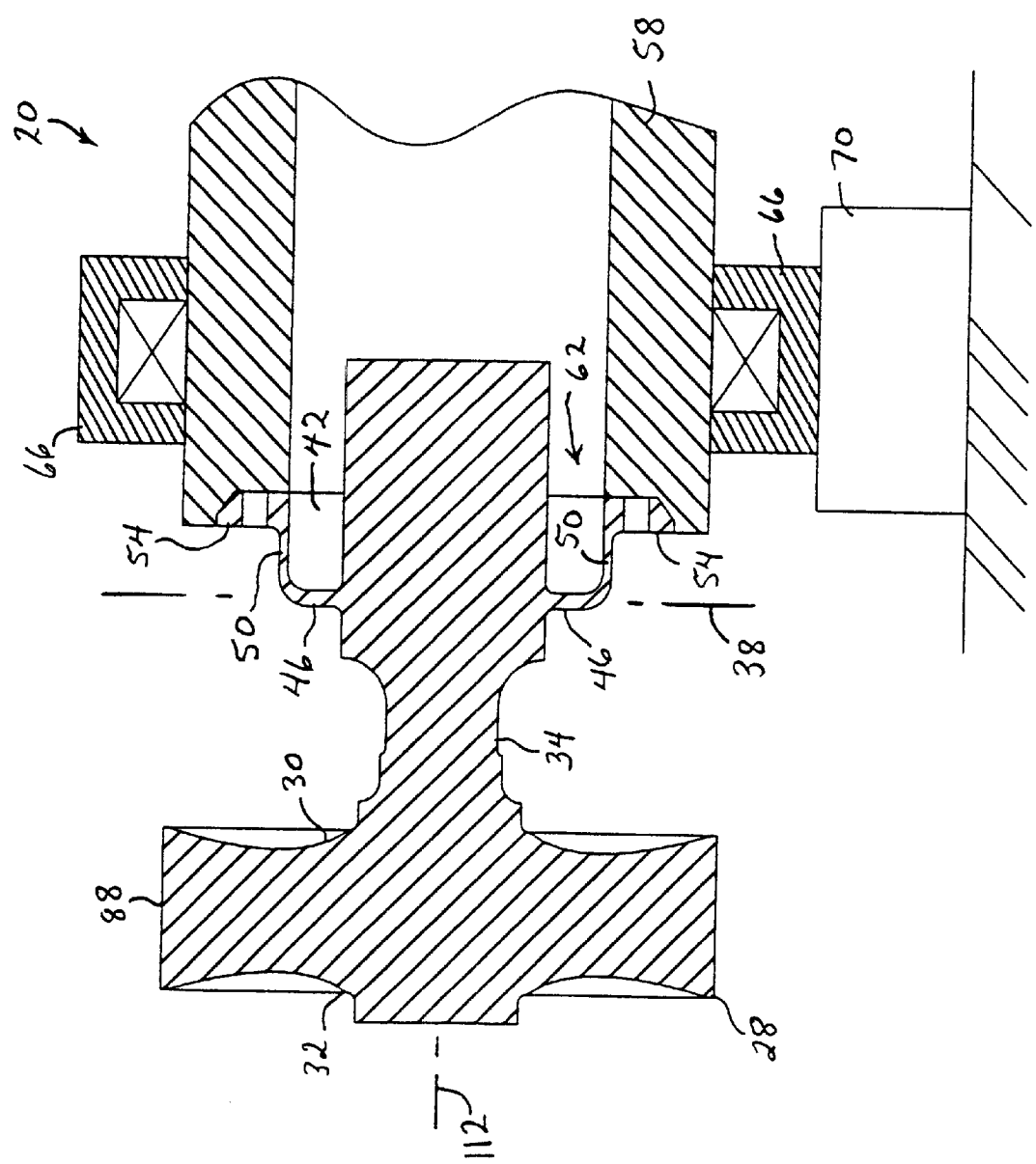
FIG. 6 shows a schematic view of a cross-section through a rotatably mounted configuration of the horn member and isolation member illustrated in FIG. 5.
Figure 7:
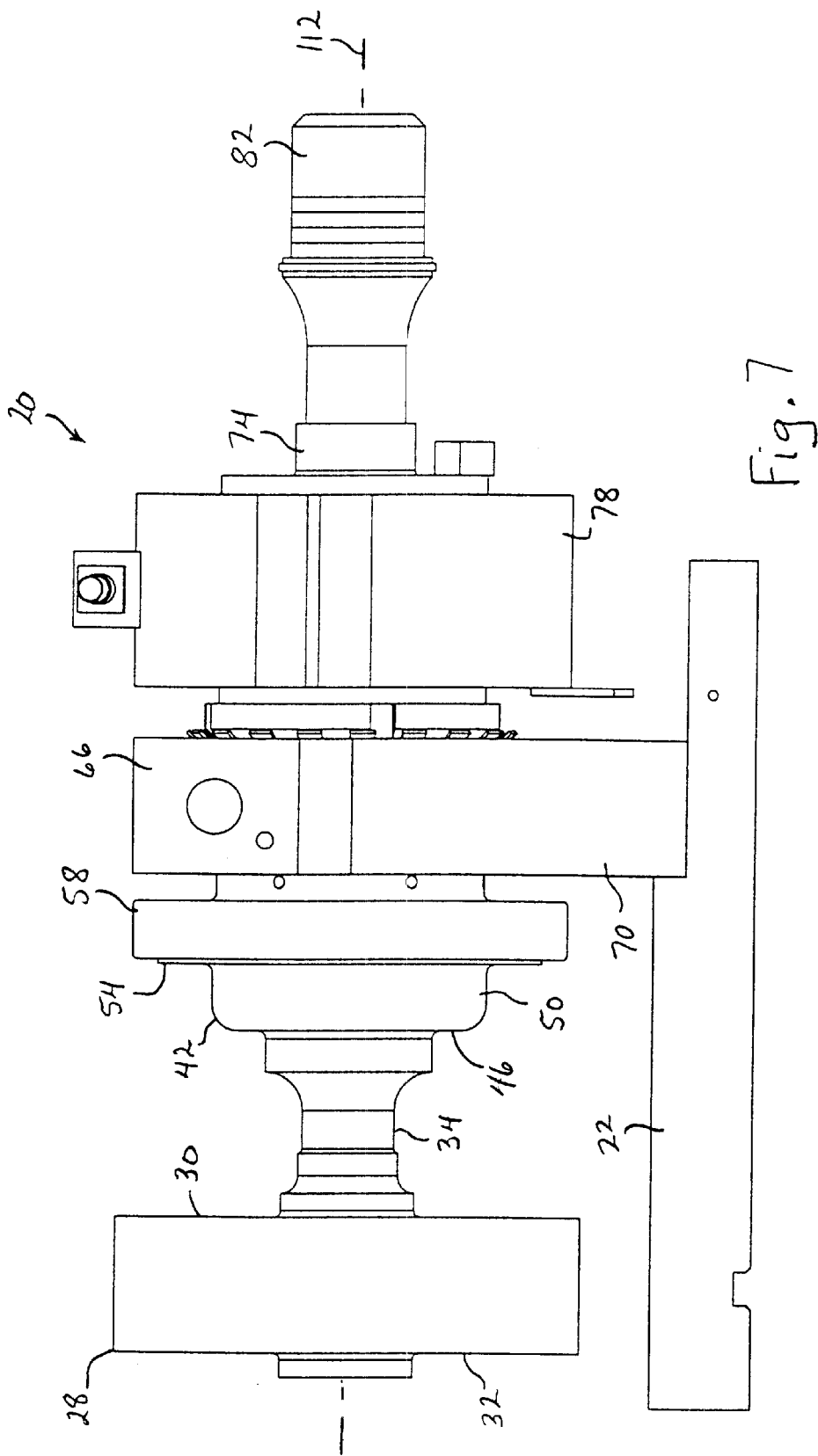
FIG. 7 shows a schematic side view of a representative horn member and isolation member mounted with associated components on a substantially non-resilient bearing.

With reference to the aspects of the invention illustrated in FIGS. 5, 6 and 6A, the isolation member 42 can include a generally annular-shaped, radial isolation component 46 which has high rigidity and stiffness, and is connected and attached to the wave-guide provided by axle member 34. The attachment is positioned at approximately the expected node plane of the wave-guide, axle member. A generally cylindrical-shaped axial isolation component 50 is configured to have high rigidity and stiffness, and is connected and attached to an outer edge region of the radial isolation component 46. The axial isolation component can extend from the radial isolation component in an outboard direction away from the horn member.

In the various arrangements of the method and apparatus, the configuration of the attachment or other operative connection between the axle member and its corresponding, connected isolation member can be substantially free of rubber or other elastomeric components. Accordingly, the attachment mechanism can provide an operative connection that has high rigidity and stiffness, and is substantially non-resilient.

The isolation member 42 can include a diaphragm-like element and a mounting flange 54. The diaphragm-like element can include a substantially continuous radial component 46 which has high rigidity and stiffness, and extends substantially radially from the axle member 34 or other wave-guide. Additionally, the radial component 46 can be positioned at approximately the nodal plane 38 of the axle member or other wave guide. The radial component can project radially outward with a length that can allow this radial component to operatively bend under normal horn-life frequency ranges without sacrificing fatigue life. Moving outward from the radial component, the structural shape of the isolation member 42 can transition to provide an axial component 50 which extends along the axial direction of the isolation member. As representatively shown, the axial component can have a generally cylinder-shape that projects substantially parallel to the rotational axis of the wave-guide or axle member 34.

The lengths of the radial and axial components of the isolation member 42 are long enough to allow these components to dynamically flex and bend through the normal range of radially and axially-directed motions that can arise at or near the node of a wave-guide during its intended operation. In particular, the axial length of the cylinder-shape can dynamically flex and bend through the normal range of radially directed motions that can arise at or near the node of a wave-guide. Such radially-directed motion can ordinarily arise from resonant oscillations caused by the ultrasonic energy directed into the horn member 28. The radial length of the diaphragm-shape can dynamically flex and bend through the normal range of axially-directed motions that can arise at or near the node of a wave-guide. Such axially-directed motion can also arise from resonant oscillations caused by the ultrasonic energy directed into the horn member 28. The combination of the dynamic bending movements of the radial and axial components of the isolation member can act to dampen the radial and axial motions induced in the horn 28 and wave-guide (e.g. axle member 34) during the normal, oscillatory expansions and contractions that are excited by the ultrasonic power source. The dampening can occur through the normal range of ultrasonic frequencies to which the horn 28 is subjected during ordinary operation.

At a selected region, such as at an extreme outer diameter of the isolation member 42, an operative fastening/affixing mechanism or method can be employed to attach and secure the isolation member to other components of the ultrasonic bonding system, such as the coupler 58. As representatively shown, for example, the fastening mechanism can be located at an extreme outer diameter of the axial isolation component 50. In one arrangement, the isolation member 42 (e.g. the axial isolation component 50 of the isolation member) can include an extending flange portion 54. As representatively shown, the joining flange 54 can include a generally radially extending section and may include a generally axially extending section. In a desired aspect, the joining flange can be operatively positioned and secured in the coupler opening 62. In another aspect, the coupler flange portion 54 can be operatively affixed to the coupler opening 62 by including an interference, friction-fit. The flange can, for example, be press-fit into a bore opening, such as that provided by the coupler opening 62, and may additionally or alternatively be held in place by fasteners.

Alternatively, an interference, friction-fit can be generated by heat-expanding the part having the appointed opening (e.g. coupler opening 62), and inserting into the expanded opening the component or component part that is intended to be captured or held (e.g. isolation member 42). When the heat dissipates, the opening can contract and help secure the inserted component.

In another fastening arrangement, the flange can be appropriately extended, as needed, and a clamping arrangement can be employed to hold the isolation member in place. Yet another fastening arrangement could incorporate a single extension having a surface suitable for clamping.

In a further aspect, the connecting flange can be substantially contiguously and integrally formed with its corresponding isolation member 42. Optionally, the flange may be a separately provided component that is subsequently affixed to the isolation member. Additionally, the isolation member can substantially continuously and integrally formed with its corresponding wave-guide or axle member 34. Accordingly, the horn can more accurately be held in a selected position, can better maintain a desired position when subjected to a much greater load. Additionally, a desired rotational driving torque can be more efficiently transmitted to the horn 28.

In a desired feature, the coupler can provide a holding and securing force that is distributed substantially evenly around the circumference of the axial isolation component. For example, the coupler can provide a substantially evenly distributed, compressive securing force that is directed substantially radially-inward against the axial isolation component. Optionally, the axial isolation component may provide a substantially evenly distributed, compressive securing force that is directed substantially radially-inward against the coupler.

The coupler 58 can provide a coupler opening 62 into which the first isolation member 42 is operatively positioned and secured. In a particular aspect, the axial isolation component 50 of the isolation member 42 can be operatively positioned and secured in the coupler opening 62 (e.g. FIGS. 4 and 6). For example, the coupler 58 can provide a substantially cylinder-shaped, coupler opening 62 into which the axial isolation component 50 of the isolation member 42 can be operatively positioned and secured. The isolation member may, for example, be press-fitted into the coupler opening.

Optionally, the axial isolation component can be configured to provide an isolation-member opening, and an operative end-portion of the coupler can be operatively positioned and secured in the isolation-member opening. For example, the coupler may be press-fitted into the opening of the isolation member.

Figure 8:
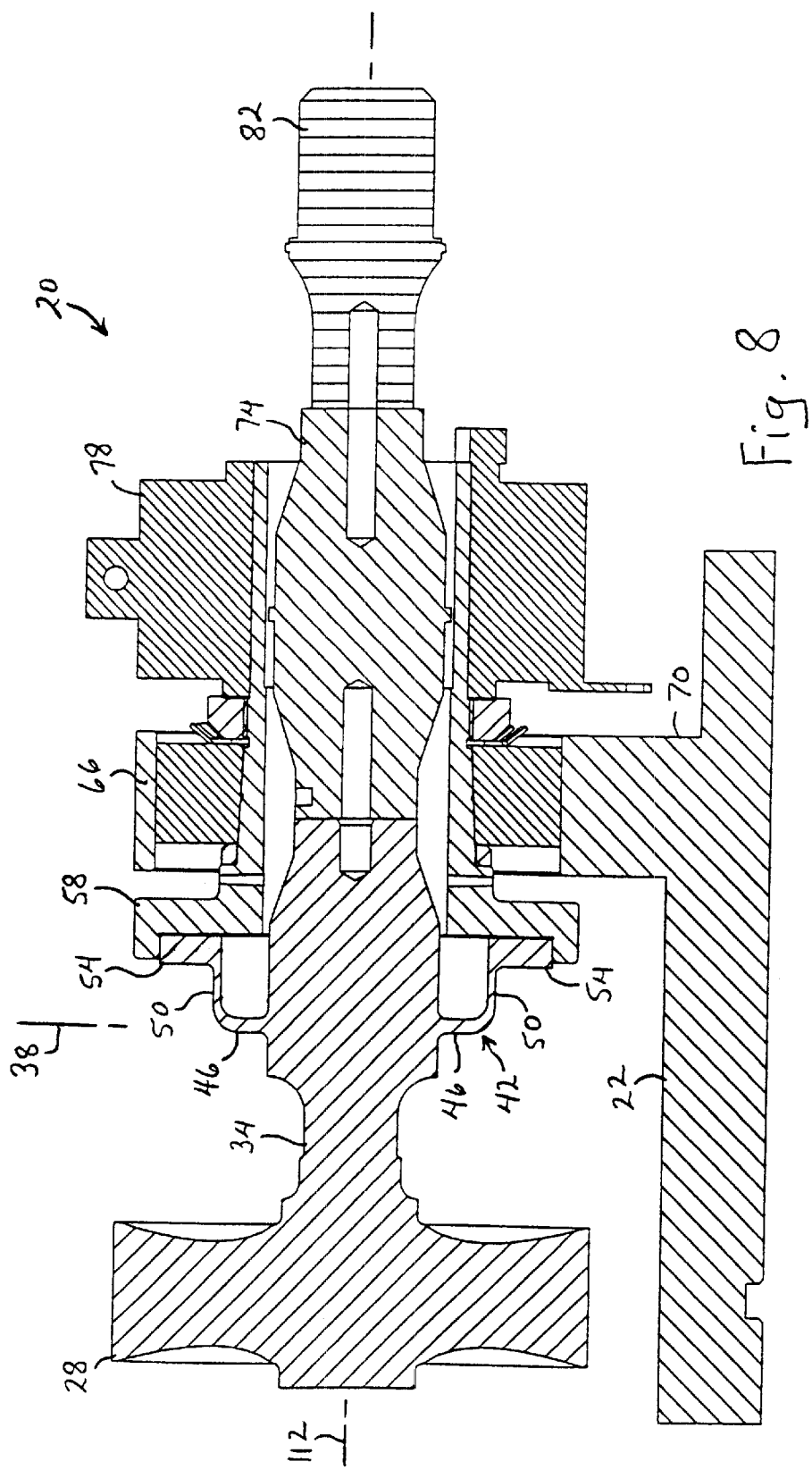
FIG. 8 shows a schematic view of a cross-section through the mounted horn member and isolation member illustrated in FIG. 7.

As representatively shown, the coupler 58 can be configured to provide a tube structure through which other components may be operably located and directed. With reference to FIGS. 4 and 8, for example, the axle member 34 can be co-linearly or coaxially arranged with respect to the coupler, and the axle member can extend through the coupler. Additionally, an ultrasonic booster member 74 can be co-linearly or coaxially arranged with respect to the coupler, and the booster member can extend through the coupler. The booster member can further be operatively connected to the axle member 34, and an ultrasonic exciter 82 can be operably connected to the booster member 74 by employing any conventional technique or device. For example, electrical power can be directed with suitable electrical conductors to a conventional slip ring 78 assembly, and the slip ring assembly can be employed to operatively direct the electrical power to the ultrasonic exciter 82. The exciter can use the electrical power to generate the desired ultrasonic energy, and direct the ultrasonic energy to the horn member 28. As representatively shown, the ultrasonic energy can be directed into the booster member 74, through the axle member 34 and into the horn member.

The method and apparatus can be suitably mounted on a support frame 22. The coupler member 58 can be substantially non-resiliently supported with a mounting system that is substantially non-elastomeric and has relatively high rigidity and stiffness. The mounting system can be substantially free of components constructed with an elastomer, such as natural or synthetic rubber. In a particular feature, the rotational bearing 66 can be substantially non-resiliently mounted, and the mounting system can be substantially free of elastomeric mounting elements, such as provided by elastomeric O-rings. The support frame is desirable constructed with a suitable vibration-dampening material. Various conventional dampening materials are well known in the art. For example, the frame may be constructed from iron, and the iron can have a dampening capacity of about 100–500.

A desired bonding pattern 96, or other selected processing mechanism can be provided on the outer peripheral surface 90 of the rotary anvil member 86, or may be provided on the outer peripheral surface 88 of the rotary horn member 28, as desired. In the representatively shown configuration, the desired bonding pattern is provided on the outer surface circumferential 90 of the anvil member 86. The bonding pattern can be composed of a plurality of bonding elements 132 which are configured to project substantially radially away from the outer surface 90 of the anvil member 86, in a manner that is well known in the art. The bonding elements can be discontinuously or substantially continuously distributed in a regular or irregular array across the outer peripheral surface 90 of the anvil member 86, or the outer surface 88 of the horn member 28, as desired.

The method and apparatus can be substantially free of rotational supports that directly contact the rotary horn member 28. In particular, the method and apparatus can be substantially free of rotational supports that directly contact the outer peripheral surface 88 of the horn member 28.

In a further aspect, the method and apparatus can be substantially free of supports that directly contact the rotary anvil member 86 to maintain a selected position of the rotary anvil member relative to the rotary horn member. More particularly, the method and apparatus can be substantially free of rotational supports that directly contact the outer peripheral surface 90 of the anvil member 86.

Figure 11:
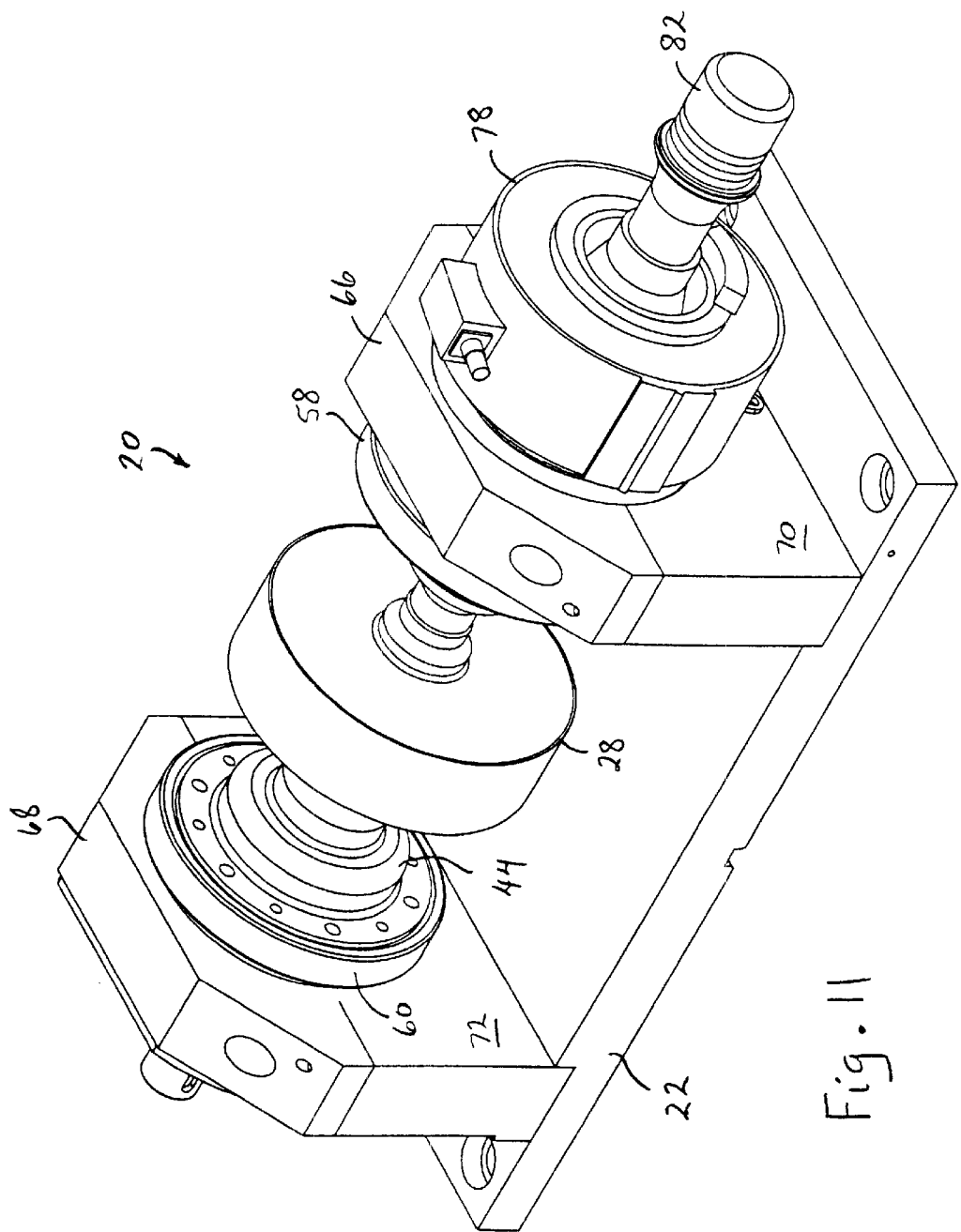
FIG. 11 shows a representative, schematic, perspective view of a method and apparatus that can incorporate a configuration having a horn member mounted with an inter-spanning, bridge configuration, and including a pair of isolation members which have high rigidity and stiffness and are located at opposed sides of the horn member.

With reference to FIGS. 11 through 13, the method and apparatus can incorporate a rotary ultrasonic horn that is mounted in an inter-spanning, bridge configuration, and is sonically isolated by employing a configuration that exhibits high rigidity and stiffness. In a desired configuration, the horn member 28 can be held by rotational bearings and associated support mounts that are substantially symmetrically disposed at axially opposed sides of the horn member. Accordingly, the horn member 28, the axle members 34 and 36 and the isolation members 42 and 44 can be configured to span between the couplers 58 and 60, and between the support mounts 70 and 72. A desired feature can have the axle members 34 and 36 and the corresponding isolation members 42 and 44 arranged in a substantially symmetrical configuration on each side of the horn member 28. Alternatively, the axle members 34 and 36 and the corresponding isolation members 42 and 44 arranged in a non-symmetrical configuration on each side of the horn member.

The bridge-mounting of the horn can significantly reduce the problems of excessively low static stiffness and excessively high horn deflections that can excessively move the outer surface of the horn to positions that are out-of-plane with the desired bonding operation. Such undesired deflections of the horn member can move an outer surface 88 of the horn to a position that is excessively non-parallel with the outer surface 90 of the cooperating anvil member 86, as observed in the nip region between the horn and anvil members. The bridge-mounting of the rotary horn 28, the high-rigidity isolation members, the incorporation of precision bearings, and other features of the invention can help provide improved accuracy and stability.

A particular feature of the method and apparatus can be provided by the anvil support assembly. The anvil support assembly can include a mounting system which is substantially symmetrically disposed to hold and mount an anvil assembly. In a desired arrangement, the anvil assembly can include a precision-machined anvil member 86, and anvil shafts 116 and 116a. The anvil can be rotationally and dynamically balanced, and can be configured to be substantially free of resonances when operated with a cooperating horn that is powered at ordinary excitation frequencies. Accordingly, the anvil and its associated support components can distinctively exhibit low run-out and high dynamic-stability during operation.

In a further feature, the frame and other support assembly components can incorporate a high-damping material, such as provided by extruded-iron, and can be configured to provide a high degree of static and dynamic stiffness. The support assembly components can also be formed and configured to substantially avoid resonances when the horn is powered at ordinary excitation frequencies.

With reference to FIGS. 14 and 15, the method and apparatus can include a highly stiff and rigid frame 22 with associated support components for the horn and anvil members. In a particular feature, the frame can provide a substantially symmetrical configuration of mounting and support for the horn member 28, and can provide a substantially symmetrical configuration of mounting and support for the anvil member 86. In a further feature, the frame can help provide high levels of static and dynamic stiffness, and can help provide high levels of dynamic stability.

As representatively shown, the rotatable ultrasonic horn member 28 has a first axial side 30 and a second axial side 32, and the first axial side 30 of the horn member 28 can be operatively joined to a first rotatable axle member 34 which is capable of providing a first node plane 38. The first axle member 34 can be operatively joined to a first isolation member 42 which has been located operatively proximate the first node plane 38 of the first axle member 34. In a particular aspect, the first isolation member 42 is capable of bending under a horn-life range of sonic frequencies to provide an operative component of motion along its radial direction 102 and an operative component of motion along its axial direction 100. The second axial side 32 of the horn member 28 can be operatively joined to a second rotatable axle member 36 which is capable of providing a second node plane 40. The second axle member 36 can be operatively joined to a second isolation member 44 which has been located operatively proximate the second node plane 40 of the second axle member 36. In a particular aspect, the second isolation member 44 is capable of bending under the horn-life range of sonic frequencies to provide an operative component of motion along a radial direction of the second isolation member 44, and an operative component of motion along an axial direction of the second isolation member 44.

In another aspect, the first isolation member 42 can have a first, radial isolation component 46 and a first, axial isolation component 50. The first radial isolation component 46 has been joined to the first axle member 34, has been configured to extend at least substantially radially from the first axle member 34, and has been configured to bend under the horn-life range of sonic frequencies. Additionally, the first radial isolation component 46 can dynamically bend to provide transverse displacements that are directed along a thickness dimension of the radial isolation component. The first, axial isolation component 50 has been joined to an operative portion of the first, radial isolation component 46, has been configured to extend axially from the first, radial isolation component. In a particular aspect, the first axial isolation component 50 can extend from the first radial isolation component 46 with a substantially cantilevered configuration. The first axial isolation component 50 can be configured to operatively flex and bend under the horn-life range of sonic frequencies. Additionally, the first axial isolation component 50 can dynamically bend to provide transverse displacements that are directed along a thickness dimension of the axial isolation component.

In a further aspect, the second, radial isolation component 48 can be joined to the second axle member 36, has been configured to extend at least substantially radially from the second axle member 36, and has been configured to bend under the horn-life range of sonic frequencies. Additionally, the second radial isolation component 48 can dynamically bend to provide transverse displacements that are directed along a thickness dimension of the second radial isolation component. The second, axial isolation component 52 can be joined to an operative portion of the second, radial isolation component 48, and can be configured to extend axially from the second, radial isolation component. In a particular aspect, the second axial isolation component 52 can.extend from the radial isolation component 48 with a substantially cantilevered configuration. The second axial isolation component 52 can be configured to operatively flex and bend under the horn-life range of sonic frequencies, and can dynamically bend to provide transverse displacements that are directed along a thickness dimension of the second axial isolation component.

In still another feature, the horn member can be configured to exhibit very small deflections when subjected to a large applied load. Additionally, the horn member can cooperate with a proximally located, rotary anvil member to more reliably provide a substantially fixed gap therebetween during ordinary operation.

With reference to FIGS. 11 through 13, the horn member 28 can be securely and fixedly held in a bridge-position with a plurality of bearing members, such as provided by rotational bearings 66 and 68. Additionally, the bearings can be held with associated support mounts, such as provided by mounts 70 and 72. The bearing members can be arranged with a bearing member located at each axial side of the horn member 28. Additionally, each bearing member can be spaced from its corresponding, axial side of the horn member. The bearing members 66 and 68 can also be operatively connected to corresponding couplers 58 and 60, respectively, in a manner that can hold the couplers in a substantially fixed position that exhibits high rigidity and stiffness. The first coupler 58 can connect between the first isolation member 42 and the first rotational bearing 66, and similarly, the second coupler 60 can connect between the second isolation member 44 and the second rotational bearing 68. Additionally, the first rotational bearing 66 can support the first rotatable coupler 58 in configuration that exhibits high rigidity, and the second rotational bearing 68 can support the second rotatable coupler 60 in configuration that exhibits high rigidity. Appropriate booster members and wave-guides can be configured to extend through the couplers and operably connect to the axle members 34 and 36, and to the horn member 28.

The rotational bearings 66 and 68 can be high-precision bearings that exhibit low levels of run-out. In desired arrangements, the rotational bearings can be tapered, printing press bearings. For example, the bearings can be Part No.458681, printing press bearings that are available from SKF U.S.A., a business having offices located in King of Prussia, Pa.

The first isolation member 42 can be joined to the first rotatable coupler 58 that is supported by the first rotational bearing 66. Similarly, the second isolation member 44 can be operatively joined to the second rotatable coupler 60 that is supported by the second rotational bearing 68.

The first isolation member 42 can be joined to the first coupler 58 by including an interference, friction-fit. For example, he first coupler 58 can provide a first coupler opening 62, and the first, axial isolation component 50 of the first isolation member 42 can be operatively positioned and secured in the first coupler opening 62. Similarly, the second isolation member 44 can be joined to the second coupler 60 by including an interference, friction-fit. The second coupler 60 can provide a second coupler opening 64, and the second, axial isolation component 52 of the second isolation member 44 can be operatively positioned and secured in the second coupler opening 64.

In a particular aspect, the first coupler 58 can provide a first, substantially cylinder-shaped, coupler opening 62 into which the first axial isolation component 50 of the first isolation member 42 can be operatively positioned and secured. Similarly, the second coupler 60 can provide a second, substantially cylinder-shape, coupler opening into which the second axial isolation component 52 of the second isolation member 44 can be operatively positioned and secured.

As representatively shown, the first isolation member 42, and particularly the first, axial isolation component 50 can include an extending, first flange portion 54 which can be operatively positioned and secured in the first coupler opening 62. The first coupler flange 54 can include a generally radially extending section and a generally axially extending section. Additionally, the first coupler flange portion 54 can be operatively joined to the first coupler opening 62 by including an interference, friction-fit. Similarly, the second isolation member 44, and particularly the second axial isolation component 52 can include an extending, second flange portion 56, and the second flange portion can be operatively positioned and secured in the second coupler opening 64. The second coupler flange 56 can also include a generally radially extending section and a generally axially extending section, and the second coupler flange portion 56 can be operatively joined to the second coupler opening 64 by including an interference, friction-fit.

A first mount 70 can support the first rotational bearing 66, and in a particular aspect, the first mount can support the first rotational bearing with a configuration that exhibits high rigidity and stiffness. The first mount 70 can be axially spaced from the first axial side 30 of the horn member 28, and can be located proximate the first node plane 38 of the first axle member 34. A second mount 72 can support the second rotational bearing 68, and in a particular aspect, the second mount can support the second rotational bearing with a configuration that exhibits high rigidity and stiffness. The second mount 72 can be axially spaced from the second axial side 32 of the horn member 28, and can be located proximate the second node plane 40 of the second axle member 36. The bearing mounts can be positioned generally adjacent the node planes that can arise their corresponding axle members. As representatively shown, the first bearing support mount 70 can be positioned generally adjacent the first node plane 38 provided by the first axle member 34. Similarly, the second bearing support mount 72 can be positioned generally adjacent the second node plane 40 provided by the second axle member 36.

The first axle member 34 can provide a wave-guide which can be configured to operably direct ultrasonic energy from a suitable ultrasonic power source into the horn member 28. In a similar fashion, the second axle member 36 can be configured to provide a wave-guide which can operably direct ultrasonic energy from a suitable power source into the horn member 28.

With reference to FIGS. 11 through 13, an ultrasonic booster member 74 can be operatively connected to the first axle member 34, and a first ultrasonic exciter 82 can be operably connected to the first booster member 74 by employing any conventional technique or device. For example, a conventional slip ring 78 can be employed to direct electrical power to the first exciter 82, and the first exciter can produce and direct ultrasonic energy into the first booster member 74.

Figure 13A:
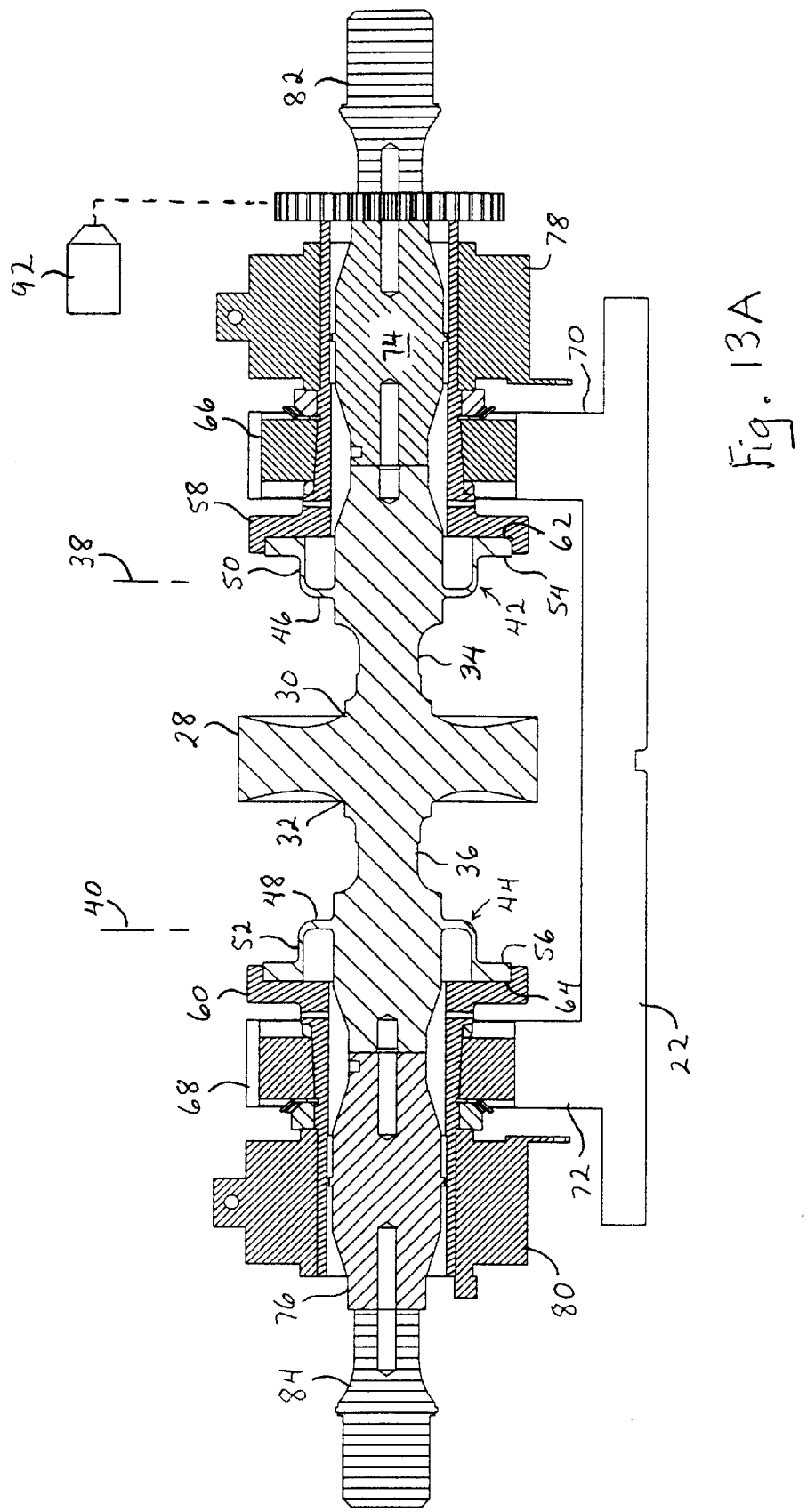
FIG. 13A shows a representative view of a cross-section through an arrangement wherein a plurality of ultrasonic exciters are operatively connected to the horn member.

As representatively shown in FIG. 13A, an optional configuration of the method and apparatus can include a second ultrasonic exciter 84. Additionally, a second booster member 76 can be operably connected to the second axle member 36, and the second ultrasonic exciter 84 can be operatively connected to the second booster member 76. A second, conventional slip ring 80 may then be employed to direct ultrasonic energy from the second ultrasonic exciter 84 into the second booster member 76. The first and second ultrasonic exciters 82 and 84 can be configured to simultaneously and cooperatively direct increased amounts of ultrasonic energy to the rotary horn member 28. The effective cooperation of the ultrasonic exciters can be provided and regulated by employing conventional control techniques and systems that are well known in the art and available from commercial vendors.

As representatively shown, the support frame 22 can include upright-members that are configured to fixedly hold the anvil member 86 at a location that is generally superjacent the cooperating horn member 28. Optionally, the method and apparatus can be configured with any other operable arrangement between the anvil member and horn member. For example, the anvil member 86 can be fixedly held and positioned generally subjacent the cooperating horn member 28, or at a height-level that is approximately equal to the height-level of the horn member.

The anvil member 86 can be rotationally mounted on the frame 22 with any operative mounting system, and in a desired arrangement, the mounting system can be substantially symmetrically disposed about the anvil member. In a particular feature, at least a pair of anvil mounts can be substantially symmetrically disposed at opposed sides of the anvil member. As representatively shown, a first anvil shaft 116 can be configured to extend from a first axial end-face 118 of the anvil member, and a second anvil shaft 116a can be configured to extend from a second axial end-face 118a of the anvil member. The first and second anvil shafts can have substantially equal lengths, and can be held with anvil mounts 120 that are substantially equally spaced from the anvil member 86. The anvil mounts are securely and fixedly held on the support frame 22. As representatively shown, the anvil mounts 120 can be secured to a transfer device, such as provided by a slide mechanism 110, and the transfer device can be secured to the support frame 22. Accordingly, the anvil member can be configured to provide a substantially symmetrical support assembly, which can help maintain a desired substantially parallel alignment between the outer peripheral surface 90 of the anvil 86, and the outer peripheral surface 88 of the horn 28. Even if deflections of the horn member and/or anvil member occur, the configuration of the method and apparatus can help keep the peripheral, working surfaces of the horn and anvil members aligned substantially in-plane with the selected processing operation.

The anvil member 86 and the shafts 116 and 116a desirably have a one-piece configuration. In a particular arrangement, the anvil member and shafts can be constructed and formed from a single, unitary piece of material. Optionally, the anvil member and shafts can be constructed and formed from separate pieces of material, and appropriated attached together to form an operative assembly.

Figure 16A:
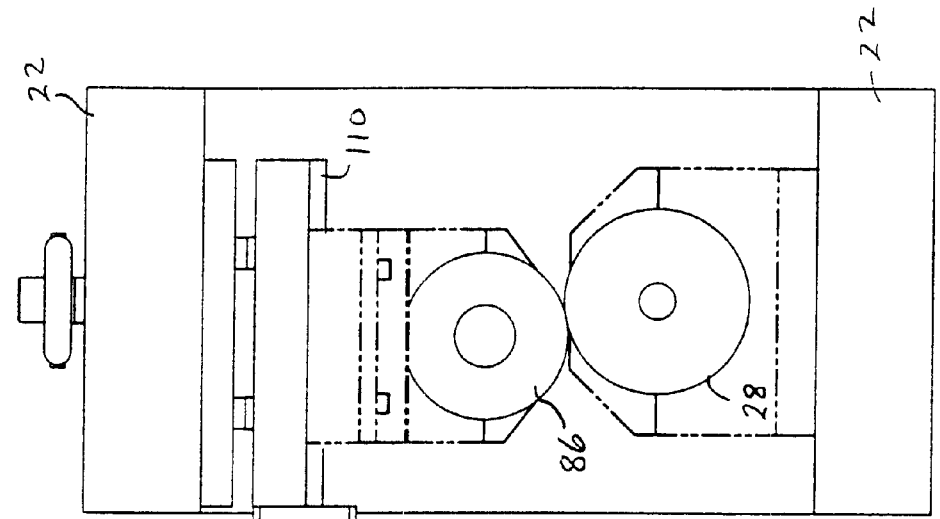
FIG. 16A shows another schematic, side view of a representative method and apparatus which has been moved to adjust and reduce the gap between a horn member and a cooperating anvil member.
Figure 16:
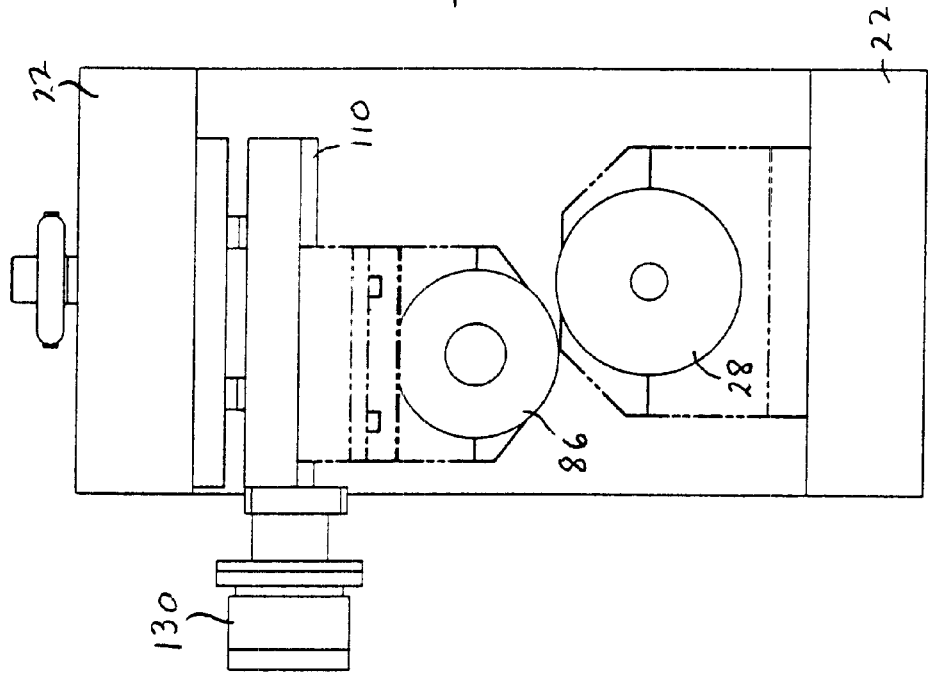
FIG. 16 shows a representative side view of the apparatus and method illustrated in FIG. 15, and illustrates a system for adjusting a gap between a horn member and a cooperating anvil member.

With reference to FIGS. 16 through 17A, The horn member 28 and the anvil member 86 can be configured to provide a substantially constant horn-anvil gap 106 which may have a minimum of about 0.01 mm, and may have a maximum of about 100 mm. In particular aspects, the horn-anvil gap can have a minimum of about 0.02 mm, and can alternatively have a minimum of about 0.03 mm to provide desired performance. In other aspects, the horn-anvil gap can be up to a maximum of about 75 mm. The horn-anvil gap can alternatively be up to about 50 mm, and can optionally be up to about 25 mm to provide desired effectiveness.

If the horn-anvil gap is too low, the system can produce an over-processing, such as an over-bonding of the target material. The excessively low gap can also produce undesired damage to the equipment and/or target material. If the horn-anvil gap is too large, the system can produce insufficient processing, such as an insufficient bonding. A further feature of the method and apparatus can maintain a substantially constant horn-anvil gap 106 during their intended, ordinary operation. In a desired configuration the substantially constant horn-anvil gap can be maintained when the horn member 28 and anvil member 86 are cooperatively counter-rotated to provide substantially equal peripheral speeds. In a particular aspect, the horn-anvil gap can be maintained with a gap-variance which can be within the range of about ±0.01 mm. The gap-variance can alternatively be as low as about ±0.008 mm, and can optionally be within the range of about ±0.0064 mm (±0.00025 inch) to provide improved performance.

If the horn-anvil, gap-variance is outside the desire values, the method and apparatus can produce excessive variations in the appointed processing operation. For example, the method and apparatus can produce excessive variations in the bonding of the target web.

The consistency of the horn-anvil gap 106 can be determined when the horn member 28 and anvil member 86 are cooperatively counter-rotated to provide substantially equal peripheral speeds of 5 rpm during the intended, ordinary operation. The gap variance can be determined by measuring the run-out of the rotary horn member and the run-out of the rotary anvil member.

Figure 18:
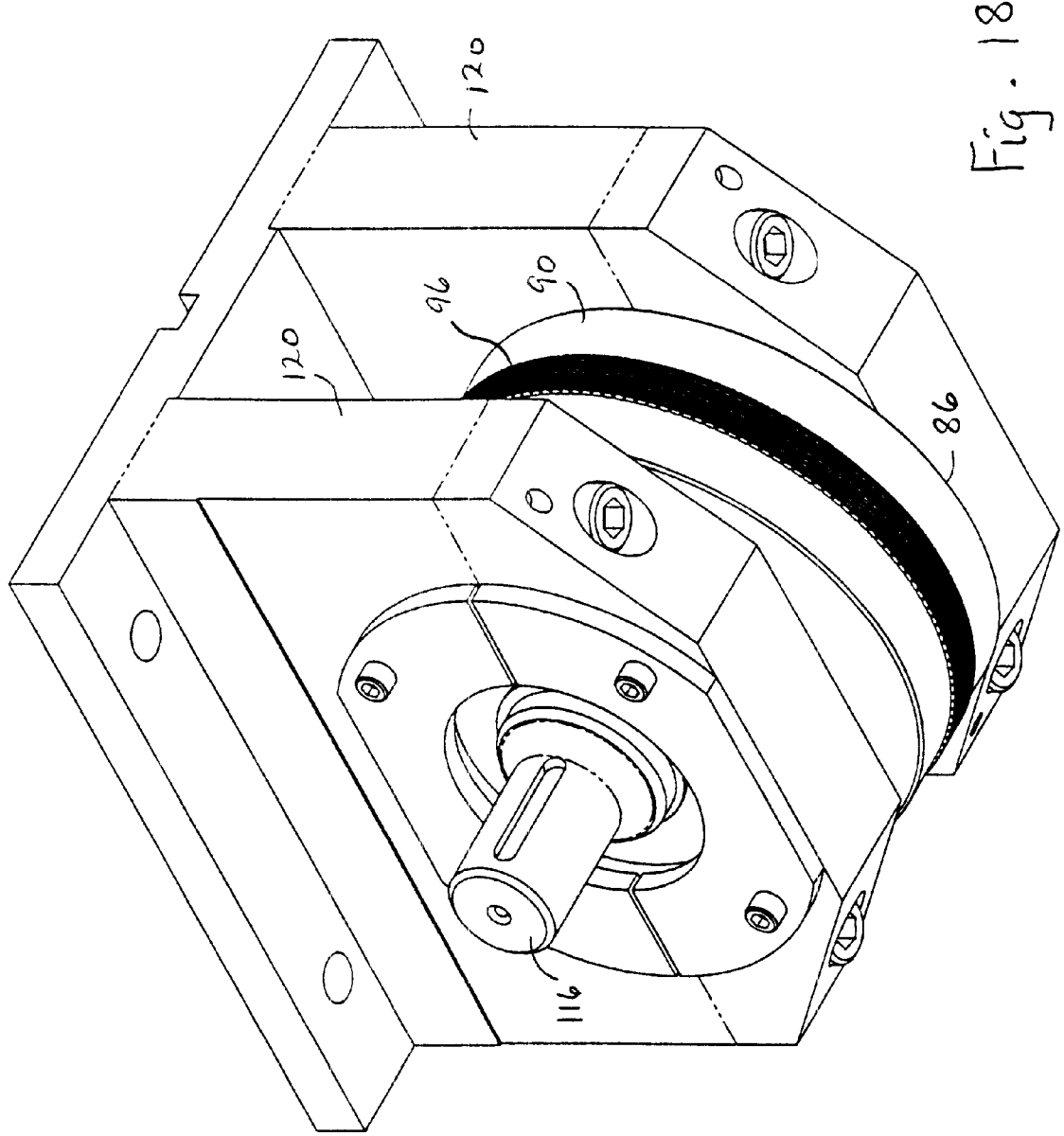
FIG. 18 shows a representative, perspective view of an anvil assembly and associated mounting components that can be employed with a method and apparatus of the invention.
Figure 19:
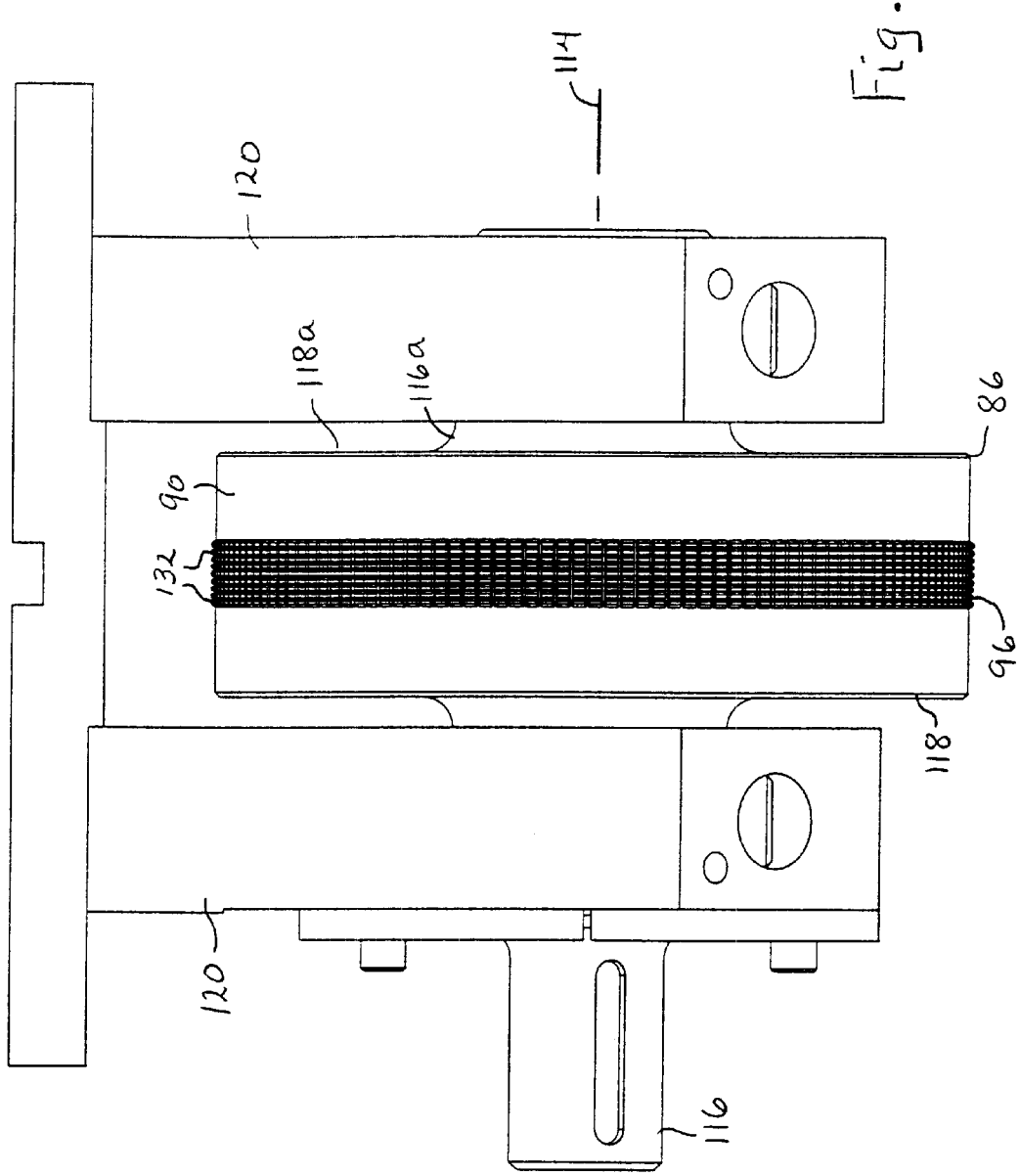
FIG. 19 shows a representative, end view of the anvil assembly and associated mounting components that are illustrated in FIG. 18.
Figure 20:
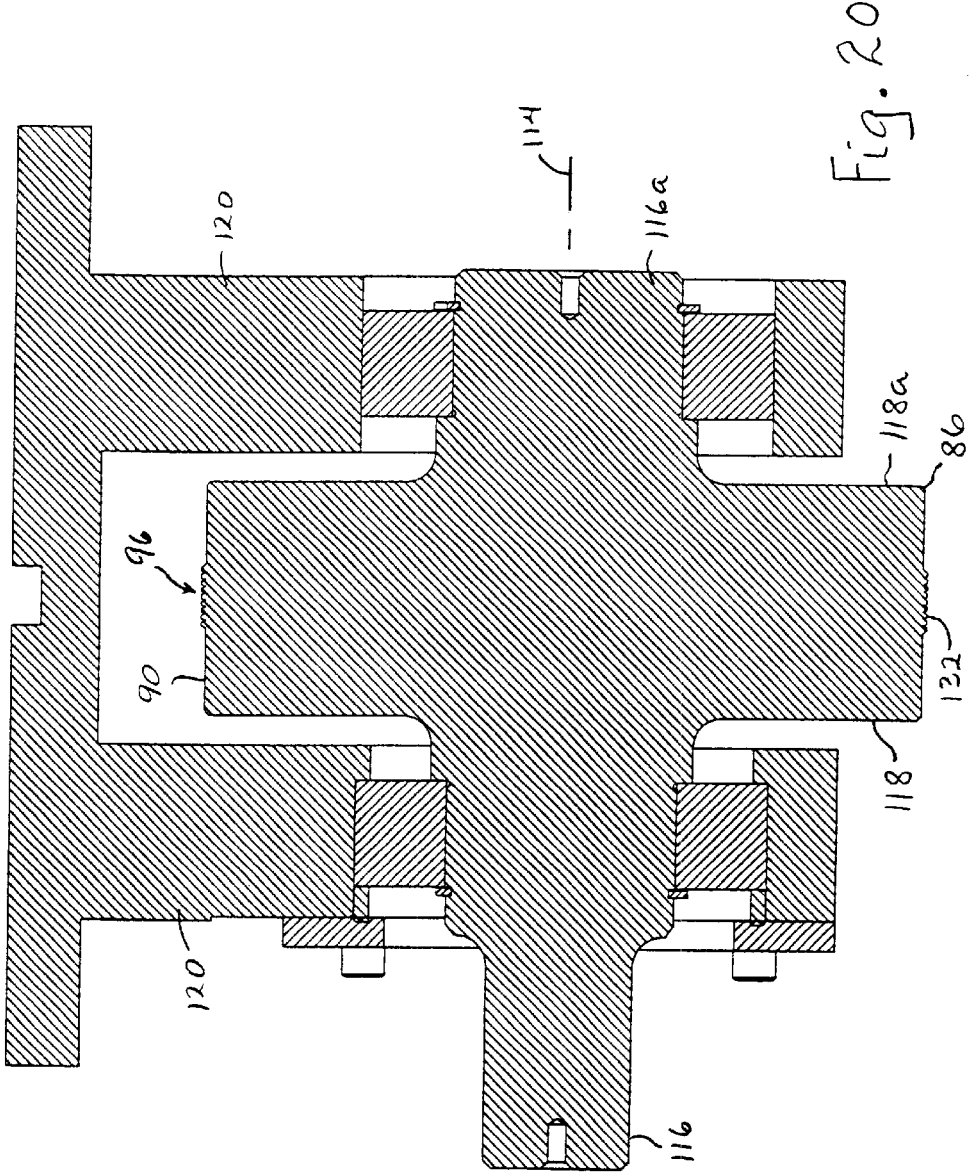
FIG. 20 shows a representative view of a cross-section through the anvil member and associated mounting components that are illustrated in FIG. 19.
Figure 21:
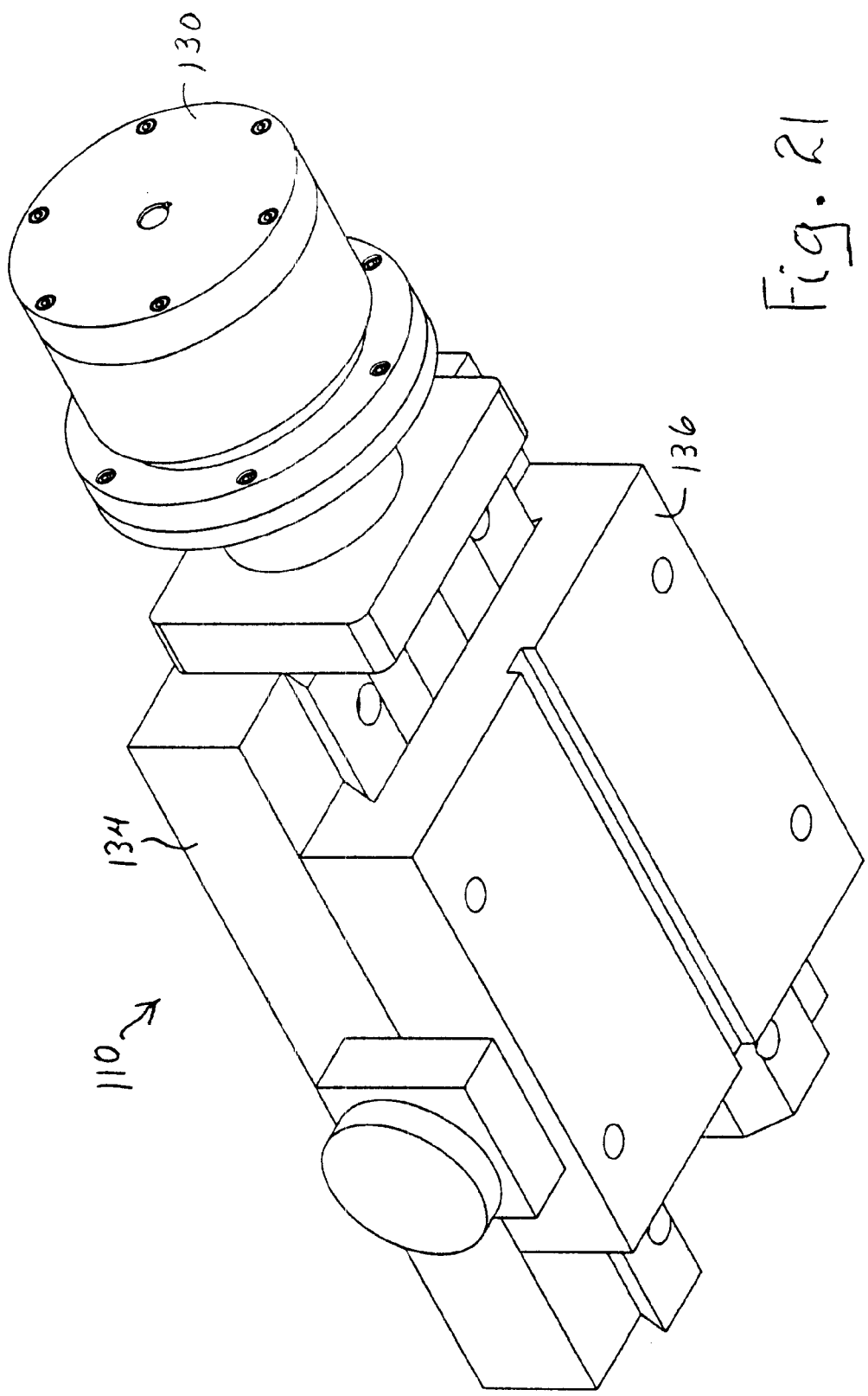
FIG. 21 shows a representative perspective view of a dove-tail slide that can be incorporated as a transfer device for selectively moving the anvil member.
Figure 22:
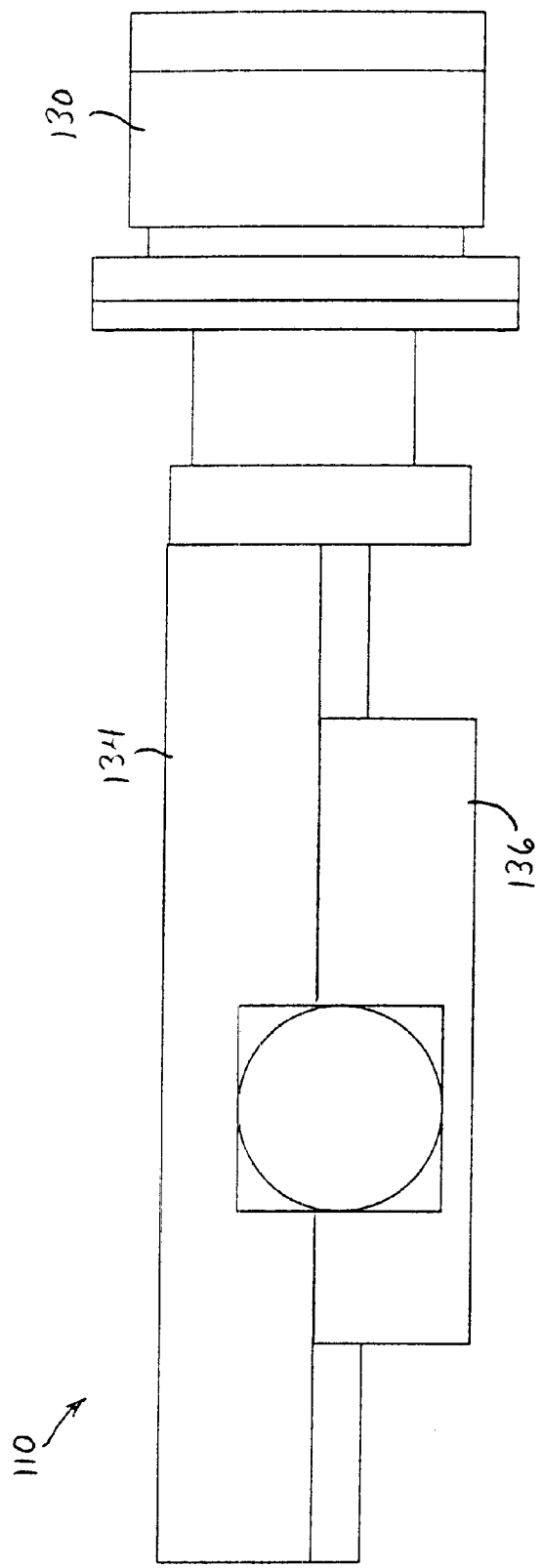
FIG. 22 shows a representative, side view of a dove-tail slide that is illustrated in FIG. 21.

As representatively shown in FIGS. 18 through 20, the anvil assembly can include the anvil member 86, and journals that are joined to the anvil member with one journal joined to each of the opposed end faces of the anvil member. As illustrated, the journals can be provided by the shown anvil shafts 116 and 116a. The anvil member and anvil shafts can be dynamically spin-balanced to reduce excessive vibrations when rotated at the intended operating speeds. In a desired configuration, the anvil member and anvil shafts can be integrally formed from a single piece of material. The anvil member and anvil shafts can optionally be formed from separately provided pieces of material, as desired.

The anvil shafts can be supported by operative anvil bearings and corresponding bearing mounts. Desirably, precision bearing are employed to provide a minimal or substantially zero run-out T.I.R. (Total Indicator Reading) of the anvil 26. An example of a suitable anvil bearing is a Part No. 22210 CC/33 roller bearing that is available from SKF U.S.A.

A bearing pillow-block or other appropriate anvil mounting component can be configured to provide an accurate bearing line and concentricity from a first side portion to an opposite second side portion of the anvil assembly. As representatively shown, the anvil assembly can include a pair of anvil mounts 120, and in a particular feature, the anvil mounts can be substantially symmetrically located on each side of the anvil member 86. In a desired feature, the anvil mounts can be substantially symmetrically located with respect to a pattern or other array of appointed bonding elements that are disposed on the outer peripheral surface 90 of the anvil member 86. As illustrated, the bearing mounts can be arranged to be substantially equally spaced from the opposed end faces of the anvil member, and may be arranged to be substantially equally spaced from the array of appointed bonding elements that are disposed on the outer peripheral surface of the anvil member.

The anvil bearing mounts are constructed to be sufficiently strong and rigid to provide the desired, low levels of deflection in the "x", "y" and "z" directions under static or dynamic forces. In a particular aspect, the anvil member 86 can be configured to exhibit an anvil run-out that is not more than a maximum of about 0.013 mm (0.0005 inch). The anvil run-out can alternatively be not more than about 0.0051 mm (0.0002 inch), and optionally, can be not more than about 0.003 mm to provide improved performance. The anvil run-out is determined by any suitable technique or instrument, such as provided by a conventional length-calibrated dial indicator instrument.

With reference to FIGS. 16 through 17A, the anvil member 86 can be offset from the horn member by a selected offset distance 108 along the local, machine-direction 24 of the method and apparatus. In the example of the representatively shown configuration, the anvil member is offset from the horn member substantially along the horizontal direction. The anvil member 86 or horn member 28 can be configured such that a movement of the anvil member or horn member along an appointed traverse path can set and control the intended gap 106 between the anvil member and horn member. The traverse-path can have at least a path-component that is aligned along the local machine-direction. In the example of the representatively shown arrangement, the anvil member 86 can be translated or otherwise moved along a substantially horizontal traverse-path. It should be readily appreciated that the anvil member 86 may be positioned with an offset distance that extends relatively upstream or relatively downstream from the horn member 28, as desired.

To help generate the desired regulation of the gap 106, the horn member 28 and the anvil member 86 can be arranged to have a discrete amount of overlap with respect to the local vertical direction. As representatively shown, an overlap distance 122 can be determined with respect to (a) a first horizontal line that is tangent to the outer peripheral surface 88 of the horn member 28 at a location that is proximate the nip gap 106 between the horn and anvil members, and (b) a second horizontal line that is tangent to the outer peripheral surface 90 of the anvil member 86 at a location that is proximate the nip gap 106.

In a particular aspect, the anvil member 86 or horn member 28 can be moved with any conventional drive or transfer mechanism. In the example of the representatively shown configuration, the anvil member 86 can be moved with a transfer device, such as provided by a slide device 110, and the transfer device may be actuated with a manual drive or an automated drive. In particular features, the transfer device can be a dove-tail slide, and the transfer device may be automated with a motorized drive 130. In another feature, the slide or other transfer device may be moved by employing a mechanism that includes a substantially zero backlash, drive screw. A representative example of a suitable dove-tail slide system is a Gilman dove-tail slide device, part number DC8-813-M-SPD2-3 which is available from Russel T. Gilman, Inc., a business having offices located in Grafton, Wis. A representative example of a suitable actuating system is a model number Y-2012 ServoMotor device which is available from Rockwell Automation, a business having offices located in Milwaukee, Wis.

As representatively shown in FIGS. 15 through 16A and 21 through 23, a base portion 134 of the slide mechanism can be fixedly attached to the frame 22, and a movable slide portion 136 can be configured and attached to move the rotary anvil 86. The anvil transfer device can be configured to provide suitable levels of rigidity, accuracy and repeatability. As a result, the anvil transfer device can provide the desired motion and accuracy of positioning of the anvil member.

Another feature of the method and apparatus can include an offset drive coupling 124 (e.g. FIG. 15) between the anvil member 86 and its corresponding anvil drive 94. The offset drive coupling can allow an incremental movement of the anvil member and an incremental adjustment of the nip gap 106 during ordinary operation while the anvil drive is actually rotating the anvil member. Accordingly, the anvil drive can continue to turn the anvil at its appointed operating speed during the adjustment of the nip gap, and the anvil drive does not need to be stopped and restarted during the movement and adjustment of the nip gap 106. Various offset drive coupling devices or systems are available from commercial vendors. An example of a suitable offset drive coupling is a Model No. L234C, Schmidt offset coupling which is available from Zero-Max, Inc., a business having offices located in Minneapolis, Minn.

In another aspect, the employed traversing mechanism (such as provided by a motorized dove-tail slide) can be configured to provide a fail-safe system which can operatively drive the selected component (e.g. anvil member 86) to a maximum-gap position when a fault or other undesired anomaly is detected in the operation of the method or apparatus.

The method and apparatus can be configured to provide another fail-safe arrangement. In the event that the anvil member is driven into and past the horn member, the anvil member, the horn member and their corresponding support and mounting components are configured to operatively deflect to accommodate the movement of the anvil member past the horn member. The anvil and horn members can be suitably arranged such that the deflections experienced by the horn and anvil system or systems will not exceed the yield strengths of any of the anvil, horn or corresponding support and mounting components.

The anvil member 86 can be rotated by a separate drive system, and the anvil drive 94 can be configured to provide a constant or non-constant rotational speed to the anvil, as desired. In a particular feature, the anvil drive can be configured to provide a non-constant, variable speed to the anvil member. Accordingly, during particular periods of the processing operation the peripheral surface speed of the anvil member may not match the peripheral surface speed of the horn member. Additionally, the anvil drive 94 and the horn drive 92 may be cooperatively regulated and controlled to provide a horn rotational speed that selectively differs from the anvil rotational speed.

In another aspect, the method and apparatus can include a mechanism or other means which can automatically maintain a predetermined, set pressure or force value in the nip region between the rotary horn and anvil members during the bonding or other processing operation. As the web of target material 98 is delivered to the nip region and enters the horn-anvil gap 106, the target web fills the nip gap and exerts a force or pressure against the rotary horn and anvil members. The resulting gap force against the horn member and/or anvil member can be monitored with an operative force sensor. The force sensor can provide an operative force signal, which may include a voltage signal, a current signal, a charge signal, a magnetic signal, a mechanical signal or the like, as well as combinations thereof. The output from the sensor can be employed to adjust and regulate the gap distance 106 to operatively maintain a desired nip force value. For example, a load-cell 126 or other force sensor can be connected between the anvil member 86 and its corresponding portion of the support frame 22 to detect a force applied to the anvil member. In the representatively shown configuration, the force signal generated by the load-cell can be a voltage signal.

Figure 23:
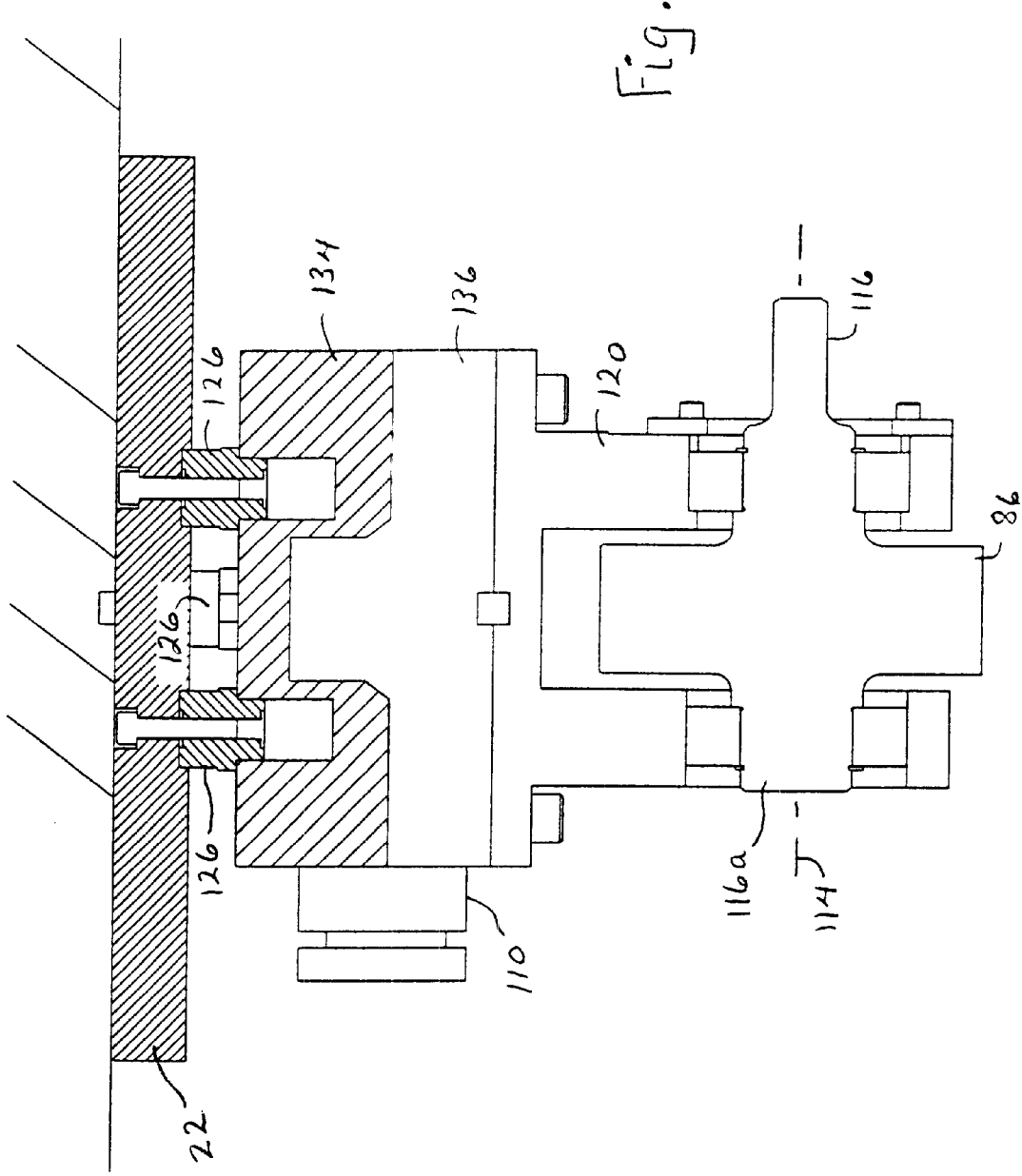
FIG. 23 representatively shows a partially cross-sectioned view of a system for sensing a process force level to control a process gap.
Figure 24:
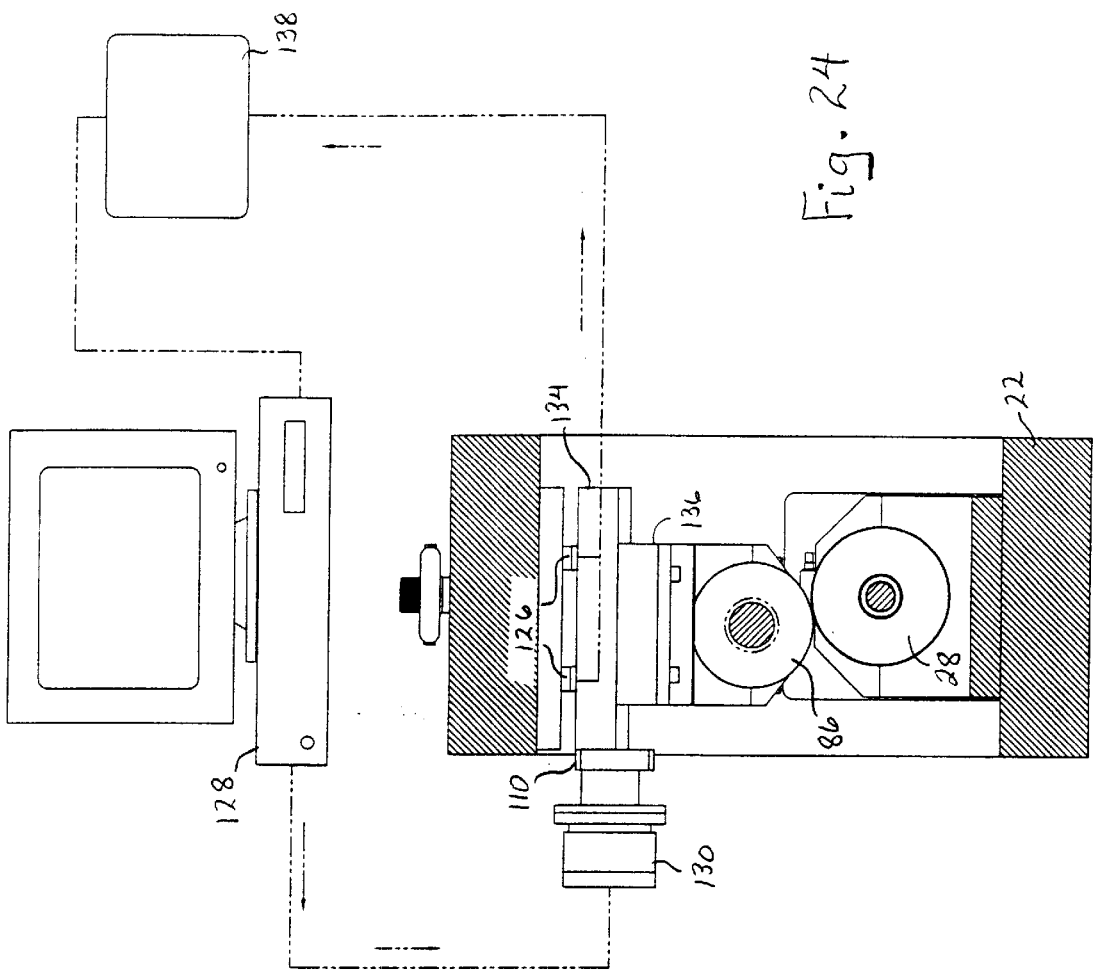
FIG. 24 shows a representative schematic view of an electronically controlled system for automatically regulating a process force and process gap.

With reference to FIGS. 23 and 24, the force sensor can be placed at a location that is operatively within the load path produced by the processing operation. Various types of force sensors can be employed, and are available from commercial vendors. Examples of suitable force sensors include piezoelectric sensors, bonded foil strain gauges, silicon strain gauges and the like, as well as combinations thereof. As representatively shown, the force sensor may be provided by a piezoelectric load-cell 126. An example, of a suitable load-cell is a Model No. 9176 FORCELINK load-cell which is available from Kistler Instrument Corp., a business having offices located in Amherst, N.Y. The load-cell or other sensor can be mounted to the frame 22 in the path of the load generated by the nip region, or other processing region, to measure the load force generated therein. As representatively shown, an operative array of load-cells 126 can be positioned between the base of the anvil transfer device 110 and the frame 22. For example, a system of three load-cells or other force sensors may be employed. In a desired feature, the load-cell or other sensor can measure the force produced in the nip region without requiring an excessively large relative motion between the horn and anvil members. For example, the selected array of force sensors can generate a set of one or more voltage signals that are proportional to the total force generated in the nip gap region 106. Alternatively, the force sensors can be configured to provide another type of signal that can be, directly or indirectly, readable or otherwise processable by a computer or other electronic processor 128.

The output(s) from the force sensor(s) can be operatively directed to the computer or other electronic processor 128. Suitable electronic processors are available from commercial vendors. For example, the processor may be provided by a Model No. 9640071 A01 CONTROL LOGIX processor which is a programmable logic control processor available from Rockwell Automation, a business having offices located in Milwaukee, Wis. In particular arrangements, a signal amplifier 138 can amplify the output signals from the load cells or other force sensors. The electronic processor can monitor the amplified output signals from the force sensors, and can perform computational or other desired processing operations with the output signals.

An output drive signal from the electronic processor 128 can be directed to an automated drive that is operatively connected to the selected transfer device (e.g. the slide mechanism 110). The automated drive can, for example, include a motor to provide a motorized drive 130. In a particular arrangement, the processor output can be configured to operate a motorized lead-screw that is connected to automatically move the dove-tail slide mechanism and the anvil member to thereby modify and change the nip gap 106.

Any type of motor may be employed, and suitable devices can include an electromagnetic motor, an electromechanical motor, an electrostatic motor, a magnetic motor, a pneumatic motor, a hydraulic motor or the like, as well as combinations thereof.

In a particular aspect, a closed-loop feedback system can be configured to automatically adjust the gap distance 106 to provide the desired value of gap force at the nip region. The closed-loop feedback can, for example, be provided by a system which includes the electronic processor 128. If the force measured by the force sensor is above the predetermined set point, the electronic processor 128 can be configured provide an output signal that can automatically move the slide 110 in a direction that increases the gap distance 106. If the force measured by the force sensor is below the predetermined set point, the output from the electronic processor 128 can be configured to automatically move the slide 110 in a direction that decreases the gap distance 106.

Suitable programming for the electronic processor can be readily determined by employing conventional programming techniques and the instructions provided with the selected processor. In a particular arrangement, the programmable processor can receive voltage signals from the load-cell amplifier, and can perform mathematical calculations on the signals. In a desired arrangement, the processor can generate an average load value, and can compare this average load value with a operator-entered value, called the set-point. The set-point corresponds to a predetermined, target gap-force value. Using a control feedback loop, the processor can command a servomotor and associated transfer system to make small adjustments to the anvil position and the horn-anvil gap, until the load-cell signal is within a fixed range of the selected set-point. In a desired configuration, the set-point range can be ±5% of the selected set-point value.

In another aspect of the method and apparatus, the force readings from the force sensor can be employed to monitor the bonding system for process upsets, such as caused by material wrap-ups, and can be employed to signal and trigger a machine shut-down. For example, the readings from the force sensor and the operation of the electronic processor 128 can be employed to help provide a fail-safe system which can operatively drive the anvil member 86 to a maximum-gap position when a fault or other undesired anomaly is detected in the operation of the method or apparatus.

A further aspect of the method and apparatus can be configured to provide a rotary ultrasonic system that can provide an intermittent processing of a target web. For example, the method and apparatus can be configured to produce an intermittent bonding pattern 99 on the target web 98. Alternatively, the method and apparatus can be configured to perform the desired processing operation on an discontinuous target web, or can be configured to perform the desired processing operation on a target web that has a varying, non-uniform thickness. The method and apparatus can be configured to provide the desired intermittent processing of the target web while maintaining a selected gap distance 106 between the rotary horn member 28 and the rotary anvil member 86. To further the ability of providing the intermittent ultrasonic bonding or other processing, the horn and anvil members can be configured to continue the maintenance of a substantially non-contact relation even in the absence of the target web.

With reference to FIGS. 25 through 25D, a desired intermittent bonding pattern 99 can be provided by disposing a pre-selected array or other pattern of bonding elements 132 onto the outer peripheral surface(s) of either or both of the horn member 28 and anvil member 86. The pattern may be regular or irregular. A particular feature of the intermittent pattern is that the intermittent pattern extends along the circumferential direction of the selected rotary member with at least one major disruption or discontinuity in the pattern of bonding elements 132. The major disruption or discontinuity is significantly larger than the ordinary spacing that is present between the individual bonding elements 132. In particular arrangements, there may be a plurality of two or more major discontinuities in the pattern of the bonding elements. At the major discontinuity, there may be a selected, low-level of bonding-contact along a "contact-line" of the system. The low-level of bonding-contact may, for example, be produced by distributing a significantly reduced number of bonding elements in the area of the desired, major discontinuity. In a particular arrangement, there can be a substantially zero level of bonding-contact along the appointed "contact-line" of the system during the major discontinuity. For example, there can be a substantially zero level of contact between the target web 98 and any portion of the array of bonding elements 132 along the contact-line.

FIG. 25 representatively shows a system configured with a generally circular anvil member 86 for providing a selected array of processing regions, such as a series of bonded regions 99, that are intermittently distributed along a web of target work material 98. As representatively shown, the bonded regions 99 can be spaced apart by separation regions that are substantially free of ultrasonic bonds. The desired processing elements (e.g. bonding elements 132) on the anvil member 86 can be substantially segregated at selected processing regions (e.g. bonding regions) that are distributed along the outer surface 90 of the anvil member to provide an intermittent series of bonding regions. The processing regions (e.g. bonding regions) can be spaced apart by anvil separation regions that are substantially free of the processing elements (e.g. ultrasonic bond elements 132).

Figure 25A:
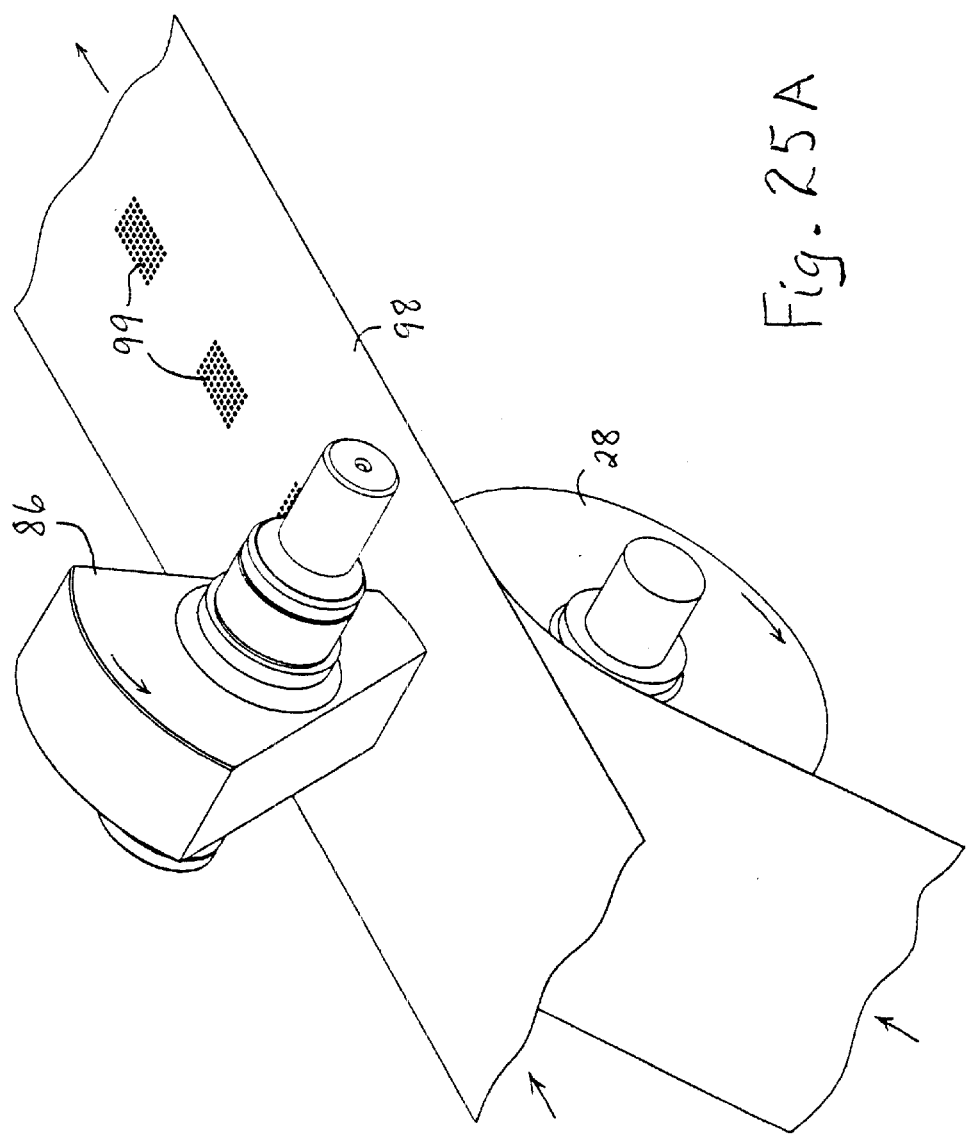
FIG. 25A representatively shows a system configured with an alternative anvil member for providing a selected array of bonds arranged in an intermittent pattern distributed along a web of target work material.

FIG. 25A representatively shows a system configured with an alternative anvil member 86 for providing a selected array of processed regions (e.g. intermittent bonded regions 99) that are distributed along the web of target work material 98. The anvil member can be noncircular, and can include one or more spokes or lobes. The lobes may be of equal or unequal size and shape. As illustrated, for example, the anvil member may include a first lobe and a second lobe, and the anvil lobes may be of unequal size and different shape. A desired array of processing elements may be disposed on an outer peripheral surface of one or more of the anvil lobes. In the shown arrangement, the first anvil lobe can have a relatively shorter circumferential length at its outer peripheral surface. Additionally, the first anvil lobe can have a relatively longer radial length. The second lobe can have a relatively longer circumferential length at its outer peripheral surface. Additionally, the second anvil lobe can have a relatively shorter radial length. As shown, the desired array of bonding elements can be disposed on an outer peripheral surface of the first anvil lobe, and the second anvil lobe can be configured as a counterbalance to provide a substantially vibration-free rotation of the anvil member 86.

Figure 25B:
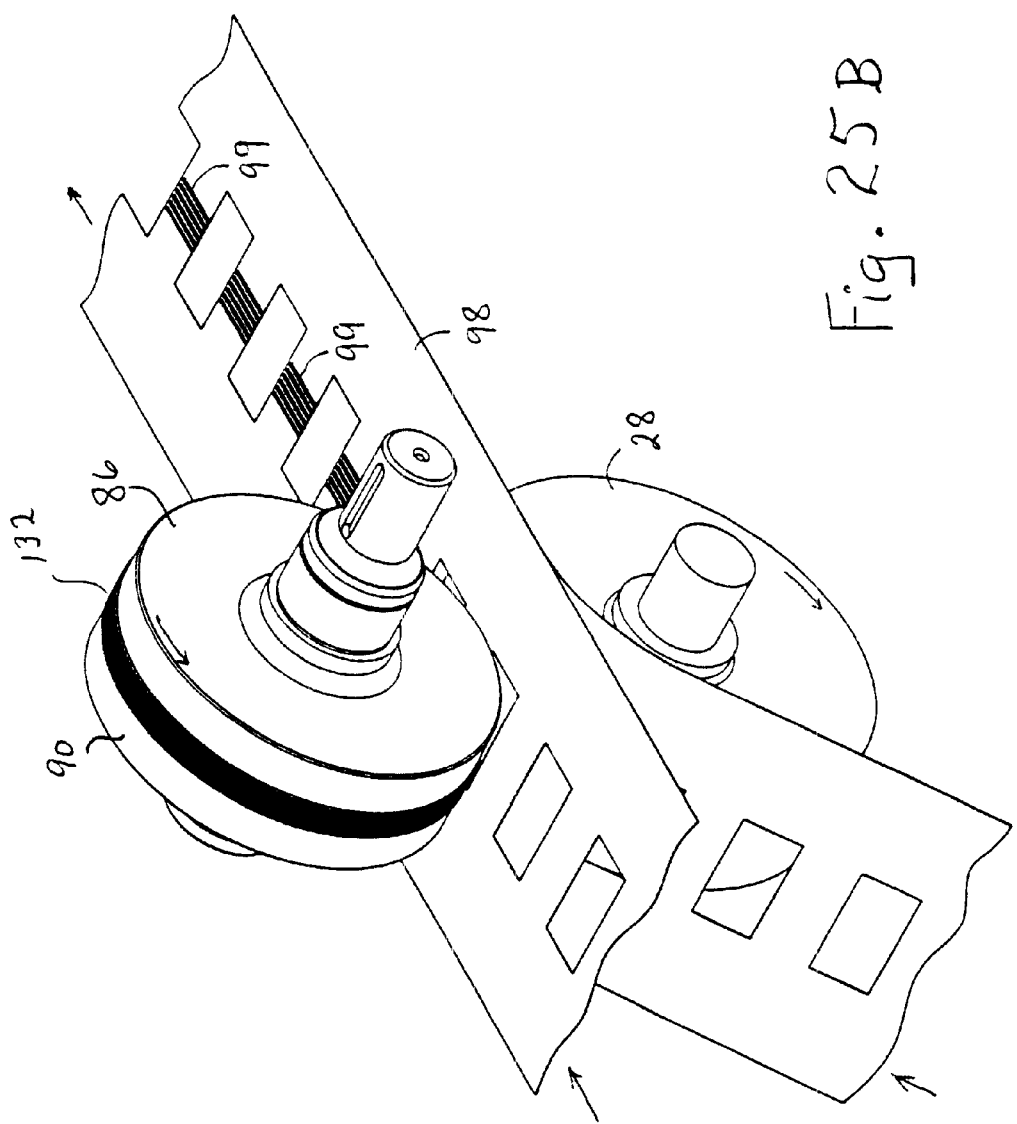
FIG. 25B representatively shows a system configured with a selected anvil member to provide a selected array of bonds arranged in an intermittent pattern distributed along an example of a discontinuous web of target work material.

FIG. 25B representatively shows a system configured with a selected anvil member to provide a selected array of processed regions that are arranged in an intermittent pattern distributed along a selected, partially discontinuous web of target work material. As illustrated, the anvil member 86 may have an array of processing elements (e.g. bonding elements 132) that are substantially continuously distributed along the anvil surface 90. The have gaps, discontinuities or other portions along which the bonding or other processing is not desired. Additionally, the target web 98 may have a variable thickness of material, and the selected processing may be desired only at sections of the web 98 that have a particular thickness of material.

Figure 25C:
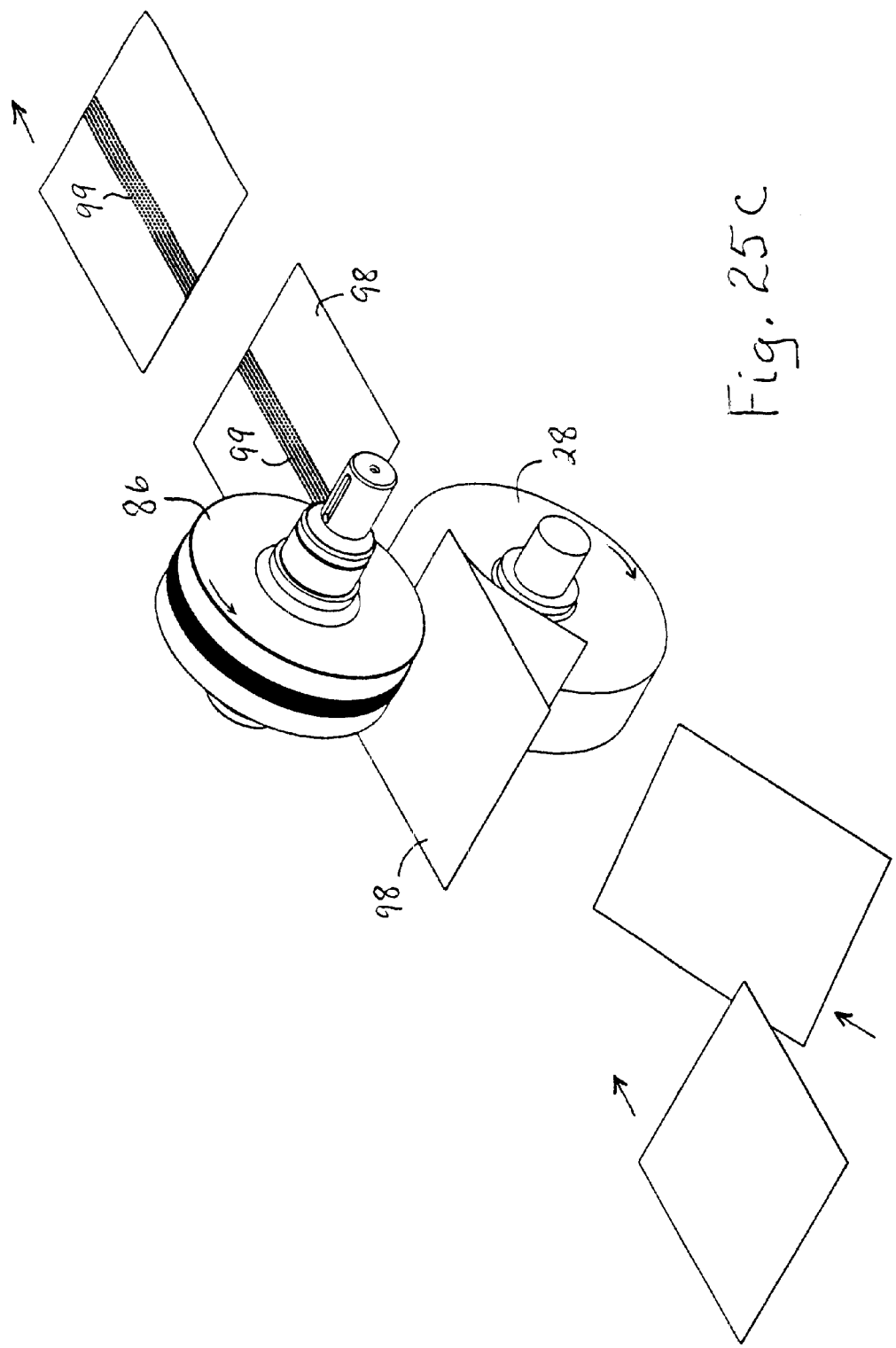
FIG. 25C representatively shows a system configured with a selected anvil member to provide a selected array of bonds arranged in an intermittent pattern distributed along another web of discontinuous target work material.

FIG. 25C representatively shows a system configured with a selected anvil member 86 that is arranged to provide a selected array of processed regions that are arranged in an intermittent pattern along a web 98 provided by a discontinuous series of completely separated, spaced apart sections of target work material. FIG. 25D representatively shows an alternative system configured with a noncircular anvil member which includes a plurality of lobes. The anvil lobes can be arranged to provide a selected array of processed regions (e.g. bonded regions 99) that are arranged in an intermittent pattern distributed along a web of discontinuous target work material;

FIG. 26 shows a representative, schematic view of an electronically controlled system for automatically regulating a processing force and process gap in a selected intermittent processing system. As illustrated, the system can be arranged to provide a selected array of bonds arranged in a pattern of discontinuous, intermittent bonded regions that are distributed along a web of target work material.

The horn member 28 and the anvil member 86 can be configured to provide the desired intermittent processing operation. Additionally, the electronic processor 128 can be configured to regulate the horn-anvil gap that is appropriate for the desired intermittent processing. The desired processing can, for example, generate periodically or non-periodically varying signals or outputs from the selected force detecting system. Intermittently occurring output(s) can be provided from the force sensor(s) (e.g. load-cells 126), and can be operatively directed to the computer or other electronic processor 128. An example of a suitable electronic processor is the Model No. 9640071 A01 CONTROL LOGIX processor which is available from Rockwell Automation. The signal amplifier 138 can be employed to amplify the intermittent output signals from the load cells or other force sensors. The electronic processor can monitor the varying output signals received from the force sensor, and can perform computational or other desired processing operations with the intermittent load cell signals.

The electronic processor 128 and cooperating force sensor (e.g. load-cell 126) can be configured to accommodate the desired intermittent bonding operation.

Figure 26A:
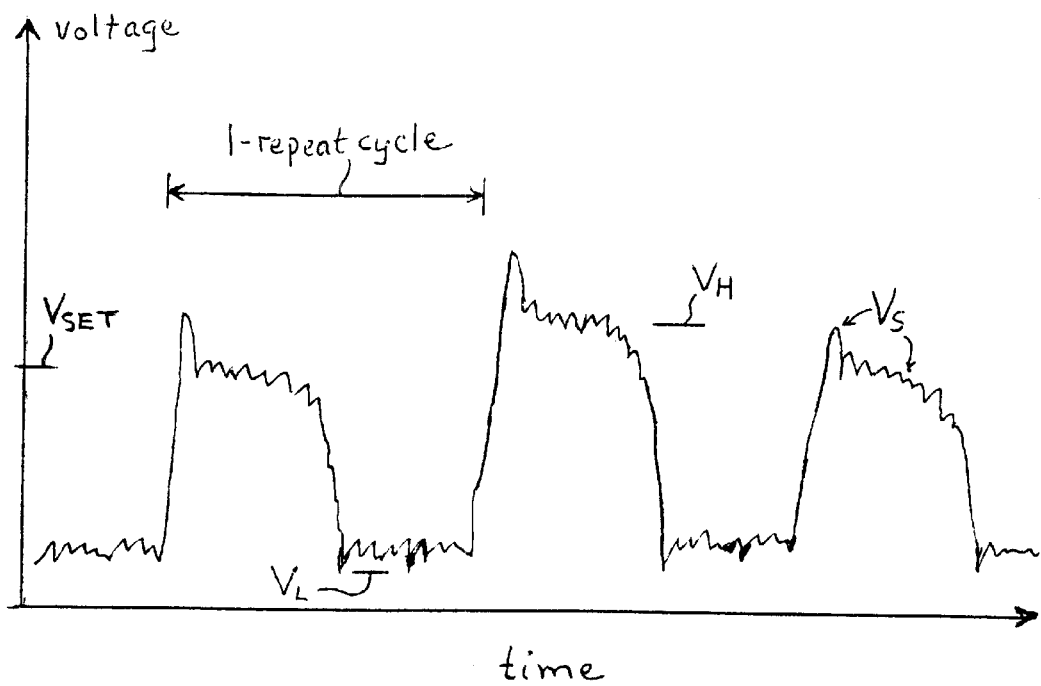
FIG. 26A shows representative voltage waveform that can be generated during an intermittent processing operation.

The load-cells or other force sensors can provide an operative force signal when detecting compressive or tensile forces. The force signal may be a voltage signal, a current signal, a charge signal, a magnetic signal, a mechanical signal or the like, as well as combinations thereof. In the representatively shown configuration, the force signal can be a voltage signal. During relatively higher levels of compressive force, the load-cells can produce a relatively higher (+) voltage signal which is proportional to the instantaneous compressive force produced in the nip gap region 106. During a tensile force, the load-cells can produce a (−) voltage signal. As the intermittent processing pattern occurs, the voltage signal can increase and decrease as the compressive force in the nip region 106 increases and decreases. As several processing patterns occur, a repeating signal waveform (e.g. voltage waveform) can be created. The signal waveform can take on any shape, including, but not limited to, ramped, sinusoidal, square wave or the like, as well as combinations thereof. A representative voltage waveform is illustrated in FIG. 26A. The waveform signal can alternate between minimum and maximum levels during the cycles of the waveform pattern, depending on the occurring process conditions. In a particular arrangement, a high-signal value (e.g. high-voltage value) can represent the force present during an active ultrasonic bonding operation. The electronic processor 128 can receive this force signal (e.g. voltage signal) from the load-cell amplifier.

Due to extraneous vibrations of the equipment and/or variations in the target material 98, the force/voltage, signals produced by the load-cells can be erratic and can include quantities of "noise". To compensate for the noise, the instantaneous force signals (e.g. voltage signals) can be averaged to determine an Average active-force value, $V_F$.

The averaging can include a calculating of an individual, active-force value (e.g. active-force voltage value, $V_H$) for each individual process cycle, where an individual process cycle corresponds to one repeat of the selected intermittent processing operation. Each repeat cycle of the intermittent processing operation can, in turn, provide a single repeat cycle in the signal waveform produced by the selected force sensor. To determine the individual active-force value, the portion of the waveform signal that corresponds to the active-section of the intermittent processing operation during a repeat cycle is sampled over a fixed period of time at a given sample rate. In an intermittent ultrasonic bonding operation, for example, ultrasonic bonds will actually be generated during the "active-section" of each repeat cycle of the bonding operation. In arrangements where the sampled signals are voltages, each voltage sample can provide an individual, voltage data value, $V_S$.

During each cycle of the selected processing operation, the sample time can be as long as about 5 seconds. The sample time can alternatively be as long as about 1 second, and can optionally be as long as about 0.5 seconds. Additionally, the sample time can be as short as about 15 milliseconds. The sample time can alternatively be as short as about 10 milliseconds, and can optionally be as short as about 3 milliseconds.

In the selected processing operation, the sample rate can be as high as about 4 GHz (Giga-Hertz). The sample rate can alternatively be as high as about 0.5 GHz, and can optionally be as high as about 0.0001 GHz. Additionally, the sample rate can be as low as about 60 Hz. The sample rate can alternatively be as low as about 10 Hz, and can optionally be as low as about 1 Hz.

A suitable sample time and sample rate can be selected by the process operator, and can be operatively chosen to provide a sufficiently stable and sufficiently regulated processing operation. The electronic processor may also be configured to initiate the collection of each data value upon detecting an operative rising edge of the voltage waveform.

The number of individual data values (e.g. voltage data values, $V_S$) that are collected to support the determination of an active-force value (e.g. active-force voltage value, $V_H$) for an individual process cycle, can be up to 1000 or more, and may be as low as 300 or less. Desirably, the electronic processor 128 can be configured to include a minimum of at least 20 data values (e.g. $V_S$) for determining each individual, active-force value (e.g. $V_H$). The selected number of data values can be stored within the processor memory during the sampling periods employed for the selected process. When the collection of the sampling data has been completed for a particular process cycle, the processor can determine an active-force value (e.g. active-force voltage value, $V_H$) for that individual process cycle by arithmetically averaging the voltage data values. The arithmetic average can be determined by calculating the sum of the data value values (e.g. voltage data values, $V_S$) that have been collected for that particular process cycle, and then dividing such sum by the number of data values (e.g. $V_S$) collected for that process cycle. This procedure determines a single active-force value (e.g. $V_H$) for that particular process cycle.

A selected set of active-force values (e.g. active-force voltage values, $V_H$) can then be arithmetically averaged to provide an Average active-force value (e.g. Average active-force voltage value, $V_F$) that is being produced by the selected process. The number of individual active-force values (e.g. $V_H$) that are collected in a set to support the selected processing operation can be up to 1000 or more, and may be as low as 300 or less.

Desirably, the electronic processor 128 can be configured to include a minimum of at least 20 active-force values (e.g. $V_H$) in each value-set employed for determining an Average active-force value. A suitable number of active-force values (e.g. $V_H$) that are collected in a set, can be selected by the process operator, and can be operatively chosen to provide a sufficiently stable and sufficiently regulated processing operation.

To determine the Average active-force value (e.g. Average active-force voltage value, $V_F$) being generated during a corresponding, operational period of the selected process, the selected set of individual active-force values (e.g. voltage values, $V_H$) can be collected and stored within a selected portion of the processor memory on a continual, "running" basis. When the collection of a set of active-force values has been completed, the processor can arithmetically average the values (e.g. average the voltage values, $V_H$) by finding the sum of the active-force values collected for the set, and then dividing such sum by the number of active-force values included in the set. This procedure can calculate the Average active-force (e.g. $V_F$) being generated during the corresponding, running-period of the particular processing operation.

In a desired arrangement, the electronic processor 128 can be configured to continually compare the calculated Average active-force value with an operator-entered value, called the set point. For example, the set point can be a set point, voltage value, $V_{SET}$. The set point corresponds to a predetermined or otherwise known value that would be generated by a "properly operating" process and apparatus. Using a conventional control feedback loop, the processor can command a motorized drive 130 or other servo mechanism to make small adjustments to the position of transfer device 110 and the location of the anvil, until the load-cell signal is producing an Average active-force value that is within a fixed range (e.g. ±5%) of the set point value.

The intermittent processing can be represented by significant change in the force value generated in the nip region or other processing region of the method and apparatus. During an active processing phase, such as provided by a period of active ultrasonic bonding, an average, active force value can be determined in the nip region. The processing operation can be deemed to be intermittent if there are discontinuity periods of the processing operation during which a discontinuity in the force value can be determined in the nip region, and the discontinuity provides a percent difference in force value which is at least 10% of the active force value.

In a determination of whether or not an intermittent processing operation is present, the force-related, voltage waveform produced by the selected system of force sensors during a normal, acceptable-quality operation of the desired process and apparatus can be acquired on a conventional oscilloscope system. Additionally, an accurately calibrated trace of the waveform can be printed out. Suitable oscilloscope systems are well known in the art, and are available from commercial vendors. An example of a suitable oscilloscope system is a Model No. 54835A, 1-GHz Oscilloscope, available from Hewlett Packard, a business having offices located in Palo Alto, Calif.

The set point voltage value, $V_{SET}$, which corresponds to the desired Average active-force can then be noted and marked on the waveform trace. Such set point value should correspond to the Average active-force value that would be produced by the normal, acceptable-quality operation of the desired process and apparatus. Additionally, the lowest voltage value, $V_L$, that has been recorded on the waveform trace can be noted and marked on the waveform trace. The $V_L$ would correspond to the lowest force value observed during normal, acceptable-quality operation of the selected processing operation. An intermittent processing operation can be deemed to be present when there is at least a 10% difference between the set point voltage value ($V_{SET}$) and the lowest voltage value ($V_L$), as determined by the formula:

percent difference=$(V_{SET}-V_L)*100/V_{SET}$.

An output drive signal from the electronic processor 128 can be directed to an automated drive that is operatively connected to the selected transfer device (e.g. the slide mechanism 110). The automated drive can, for example, include a motor to provide the motorized drive 130. In a particular arrangement, the processor output can be configured to operate a motor driven, lead-screw that is connected to automatically move the dove-tail slide mechanism and the anvil member to thereby modify and change the nip gap 106.

In a desired feature, the method and apparatus can provide the intermittent bonding or other processing while operating at high-speed. In particular aspect, the desired intermittent bonding can be provided while the anvil member 86 is being rotated to provide a working speed which is at least a minimum of about 5 m/min. The working speed can alternatively be at least about 7 m/min, and can optionally be at least about 9 m/min to provide improved performance. In another aspect, the working speed can be up to a maximum of about 700 m/min, or more.

For the purposes of the present disclosure, the working speed is a speed at which the target web 98 of work material is delivered into the nip region between the rotary horn and anvil members. If there is substantially no slippage between the rotating anvil member 86 and the moving target web 98, the working speed can be substantially equal to the surface speed at the outer peripheral surface 90 of the anvil member.

In the various attachments and securements employed in the constructions of the method and apparatus of the invention, it should be readily apparent that any conventional attachment or securement technique may be employed. Such techniques may, for example, include adhesives, welds, screws, bolts, rivets, pins, latches, clamps or the like, as well as combinations thereof.

Similarly, it should be readily apparent that any conventional material may be employed to construct the various members and components of the method and apparatus. Such materials can include synthetic polymers, fiberglass-resin composites, carbon fiber-resin composites, metals, metallic composites, ceramic composites, and the like, as well as combinations thereof. For example, suitable metals may include steel, aluminum, titanium or the like, as well as combinations there of. The materials are typically selected to provide desired levels of strength, hardness, low vibrational damping, toughness, fatigue resistance, durability, ease of manufacture, and ease of maintenance.

The dimensions of the various components can depend upon the particular application of the method and apparatus, and can be determined by employing standard engineering techniques. For example, the dimensions of the components can be determined by ascertaining the desired peak operating load and by setting the stress limits to a selected safety factor (e.g. a safety factor of ten) to help assure adequate operating life and fatigue resistance.

The rotary horn member 28, the corresponding wave guide/axle members, the corresponding isolation members and other cooperating components can be constructed as a unitary assembly which is integrally formed from a single piece of material. The one-piece design can eliminate interfaces that can be sources for excessive wear and excessive heat generation. Such interfaces can also contribute to the build up of tolerance errors during machining. Such tolerance errors can make it difficult to maintain a desired level of concentricity at the working surface of the rotary horn. As a result, the various configurations of the method and apparatus can reduce cost, provide increased stiffness, can operate within smaller tolerance ranges and can provide more consistent performance during high speed production.

It should be readily appreciated that the various rotational components can be dynamically spin-balanced to reduce wear, reduce vibrations, better maintain desired positionings and further improve the performance of the desired bonding operation. Each of the components may be dynamically balanced individually or in an operative combination with other components, as desired.

Although various illustrative and representative configurations have been described in detail herein, it is to be appreciated that other variants, modifications and arrangements are possible. All of such variations, modifications and arrangements are to be considered as being within the scope of the present invention.

What is claimed is:

1. An ultrasonic processing apparatus, comprising:
   a rotatable, ultrasonic horn member having a first axial side and a second axial side;
   a first, rotatable axle member which is operatively joined to said first axial side of said horn member;
   a first isolation member which is operatively joined to said first axle member, said first isolation member capable of bending under a horn-life range of sonic frequencies to provide an operative component of motion along a radial direction of said first isolation member and an operative component of motion along an axial direction of said first isolation member;
   a first coupler which connects between said first isolation member and a first, fixedly mounted rotational bearing, said first coupler operatively secured to said first isolation member;
   a rotatable anvil member which is cooperatively positioned to provide a selected horn-anvil gap between said anvil member and said horn member;
   an ultrasonic exciter which is connected to provide an operative amount of ultrasonic energy to said horn member;
   an actuator which is configured to selectively adjust said horn-anvil gap;
   an automated drive which is operatively connected to said actuator to automatically modify said horn-anvil gap;
   a force sensor which is configured to detect an intermittent gap force at said horn-anvil gap; and
   an electronic processor which is configured to employ an output from said force sensor to monitor said intermittent gap force, and provide a drive signal to said automated drive to thereby adjust said horn-anvil gap to operatively maintain a target, intermittent gap force value.

2. An ultrasonic processing apparatus, comprising:
   a rotatable, ultrasonic horn member having a first axial side and a second axial side;
   a first, rotatable axle member which is operatively joined to said first axial side of said horn member;
   a first isolation member which is operatively joined to said first axle member, said first isolation member capable of bending under a horn-life range of sonic frequencies to provide an operative component of motion along a radial direction of said first isolation member and an operative component of motion along an axial direction of said first isolation member;
   a first coupler which connects between said first isolation member and a first, fixedly mounted rotational bearing, said first coupler operatively secured to said first isolation member;
   a second, rotatable axle member which is operatively joined to said second axial side of said horn member;
   a second isolation member which is operatively joined to said second axle member, said first isolation member capable of bending under a horn-life range of sonic frequencies to provide an operative component of motion along a radial direction of said second isolation member and an operative component of motion along an axial direction of said second isolation member;
   a second coupler which connects between said second isolation member and a second, fixedly mounted rotational bearing, said second coupler operatively secured to said second isolation member;
   a rotatable anvil member which is cooperatively positioned to provide a selected horn-anvil gap between said anvil member and said horn member;
   an ultrasonic exciter which is connected to said horn member and can provide an operative amount of ultrasonic energy;
   an actuator which is configured to selectively adjust said horn-anvil gap;
   an automated drive which is operatively connected to said actuator to automatically modify said horn-anvil gap;
   a force sensor which is configured to detect a gap force at said horn-anvil gap; and
   an electronic processor which is configured to employ an output from said force sensor to monitor said intermittent gap force, and provide a drive signal to said automated drive to thereby adjust said horn-anvil gap to operatively maintain a target, intermittent gap force value.

3. An ultrasonic processing apparatus, comprising:
   a rotatable, ultrasonic horn member having a first axial side and a second axial side;
   a first, rotatable axle member which is operatively joined to said first axial side of said horn member, said first axle member capable of providing a first node plane;
   a first isolation member which is operatively joined to said first axle member, and has a location that is operatively proximate said first node plane of the first axle member, said first isolation member capable of bending under a horn-life range of sonic frequencies to provide an operative component of motion along a radial direction of said first isolation member and an operative component of motion along an axial direction of said first isolation member;

a first coupler which connects between said first isolation member and a first, fixedly mounted rotational bearing, said first coupler operatively secured to said first isolation member;

a second, rotatable axle member which is operatively joined to said second axial side of said horn member, said second axle member capable of providing a second node plane;

a second isolation member which is operatively joined to said second axle member and has a location that is operatively proximate said second node plane of the second axle member, said first isolation member capable of bending under a horn-life range of sonic frequencies to provide an operative component of motion along a radial direction of said second isolation member and an operative component of motion along an axial direction of said second isolation member;

a second coupler which connects between said second isolation member and a second, fixedly mounted rotational bearing, said second coupler operatively secured to said second isolation member;

a rotatable anvil member which is cooperatively positioned to provide a selected horn-anvil gap between said anvil member and said horn member, said anvil member located in a horizontally offset and vertically overlapping arrangement relative to said horn member;

an ultrasonic exciter which is connected to said horn member and can provide an operative amount of ultrasonic energy at a frequency within the range of about 15–60 KHz;

an actuator which is configured to selectively adjust said horn-anvil gap;

an automated drive which is operatively connected to said actuator to automatically modify said horn-anvil gap;

a force sensor which is configured to detect a gap force at said horn-anvil gap; and an electronic processor which is configured to employ an output from said force sensor to monitor said intermittent gap force, and provide a drive signal to said automated drive to thereby adjust said horn-anvil gap to operatively maintain a target, intermittent gap force value.

4. An ultrasonic processing apparatus as recited in claim 1, wherein said horn member is configured to exhibit a static deflection of not more than about 0.004 mm at a load of 445 Newtons.

5. An ultrasonic processing apparatus as recited in claim 1, wherein said horn member and anvil member are configured to maintain a horn-anvil gap which is at least about 0.01 mm.

6. An ultrasonic processing apparatus as recited in claim 1, further including an anvil drive which can rotate said anvil member to provide an anvil, peripheral speed of at least about 5 m/min; and a horn drive which can rotate said horn member to provide a horn, peripheral speed which substantially equals said anvil peripheral speed.

7. An ultrasonic processing apparatus as recited in claim 2, wherein said first isolation member has a first, radial isolation component and a first, axial isolation component;

said first, radial isolation component is joined to said first axle member, is configured to extend at least radially from said first axle member, and is configured to bend under a horn-life range of sonic frequencies;

said first axial isolation component is joined to an operative portion of said first radial isolation component, is configured to extend axially from said first radial isolation component, and is configured to bend under said horn-life range of sonic frequencies;

said second isolation member has a second, radial isolation component and a second, axial isolation component;

said second, radial isolation component is joined to said second axle member, is configured to extend at least radially from said second axle member, and is configured to bend under said horn-life range of sonic frequencies;

said second, axial isolation component is joined to an operative portion of said second, radial isolation component, is configured to extend axially from said second radial isolation component, and is configured to bend under said horn-life range of sonic frequencies.

8. An ultrasonic processing apparatus as recited in claim 1, wherein said actuator includes a dove-tail slide.

9. An ultrasonic processing method, comprising:

a rotating of an ultrasonic horn member having a first axial side and a second axial side;

said first axial side of said horn member having been operatively joined to a first, rotatable axle member;

said first axle member having been operatively joined to a first isolation member, said first isolation member capable of bending under a horn-life range of sonic frequencies to provide an operative component of motion along a radial direction of said first isolation member and an operative component of motion along an axial direction of said first isolation member;

a first coupler having been connected between said first isolation member and a first, fixedly mounted rotational bearing, said first coupler operatively secured to said first isolation member;

a rotatable anvil member having been cooperatively positioned to provide a selected horn-anvil gap between said anvil member and said horn member;

an operative amount of ultrasonic energy having been provided to said horn member;

an actuator which having been configured to selectively adjust said horn-anvil gap;

an automated drive having been operatively connected to said actuator to automatically modify said horn-anvil gap;

an intermittent gap force having been detected at said horn-anvil gap; and said intermittent gap force having been monitored to provide a drive signal to said automated drive to thereby adjust said horn-anvil gap to operatively maintain a target, intermittent gap force value.

10. A method as recited in claim 9, wherein a second axle member has been joined to said second axial side of said horn member;

a second isolation member has been joined to said second axle member, said first isolation member capable of bending under a horn-life range of sonic frequencies to provide an operative component of motion along a radial direction of said second isolation member and an operative component of motion along an axial direction of said second isolation member; and a second coupler has been connected between said second isolation member and a second, fixedly mounted rotational bearing, said second coupler operatively secured to said second isolation member.

11. A method as recited in claim 9, wherein said first axle member has been configured to provide a first node plane; and said first isolation member has been operatively joined to said first axle member, and has been located operatively proximate said first node plane of the first axle member.

12. A method as recited in claim 9, wherein said horn member has been configured to exhibit a static deflection of not more than about 0.004 mm at a load of 445 Newtons.

13. A method as recited in claim 9, wherein said horn member and anvil member have been configured to maintain a horn-anvil gap which is at least about 0.01 mm.

14. A method as recited in claim 9, wherein said first isolation member has been provided with a first, radial isolation component and a first, axial isolation component;

said first, radial isolation component has been joined to said first axle member, has been configured to extend at least radially from said first axle member, and has been configured to bend under a horn-life range of sonic frequencies;

said first axial isolation component has been joined to an operative portion of said first radial isolation component, is configured to extend axially from said first radial isolation component, and is configured to bend under said horn-life range of sonic frequencies.

\* \* \* \* \*